(12) United States Patent
Sipe et al.

(10) Patent No.: US 12,465,212 B2
(45) Date of Patent: Nov. 11, 2025

(54) SYSTEMS AND METHODS FOR PROVIDING DRUG PRESCRIPTION INFORMATION WITH MONITORED CARDIAC INFORMATION

(71) Applicant: ZOLL Medical Corporation, Chelmsford, MA (US)

(72) Inventors: Michael A. Sipe, Pittsburgh, PA (US); Kent Volosin, Mars, PA (US)

(73) Assignee: ZOLL Medical Corporation, Chelmsford, MA (US)

( * ) Notice: Subject to any disclaimer, the term of this patent is extended or adjusted under 35 U.S.C. 154(b) by 0 days.

(21) Appl. No.: 16/830,985

(22) Filed: Mar. 26, 2020

(65) Prior Publication Data

US 2020/0305713 A1 Oct. 1, 2020

Related U.S. Application Data

(60) Provisional application No. 62/828,622, filed on Apr. 3, 2019, provisional application No. 62/825,357, filed on Mar. 28, 2019.

(51) Int. Cl.
*A61B 5/00* (2006.01)
*A61B 5/316* (2021.01)
(Continued)

(52) U.S. Cl.
CPC .............. *A61B 5/0006* (2013.01); *A61B 5/33* (2021.01); *A61B 5/346* (2021.01); *A61B 5/361* (2021.01);
(Continued)

(58) Field of Classification Search
CPC ....... A61B 5/0006; A61B 5/516; A61B 5/339; A61B 5/361; A61B 5/363; A61B 5/4848;
(Continued)

(56) References Cited

U.S. PATENT DOCUMENTS

| | | |
|---|---|---|
| 5,733,259 A | 3/1998 | Valcke et al. |
| 6,658,396 B1 | 12/2003 | Tang et al. |

(Continued)

FOREIGN PATENT DOCUMENTS

| | | |
|---|---|---|
| WO | WO2008005015 A1 | 1/2008 |
| WO | 2016077786 A1 | 5/2016 |

(Continued)

OTHER PUBLICATIONS

Garnett, C.E., et al. (2008), Concentration-QT Relationships Play a Key Role in the Evaluation of Proarrhythmic Risk During Regulatory Review. The Journal of Clinical Pharmacology, 48: 13-18. https://doi.org/10.1177/0091270007307881 (Year: 2008).*

(Continued)

*Primary Examiner* — Jennifer Pitrak McDonald
*Assistant Examiner* — Shreya Anjaria
(74) *Attorney, Agent, or Firm* — Finch & Maloney PLLC

(57) ABSTRACT

A system for providing electrocardiogram (ECG) information to a healthcare provider (HCP) is provided. The system includes a network interface configured to receive drug prescription information from a computing device associated with the HCP and ECG data from a medical device associated with a patient. The system also includes a memory configured to store the drug prescription information and the ECG data. The system can further a processor configured to select a period of time over which to review the received drug prescription information and the received ECG data, retrieve the received ECG data for the selected period of time, derive one or more ECG metrics including at least one heart rate parameter, and generate a graphical representation indicating a trend in the one or more ECG metrics and a relationship between the one or more ECG metrics and the drug prescription information.

28 Claims, 31 Drawing Sheets

(51) Int. Cl.
*A61B 5/33* (2021.01)
*A61B 5/339* (2021.01)
*A61B 5/346* (2021.01)
*A61B 5/361* (2021.01)
*A61B 5/363* (2021.01)
*A61N 1/39* (2006.01)
*G16H 40/67* (2018.01)
*G16H 50/30* (2018.01)

(52) U.S. Cl.
CPC .......... *A61B 5/363* (2021.01); *A61B 5/4848* (2013.01); *A61B 5/746* (2013.01); *A61N 1/3904* (2017.08); *G16H 40/67* (2018.01); *G16H 50/30* (2018.01)

(58) Field of Classification Search
CPC ...... A61B 5/746; A61N 1/3904; G16H 40/67; G16H 50/30; G16H 20/10
See application file for complete search history.

(56) References Cited

U.S. PATENT DOCUMENTS

| | | | |
|---|---|---|---|
| 7,142,911 B2* | 11/2006 | Boileau | A61M 5/14276 607/9 |
| 8,620,418 B1 | 12/2013 | Kuppuraj et al. | |
| 8,642,012 B2 | 2/2014 | Scharschmidt | |
| 10,022,053 B2 | 7/2018 | Li et al. | |
| 2014/0046690 A1 | 2/2014 | Gunderson et al. | |
| 2016/0103967 A1 | 4/2016 | Bulut et al. | |
| 2016/0135706 A1* | 5/2016 | Sullivan | A61B 5/0533 600/509 |
| 2017/0157323 A1 | 6/2017 | Saha et al. | |
| 2017/0245794 A1* | 8/2017 | Sharma | A61B 5/686 |
| 2017/0263156 A1 | 9/2017 | Lonnroth | |
| 2018/0242876 A1 | 8/2018 | Hughes et al. | |
| 2018/0243578 A1 | 8/2018 | Volosin | |
| 2018/0261322 A1* | 9/2018 | Cheng | A61B 5/339 |
| 2018/0336962 A1* | 11/2018 | Cronin | A61B 5/14552 |
| 2020/0118686 A1* | 4/2020 | Jooste | G16H 10/60 |

FOREIGN PATENT DOCUMENTS

| | | | | |
|---|---|---|---|---|
| WO | WO-2016145392 A1 * | 9/2016 | ......... | A61B 5/02405 |
| WO | WO-2018026477 A1 * | 2/2018 | ......... | A61B 5/02405 |
| WO | WO-2018081134 A1 * | 5/2018 | ........... | A61B 5/0024 |
| WO | WO-2019030746 A1 * | 2/2019 | ........... | A61B 5/0006 |

OTHER PUBLICATIONS

Ramahi T. Beta blocker therapy for chronic heart failure. Am Fam Physician. Nov. 15, 2000;62(10):2267-2274 (Year: 2000).*

Jungbauer et al, Achieving Guideline-Directed Heart Rate Control Early Posthospitalization, The American Journal of Cardiology, https://www.ajconline.org/article/S0002-9149(19)30035-9/fulltext, 5 pages.

PCT International Search Report and Written Opinion for Application No. PCT/US20/24925 dated May 31, 2020, 13 pages.

Koutkias, Vassilis G et al. "A personalized framework for medication treatment management in chronic care." IEEE transactions on information technology in biomedicine., [Online] vol. 14, No. 2, Mar. 1, 2010 (Mar. 1, 2010), pp. 464-472, US USSN: 1089-7771. doi:10.1109/TITB.2009.2036367. Retrieved from the Internet: URL: https://ieeexplore.ieee.org/stamp/stamp.jsp?tp=&arnumber=5352293.

Extended European Search Report issued in European Application No. 20779257.3 on Nov. 23, 2022 (15 pages).

* cited by examiner

FIG. 8

SYSTEMS AND METHODS FOR PROVIDING DRUG PRESCRIPTION INFORMATION WITH MONITORED CARDIAC INFORMATION

CROSS-REFERENCE TO RELATED APPLICATIONS

This application claims priority under 35 U.S.C. § 119(e) to U.S. Provisional Application No. 62/828,622 titled "Systems and Methods for Providing Drug Prescription Information with Monitored Cardiac Information," filed Apr. 3, 2019, and to U.S. Provisional Application No. 62/825,357 titled "Systems and Methods for Providing Drug Prescription Information with Monitored Cardiac Information," filed Mar. 28, 2019. All subject matter set forth in the above references applications is hereby incorporated by reference in its entirety into the present application as if fully set forth herein.

BACKGROUND

The present disclosure is directed to determining and providing drug prescription information with related cardiac information.

Heart failure, if left untreated, could lead to certain life-threatening arrhythmias. Both atrial and ventricular arrhythmias are common in patients with heart failure. One of the deadliest cardiac arrhythmias is ventricular fibrillation, which occurs when normal, regular electrical impulses are replaced by irregular and rapid impulses, causing the heart muscle to stop normal contractions. Because the victim has no perceptible warning of the impending fibrillation, death often occurs before the necessary medical assistance can arrive. Other cardiac arrhythmias can include excessively slow heart rates known as bradycardia or excessively fast heart rates known as tachycardia. Cardiac arrest can occur when a patient in which various arrhythmias of the heart, such as ventricular fibrillation, ventricular tachycardia, pulseless electrical activity (PEA), and asystole (heart stops all electrical activity) result in the heart providing insufficient levels of blood flow to the brain and other vital organs for the support of life. It is generally useful to monitor heart failure patients to assess heart failure symptoms early and provide interventional therapies as soon as possible.

Patients that are at risk, have been hospitalized for, or otherwise are suffering from, adverse heart failure conditions can be assigned a specific treatment regimen. In some examples, depending on the underlying condition being monitored or treated, the treatment regimen can include prescription of one or more medical devices, such as a cardiac monitor or a wearable cardioverter defibrillator (WCD), that may be externally connected to the patient to monitor the patient's cardiac activity and/or treat an adverse cardiac event such as arrhythmia. In some cases, physicians may use medical devices in combination with drug therapies to treat heart failure conditions. For example, a patient may be prescribed a drug to help control one or more cardiac functions. For instance, a patient may be prescribed a beta-blocker to reduce the patient's heart rate.

SUMMARY

In at least one example, a system for providing electrocardiogram (ECG) information to a healthcare provider (HCP) is provided. The system includes at least one network interface, a memory operably connected to the at least one network interface, at least one processor operably coupled to the memory and the at least one network interface, and output circuitry operably coupled to the at least one processor. The at least one network interface can be configured to receive, from a computing device associated with the HCP, drug prescription information including a drug administered to a heart failure patient and corresponding dosage and dosage times and receive ECG data from an ambulatory medical device associated with the heart failure patient. The memory can be configured to store the drug prescription information and the ECG data. The at least one processor operably can be configured to select a period of time over which to review the received drug prescription information and the received ECG data, retrieve, from the memory, the received ECG data for the selected period of time, derive, from the ECG data, one or more ECG metrics including at least one heart rate parameter, and generate a graphical representation indicating at least one trend in the one or more ECG metrics including the at least one heart rate parameter relative to changes in at least one of the drug administered to the heart failure patient, the corresponding dosage, and the corresponding dosage times for the heart failure patient. The output circuitry can be configured to output the graphical representation.

Implementations of the system for providing ECG information may include one or more of the following features.

In some examples of the system, the selected period of time can include a default period of time including at least one of 24 hours, 48 hours, 72 hours, one week, and two weeks.

In some examples of the system, the selected period of time can include a user-specified period of time received from the HCP.

In some examples of the system, the drug administered to the heart failure patient can include at least one of acebutolol, atenolol, carvedilol, metoprolol, nadolol, and propranolol. In some examples of the system, the corresponding dosage and dosage times for the drug administered to the heart failure patient can include at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

In some examples of the system, the one or more ECG metrics can be derived as a single value representative of the selected period of time.

In some examples of the system, the one or more ECG metrics can be derived as a series of values that correspond to subperiods within the selected period of time.

In some examples of the system, the at least one processor can be further configured to receive updated drug prescription information including an updated corresponding dosage amount for the heart failure patient from the computing device associated with the HCP.

In some examples of the system, the at least one processor can be further configured to select an updated period of time over which to review the received updated drug prescription information and the ECG data from the ambulatory medical device, retrieve the ECG data from the memory for the selected updated period of time, derive one or more updated ECG metrics from the ECG data including at least one heart rate parameter, and generate an updated graphical representation indicating at least one additional trend in the ECG metrics including the at least one heart rate parameter relative to changes in the updated corresponding dosage amount for the heart failure patient.

In some examples of the system, the one or more ECG metrics including at least one heart rate parameter can include at least one of heart rate, heart rate variability, premature ventricular complex (PVC) burden or counts, atrial fibrillation burden, pauses, heart rate turbulence, QRS height, QRS width, changes in a size or shape of morphology of the ECG data, cosine R-T, artificial pacing, QT interval, QT variability, T wave width, T wave alternans, T-wave variability, and ST segment changes.

In some examples of the system, the at least one processor can be further configured to receive at least one alert criterion for triggering an alert relating to the ECG data and the drug prescription information to be sent to the HCP. In some examples of the system, the at least one processor can be further configured to generate the alert to be sent to the HCP, the alert including an indication that the at least one alert criterion was detected and relationship information between the drug prescription information and the at least a portion of the ECG data. In some examples of the system, the at least one alert criterion can include a threshold for at least one ECG metric selected by the HCP. In some examples of the system, the at least one ECG metric can be a heart rate measurement for the heart failure patient for a monitored period of time. In some examples of the system, the monitored period of time can be associated with at least one of a prescribed activity period for the heart failure patient, a spontaneous activity period for the heart failure patient, and a rest period for the heart failure patient.

In some examples of the system, the at least one processor can be further configured to determine relationship information between the drug prescription information and the at least a portion of the ECG data, analyze the at least one trend to determine a mathematical model that represents at least a portion of the relationship information, determine at least one patient recommendation for a future period of time based upon the mathematical model, and augment the graphical representation to include at least a portion of the at least one patient recommendation. In some examples of the system, the at least one patient recommendation can include at least one of a recommended change in the drug prescription information for the heart failure patient, a recommended settings change to the ambulatory medical device associated with the heart failure patient, and a recommended change in an activity level of the heart failure patient.

In some examples of the system, the graphical representation can include a bar chart showing passage of time on an x-axis of the bar chart and heart rate information on a y-axis of the bar chart.

In some examples of the system, the graphical representation can include at least one of a histogram, a pie chart, a box plot, a scatter plot, a heat map, and a contour plot.

In at least one example, an ambulatory medical device is provided. The ambulatory medical device includes a plurality of sensing electrodes, a memory operably coupled to the plurality of sensing electrodes, at least one processor coupled to the memory and the plurality of sensing electrodes, and output circuitry operably coupled to the at least one processor. The plurality of sensing electrodes are configured to be coupled externally to a heart failure patient and to detect ECG data for the heart failure patient. The memory is configured to store the ECG data for the heart failure patient as well as drug prescription information including a drug administered to the heart failure patient and corresponding dosage and dosage times for the heart failure patient. The at least one processor is configured to select a period of time over which to review the drug prescription information and the ECG data, retrieve the ECG data from the memory for the selected period of time, derive one or more ECG metrics from the ECG data including at least one heart rate parameter, and generate a graphical representation indicating at least one trend in the ECG metrics including the at least one heart rate parameter relative to changes in at least one of the drug administered to the heart failure patient, the corresponding dosage, and the dosage times for the heart failure patient. The output circuitry is configured to output the graphical representation.

Implementations of the ambulatory medical device may include one or more of the following features.

In some examples, the ambulatory medical device can further include at least one network interface configured to receive the drug prescription information from a computing device associated with a healthcare provider. In some examples of the ambulatory medical device, the output circuitry is configured to transmit the graphical representation to the computing device associated with the healthcare provider via the at least one network interface.

In some examples of the ambulatory medical device, the selected period of time can include a default period of time including at least one of 24 hours, 48 hours, 72 hours, one week, and two weeks.

In some examples of the ambulatory medical device, the selected period of time can include a user-specified period of time received from a healthcare provider.

In some examples of the ambulatory medical device, the drug administered to the heart failure patient can include at least one of acebutolol, atenolol, carvedilol, metoprolol, nadolol, and propranolol. In some examples, the corresponding dosage and dosage times for the drug administered to the heart failure patient can include at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

In some examples of the ambulatory medical device, the one or more ECG metrics can be derived as a single value representative of the selected period of time.

In some examples of the ambulatory medical device, the one or more ECG metrics can be derived as a series of values that correspond to subperiods within the selected period of time.

In some examples of the ambulatory medical device, the at least one processor can be further configured to receive updated drug prescription information including an updated corresponding dosage amount for the heart failure patient from a computing device associated with a healthcare provider.

In some examples of the ambulatory medical device, the at least one processor can be further configured to select an updated period of time over which to review the received updated drug prescription information and the ECG data from the ambulatory medical device, retrieve the ECG data from the memory for the selected updated period of time, derive one or more updated ECG metrics from the ECG data including at least one heart rate parameter, and generate an updated graphical representation indicating at least one additional trend in the ECG metrics including the at least one heart rate parameter relative to changes in the updated corresponding dosage amount for the heart failure patient.

In some examples of the ambulatory medical device, the one or more ECG metrics including at least one heart rate parameter can include at least one of heart rate, heart rate variability, PVC burden or counts, atrial fibrillation burden, pauses, heart rate turbulence, QRS height, QRS width, changes in a size or shape of morphology of the ECG data, cosine R-T, artificial pacing, QT interval, QT variability, T wave width, T wave alternans, T-wave variability, and ST segment changes.

In some examples of the ambulatory medical device, the at least one processor can be further configured to receive at least one alert criterion for triggering an alert relating to the ECG data and the drug prescription information to be sent to a healthcare provider.

In some examples of the ambulatory medical device, the at least one processor can be further configured to generate the alert to be sent to the healthcare provider, the alert including an indication that the at least one alert criterion was detected and relationship information between the drug prescription information and the at least a portion of the ECG data.

In at least one example, an ambulatory medical device is provided. The ambulatory medical device includes a plurality of sensing electrodes, therapy delivery circuitry, a plurality of therapy electrodes, a memory operably coupled to the plurality of sensing electrodes, at least one processor operably coupled to the memory, and output circuitry operably coupled to the at least one processor. Each of the plurality of sensing electrodes is configured to be coupled externally to a heart failure patient and to detect ECG data for the heart failure patient. The therapy delivery circuitry is configured to produce a therapy shock. The plurality of therapy electrodes is configured to be coupled externally to the patient to deliver the therapy shock to the patient. The memory is configured to store the ECG data for the heart failure patient as well as drug prescription information including a drug administered to the heart failure patient and corresponding dosage and dosage times for the heart failure patient. The at least one processor operably coupled to the memory, is configured to select a period of time over which to review the drug prescription information and the ECG data, retrieve the ECG data from the memory for the selected period of time, derive one or more ECG metrics from the ECG data including at least one heart rate parameter, and generate a graphical representation indicating at least one trend in the ECG metrics including the at least one heart rate parameter relative to changes in at least one of the drug administered to the heart failure patient, the corresponding dosage, and the dosage times for the heart failure patient. The output circuitry is configured to output the graphical representation.

Implementations of the ambulatory medical device may include one or more of the following features.

In some examples, the ambulatory medical device can further include at least one network interface configured to receive the drug prescription information from a computing device associated with a healthcare provider. In some examples of the ambulatory medical device, the output circuitry can be configured to transmit the graphical representation to the computing device associated with the healthcare provider via the at least one network interface.

In some examples of the ambulatory medical device, the graphical representation can further indicate any therapy shocks delivered to the patient during the selected period of time.

In some examples of the ambulatory medical device, the selected period of time can include a default period of time including at least one of 24 hours, 48 hours, 72 hours, one week, and two weeks.

In some examples of the ambulatory medical device, the selected period of time can include a user-specified period of time received from a healthcare provider.

In some examples of the ambulatory medical device, the drug administered to the heart failure patient can include at least one of acebutolol, atenolol, carvedilol, metoprolol, nadolol, and propranolol. In some examples, the corresponding dosage and dosage times for the drug administered to the heart failure patient can include at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

In some examples of the ambulatory medical device, the one or more ECG metrics can be derived as a single value representative of the selected period of time.

In some examples of the ambulatory medical device, wherein the one or more ECG metrics can be derived as a series of values that correspond to subperiods within the selected period of time.

In some examples of the ambulatory medical device, the at least one processor can be further configured to receive updated drug prescription information including an updated corresponding dosage amount for the heart failure patient from a computing device associated with a healthcare provider.

In some examples of the ambulatory medical device, the at least one processor can be further configured to select an updated period of time over which to review the received updated drug prescription information and the ECG data from the ambulatory medical device, retrieve the ECG data from the memory for the selected updated period of time, derive one or more updated ECG metrics from the ECG data including at least one heart rate parameter, and generate an updated graphical representation indicating at least one additional trend in the ECG metrics including the at least one heart rate parameter relative to changes in the updated corresponding dosage amount for the heart failure patient.

In some examples of the ambulatory medical device, the one or more ECG metrics including at least one heart rate parameter can include at least one of heart rate, heart rate variability, PVC burden or counts, atrial fibrillation burden, pauses, heart rate turbulence, QRS height, QRS width, changes in a size or shape of morphology of the ECG data, cosine R-T, artificial pacing, QT interval, QT variability, T wave width, T wave alternans, T-wave variability, and ST segment changes.

In some examples of the ambulatory medical device, the at least one processor can be further configured to receive at least one alert criterion for triggering an alert relating to the ECG data and the drug prescription information to be sent to a healthcare provider.

In some examples, the at least one processor can be further configured to generate the alert to be sent to the healthcare provider, the alert including an indication that the at least one alert criterion was detected and relationship information between the drug prescription information and the at least a portion of the ECG data.

In at least one example, a system is provided. The system includes a memory, at least one network interface, at least one processor operably coupled to the memory and the at least one network interface, and output circuitry operably coupled to the at least one processor. The memory is configured to store a drug titration learning model trained using a training data set including historical ECG metrics, drug identifiers, dosage measurements, and heart rates to output at least one learning model output. The at least one network interface is configured to receive drug prescription information for a heart failure patient from a computing device associated with an HCP and receive ECG information from an ambulatory medical device associated with the heart failure patient. The at least one processor is configured to transform the received drug prescription information into a predetermined drug dosage data format for input to the drug titration learning model, generate the at least one of a predicted heart rate and a drug recommendation by executing the drug titration learning model stored in the memory, and generate a user-readable output for the HCP, the user-readable output including information relating to the at least one learning model output. The output circuitry is configured to provide the user-readable output.

Implementations of the system may include one or more of the following features.

In some examples of the system, the drug titration learning model can include a plurality of drug titration learning model parameters, weights, and vectors. In some examples, the drug titration learning model parameters are validated using a validation data set of historical ECG metrics, drug identifiers, dosage measurements, and heart rates.

In some examples of the system, the drug titration learning model can be trained using a training data set including at least one ECG metric extracted from raw patient ECG signals. In some examples, the at least one ECG metric extracted from the raw patient ECG signals can include at least one of heart rate and heart rate variability.

In some examples of the system, the at least one learning model output can include at least one of the predicted heart rate and the drug recommendation. In some examples, the user-readable output can include information relating to at least one of the predicted heart rate and the drug recommendation.

In some examples of the system, the memory can be further configured to store at least one of a sensitivity parameter and a specificity parameter for the drug titration learning model.

In some examples of the system, the at least one processor can be further configured to provide a user interface to a user to permit changes to the at least one of the sensitivity parameter and the specificity parameter for the drug titration learning model.

In at least one example, a method for providing ECG information to an HCP is provided. The method includes receiving, by at least one network interface drug prescription information from a computing device associated with the HCP, the drug prescription information including a drug administered to a heart failure patient and corresponding dosage and dosage times; receiving, by the at least one network interface, ECG data from an ambulatory medical device associated with the heart failure patient; storing, by a memory operably coupled to the network interface, the drug prescription information and the ECG data; selecting, by at least one processor operably coupled to the memory, a period of time over which to review the received drug prescription information and the received ECG data; retrieving, by the at least one processor, the received ECG data for the selected period of time from the memory; deriving, by the at least one processor, one or more ECG metrics including at least one heart rate parameter from the ECG data; generating, by the at least one processor, a graphical representation indicating at least one trend in the one or more ECG metrics including the at least one heart rate parameter relative to changes in at least one of the drug administered to the heart failure patient, the corresponding dosage, and the corresponding dosage times for the heart failure patient; and outputting, by output circuitry operably coupled to the at least one processor, the graphical representation.

Implementations of the method may include one or more of the following features.

In some examples of the method, the selected period of time can include a default period of time including at least one of 24 hours, 48 hours, 72 hours, one week, and two weeks.

In some examples of the method, the selected period of time can include a user-specified period of time received from the HCP.

In some examples of the method, the drug administered to the heart failure patient can include at least one of acebutolol, atenolol, carvedilol, metoprolol, nadolol, and propranolol. In some examples, the corresponding dosage and dosage times for the drug administered to the heart failure patient can include at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

In some examples of the method, deriving the one or more ECG metrics can include deriving the one or more ECG metrics as a single value representative of the selected period of time.

In some examples of the method, deriving the one or more ECG metrics can include deriving the one or more ECG metrics as a series of values that correspond to subperiods within the selected period of time.

In some examples of the method, the method can further include receiving, by the at least one processor, updated drug prescription information including an updated corresponding dosage amount for the heart failure patient from the computing device associated with the HCP. In some examples, the method can further include selecting, by the at least one processor, an updated period of time over which to review the received updated drug prescription information and the ECG data from the ambulatory medical device; retrieving, by the at least one processor, the ECG data from the memory for the selected updated period of time; deriving, by the at least one processor, one or more updated ECG metrics from the ECG data including at least one heart rate parameter; and generating, by the at least one processor, an updated graphical representation indicating at least one additional trend in the ECG metrics including the at least one heart rate parameter relative to changes in the updated corresponding dosage amount for the heart failure patient.

In some examples of the method, the one or more ECG metrics including at least one heart rate parameter can include at least one of heart rate, heart rate variability, PVC burden or counts, atrial fibrillation burden, pauses, heart rate turbulence, QRS height, QRS width, changes in a size or shape of morphology of the ECG data, cosine R-T, artificial pacing, QT interval, QT variability, T wave width, T wave alternans, T-wave variability, and ST segment changes.

In some examples of the method, the method can further include receiving, by the at least one processor, at least one alert criterion for triggering an alert relating to the ECG data and the drug prescription information to be sent to the HCP.

In some examples, the method can further include generating, by the at least one processor, the alert to be sent to the HCP, the alert including an indication that the at least one alert criterion was detected and relationship information between the drug prescription information and the at least a portion of the ECG data. In some examples, the at least one alert criterion can include a threshold for at least one ECG metric selected by the HCP. In some examples, the at least one ECG metric can be a heart rate measurement for the heart failure patient for a monitored period of time. In some examples, the monitored period of time can be associated with at least one of a prescribed activity period for the heart failure patient, a spontaneous activity period for the heart failure patient, and a rest period for the heart failure patient.

In some examples of the method, the method can further include determining, by the at least one processor, relationship information between the drug prescription information and the at least a portion of the ECG data; analyzing, by the at least one processor, the at least one trend to determine a mathematical model that represents at least a portion of the relationship information; determining, by the at least one processor, at least one patient recommendation for a future period of time based upon the mathematical model; and augmenting, by the at least one processor, the graphical representation to include at least a portion of the at least one patient recommendation. In some examples, the at least one patient recommendation can include at least one of a recommended change in the drug prescription information for the heart failure patient, a recommended settings change to the ambulatory medical device associated with the heart failure patient, and a recommended change in an activity level of the heart failure patient.

In some examples of the method, the graphical representation can include a bar chart showing passage of time on an x-axis of the bar chart and heart rate information on a y-axis of the bar chart.

In some examples of the method, the graphical representation can include at least one of a histogram, a pie chart, a box plot, a scatter plot, a heat map, and a contour plot.

In at least one example, a method is provided. The method includes detecting, by a plurality of sensing electrodes configured to be coupled externally to a heart failure patient, ECG data for the heart failure patient; storing, by a memory operably coupled to the plurality of sensing electrodes, the ECG data for the heart failure patient as well as drug prescription information including a drug administered to the heart failure patient and corresponding dosage and dosage times for the heart failure patient; selecting, by at least one processor operably coupled to the memory and the plurality of sensing electrodes, a period of time over which to review the drug prescription information and the ECG data, retrieving, by at least one processor, the ECG data from the memory for the selected period of time, deriving, by at least one processor, one or more ECG metrics from the ECG data including at least one heart rate parameter, and generating, by at least one processor, a graphical representation indicating at least one trend in the ECG metrics including the at least one heart rate parameter relative to changes in at least one of the drug administered to the heart failure patient, the corresponding dosage, and the dosage times for the heart failure patient; and outputting, by output circuitry operably coupled to the at least one processor, the graphical representation.

Implementations of the method may include one or more of the following features.

In some examples of the method, the method can further include receiving, by at least one network interface operably coupled to the at least one processor, the drug prescription information from a computing device associated with a healthcare provider. In some examples, the method can further include transmitting, by the output circuitry, the graphical representation to the computing device associated with the healthcare provider via the at least one network interface.

In some examples of the method, the graphical representation can further indicate any therapy shocks delivered to the patient during the selected period of time.

In some examples of the method, the selected period of time can include a default period of time including at least one of 24 hours, 48 hours, 72 hours, one week, and two weeks.

In some examples of the method, the selected period of time can include a user-specified period of time received from a healthcare provider.

In some examples of the method, the drug administered to the heart failure patient can include at least one of acebutolol, atenolol, carvedilol, metoprolol, nadolol, and propranolol. In some examples, the corresponding dosage and dosage times for the drug administered to the heart failure patient can include at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

In some examples of the method, deriving the one or more ECG metrics can include deriving the one or more ECG metrics as a single value representative of the selected period of time.

In some examples of the method, deriving the one or more ECG metrics can include deriving the one or more ECG metrics as a series of values that correspond to subperiods within the selected period of time.

In some examples of the method, the method can further include receiving, by the at least one processor, updated drug prescription information including an updated corresponding dosage amount for the heart failure patient from a computing device associated with a healthcare provider. In some examples, the method further includes selecting, by the at least one processor, an updated period of time over which to review the received updated drug prescription information and the ECG data from the ambulatory medical device; retrieving, by the at least one processor, the ECG data from the memory for the selected updated period of time; deriving, by the at least one processor, one or more updated ECG metrics from the ECG data including at least one heart rate parameter; and generating, by the at least one processor, an updated graphical representation indicating at least one additional trend in the ECG metrics including the at least one heart rate parameter relative to changes in the updated corresponding dosage amount for the heart failure patient.

In some examples of the method, the one or more ECG metrics including at least one heart rate parameter can include at least one of heart rate, heart rate variability, PVC burden or counts, atrial fibrillation burden, pauses, heart rate turbulence, QRS height, QRS width, changes in a size or shape of morphology of the ECG data, cosine R-T, artificial pacing, QT interval, QT variability, T wave width, T wave alternans, T-wave variability, and ST segment changes.

In some examples of the method, the method can further include receiving, by the at least one processor, at least one alert criterion for triggering an alert relating to the ECG data and the drug prescription information to be sent to a healthcare provider. In some examples, the method further includes generating, by the at least one processor, the alert to be sent to the healthcare provider, the alert including an indication that the at least one alert criterion was detected and relationship information between the drug prescription information and the at least a portion of the ECG data.

In at least one example, a method is provided. The method includes storing, by a memory, a drug titration learning model trained using a training data set including historical ECG metrics, drug identifiers, dosage measurements, and heart rates to output at least one learning model output; receiving, by at least one network interface operably coupled to the memory, drug prescription information for a heart failure patient from a computing device associated with an HCP; receiving, by the at least one network interface, ECG information from an ambulatory medical device associated with the heart failure patient; transforming, by at least one processor operably coupled to the memory and the at least one network interface, the received drug prescription information into a predetermined drug dosage data format for input to the drug titration learning model; generating, by the at least one processor, the at least one of a predicted heart rate and a drug recommendation by executing the drug titration learning model stored in the memory; generating, by the at least one processor, a user-readable output for the HCP, the user-readable output including information relating to the at least one learning model output; and providing, by output circuitry operably coupled to the at least one processor, the user-readable output.

Implementations of the method may include one or more of the following features.

In some examples of the method, the drug titration learning model can include a plurality of drug titration learning model parameters, weights, and vectors. In some examples, the method can further include validating the drug titration learning model using a validation data set of historical ECG metrics, drug identifiers, dosage measurements, and heart rates. In some examples, the method can further include training the drug titration learning model using a training data set including at least one ECG metric extracted from raw patient ECG signals. In some examples, the at least one ECG metric extracted from the raw patient ECG signals can include at least one of heart rate and heart rate variability.

In some examples of the method, the at least one learning model output can include at least one of the predicted heart rate and the drug recommendation. In some examples, the user-readable output can include information relating to at least one of the predicted heart rate and the drug recommendation.

In some examples of the method, the method can further include storing, by the memory, at least one of a sensitivity parameter and a specificity parameter for the drug titration learning model. In some examples, the method can further include providing, by the at least one processor, a user interface to a user to permit changes to the at least one of the sensitivity parameter and the specificity parameter for the drug titration learning model.

In at least one example, a non-transitory computer-readable medium is provided. The non-transitory computer-readable medium has computer-executable instructions stored thereon that, when executed by one or more processors, cause the one or more processors to select a period of time over which to review drug prescription information received from a computing device associated with an HCP and ECG data received from an ambulatory medical device associated with a heart failure patient, wherein the drug prescription information includes a drug administered to the heart failure patient and corresponding dosage and dosage times; retrieve the received ECG data for the selected period of time; derive one or more ECG metrics including at least one heart rate parameter from the ECG data; generate a graphical representation indicating at least one trend in the one or more ECG metrics including the at least one heart rate parameter relative to changes in at least one of the drug administered to the heart failure patient, the corresponding dosage, and the corresponding dosage times for the heart failure patient; and output the graphical representation to output circuitry operably coupled to the one or more processors.

Implementations of the non-transitory computer-readable medium may include one or more of the following features.

In some examples of the non-transitory computer-readable medium, the selected period of time can include a default period of time including at least one of 24 hours, 48 hours, 72 hours, one week, and two weeks.

In some examples of the non-transitory computer-readable medium, the selected period of time can include a user-specified period of time received from the HCP.

In some examples of the non-transitory computer-readable medium, the drug administered to the heart failure patient can include at least one of acebutolol, atenolol, carvedilol, metoprolol, nadolol, and propranolol. In some examples, the corresponding dosage and dosage times for the drug administered to the heart failure patient can include at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

In some examples of the non-transitory computer-readable medium, the computer-executable instructions that, when executed, cause the one or more processors to derive the one or more ECG metrics can include additional instructions that, when executed, cause the one or more processors to derive the one or more ECG metrics as a single value representative of the selected period of time.

In some examples of the non-transitory computer-readable medium, the computer-executable instructions that, when executed, cause the one or more processors to derive the one or more ECG metrics can include additional instructions that, when executed, cause the one or more processors to derive the one or more ECG metrics as a series of values that correspond to subperiods within the selected period of time.

In some examples of the non-transitory computer-readable medium, the computer-executable instructions can further include additional instructions that, when executed by the one or more processors, cause the one or more processors to receive updated drug prescription information including an updated corresponding dosage amount for the heart failure patient from the computing device associated with the HCP. In some examples, the computer-executable instructions can further include additional instructions that, when executed by the one or more processors, cause the one or more processors to select an updated period of time over which to review the received updated drug prescription information and the ECG data from the ambulatory medical device, retrieve the ECG data from the memory for the selected updated period of time; derive one or more updated ECG metrics from the ECG data including at least one heart rate parameter, and generate an updated graphical representation indicating at least one additional trend in the ECG metrics including the at least one heart rate parameter relative to changes in the updated corresponding dosage amount for the heart failure patient.

In some examples of the non-transitory computer-readable medium, the one or more ECG metrics including at least one heart rate parameter can include at least one of heart rate, heart rate variability, PVC burden or counts, atrial fibrillation burden, pauses, heart rate turbulence, QRS height, QRS width, changes in a size or shape of morphology of the ECG data, cosine R-T, artificial pacing, QT interval, QT variability, T wave width, T wave alternans, T-wave variability, and ST segment changes.

In some examples of the non-transitory computer-readable medium, the computer-executable instructions can further include additional instructions that, when executed by the one or more processors, cause the one or more processors to receive at least one alert criterion for triggering an alert relating to the ECG data and the drug prescription information to be sent to the HCP. In some examples, the computer-executable instructions can further include additional instructions that, when executed by the one or more processors, cause the one or more processors to generate the alert to be sent to the HCP, the alert including an indication that the at least one alert criterion was detected and relationship information between the drug prescription information and the at least a portion of the ECG data. In some examples, the at least one alert criterion can include a threshold for at least one ECG metric selected by the HCP. In some examples, the at least one ECG metric can be a heart rate measurement for the heart failure patient for a monitored period of time. In some examples, the monitored period of time can be associated with at least one of a prescribed activity period for the heart failure patient, a spontaneous activity period for the heart failure patient, and a rest period for the heart failure patient.

In some examples of the non-transitory computer-readable medium, the computer-executable instructions can further include additional instructions that, when executed by the one or more processors, cause the one or more processors to determine relationship information between the drug prescription information and the at least a portion of the ECG data, analyze the at least one trend to determine a mathematical model that represents at least a portion of the relationship information, determine at least one patient recommendation for a future period of time based upon the mathematical model, and augment the graphical representation to include at least a portion of the at least one patient recommendation.

In some examples of the non-transitory computer-readable medium, the at least one patient recommendation can include at least one of a recommended change in the drug prescription information for the heart failure patient, a recommended settings change to the ambulatory medical device associated with the heart failure patient, and a recommended change in an activity level of the heart failure patient.

In some examples of the non-transitory computer-readable medium, the graphical representation can include a bar chart showing passage of time on an x-axis of the bar chart and heart rate information on a y-axis of the bar chart.

In some examples of the non-transitory computer-readable medium, the graphical representation can include at least one of a histogram, a pie chart, a box plot, a scatter plot, a heat map, and a contour plot.

In at least one example, a non-transitory computer-readable medium is provided. The non-transitory computer-readable medium has computer-executable instructions stored thereon that, when executed by one or more processors, cause the one or more processors to store ECG data for a heart failure patient detected by a plurality of sensing electrodes configured to be coupled externally to the heart failure patient, store drug prescription information including a drug administered to the heart failure patient and corresponding dosage and dosage times for the heart failure patient, select a period of time over which to review the drug prescription information and ECG data, retrieve the ECG data from the memory for the selected period of time, derive one or more ECG metrics from the ECG data including at least one heart rate parameter, generate a graphical representation indicating at least one trend in the ECG metrics including the at least one heart rate parameter relative to changes in at least one of the drug administered to the heart failure patient, the corresponding dosage, and the dosage times for the heart failure patient, and output the graphical representation to output circuitry operably coupled to the one or more processors.

Implementations of the non-transitory computer-readable medium may include one or more of the following features.

In some examples of the non-transitory computer-readable medium, the computer-executable instructions can further include additional instructions that, when executed by the one or more processors, cause the one or more processors to receive the drug prescription information from a computing device associated with a healthcare provider. In some examples, the computer-executable instructions can further include additional instructions that, when executed by the one or more processors, cause the one or more processors to transmit, via the output circuitry, the graphical representation to the computing device associated with the healthcare provider via the at least one network interface.

In some examples of the non-transitory computer-readable medium, the graphical representation can further indicate any therapy shocks delivered to the patient during the selected period of time.

In some examples of the non-transitory computer-readable medium, the selected period of time can include a default period of time including at least one of 24 hours, 48 hours, 72 hours, one week, and two weeks.

In some examples of the non-transitory computer-readable medium, the selected period of time can include a user-specified period of time received from a healthcare provider.

In some examples of the non-transitory computer-readable medium, the drug administered to the heart failure patient can include at least one of acebutolol, atenolol, carvedilol, metoprolol, nadolol, and propranolol. In some examples, the corresponding dosage and dosage times for the drug administered to the heart failure patient can include at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

In some examples of the non-transitory computer-readable medium, the computer-executable instructions that, when executed, cause the one or more processors to derive the one or more ECG metrics can include additional instructions that, when executed, cause the one or more processors to derive the one or more ECG metrics as a single value representative of the selected period of time.

In some examples of the non-transitory computer-readable medium, the computer-executable instructions that, when executed, cause the one or more processors to derive the one or more ECG metrics can include additional instructions that, when executed, cause the one or more processors to derive the one or more ECG metrics as a series of values that correspond to subperiods within the selected period of time.

In some examples of the non-transitory computer-readable medium, the computer-executable instructions can further include additional instructions that, when executed by the one or more processors, cause the one or more processors to receive updated drug prescription information including an updated corresponding dosage amount for the heart failure patient from a computing device associated with a healthcare provider.

In some examples, the computer-executable instructions can further include additional instructions that, when executed by the one or more processors, cause the one or more processors to select an updated period of time over which to review the received updated drug prescription information and the ECG data from the ambulatory medical device, retrieve the ECG data from the memory for the selected updated period of time, derive one or more updated ECG metrics from the ECG data including at least one heart rate parameter, and generate an updated graphical representation indicating at least one additional trend in the ECG metrics including the at least one heart rate parameter relative to changes in the updated corresponding dosage amount for the heart failure patient.

In some examples of the non-transitory computer-readable medium, the one or more ECG metrics including at least one heart rate parameter can include at least one of heart rate, heart rate variability, PVC burden or counts, atrial fibrillation burden, pauses, heart rate turbulence, QRS height, QRS width, changes in a size or shape of morphology of the ECG data, cosine R-T, artificial pacing, QT interval, QT variability, T wave width, T wave alternans, T-wave variability, and ST segment changes.

In some examples of the non-transitory computer-readable medium, the computer-executable instructions can further include additional instructions that, when executed by the one or more processors, cause the one or more processors to receive at least one alert criterion for triggering an alert relating to the ECG data and the drug prescription information to be sent to a healthcare provider. In some examples, the computer-executable instructions can further include additional instructions that, when executed by the one or more processors, cause the one or more processors to generate the alert to be sent to the healthcare provider, the alert including an indication that the at least one alert criterion was detected and relationship information between the drug prescription information and the at least a portion of the ECG data.

In at least one example, a non-transitory computer-readable medium is provided. The non-transitory computer-readable medium has computer-executable instructions stored thereon that, when executed by one or more processors, cause the one or more processors to store a drug titration learning model trained using a training data set including historical ECG metrics, drug identifiers, dosage measurements, and heart rates to output at least one learning model output, receive drug prescription information for a heart failure patient from a computing device associated with an HCP, receive ECG information from an ambulatory medical device associated with the heart failure patient, transform the received drug prescription information into a predetermined drug dosage data format for input to the drug titration learning model, generate the at least one of a predicted heart rate and a drug recommendation by executing the drug titration learning model stored in the memory, generate a user-readable output for the HCP, the user-readable output including information relating to the at least one learning model output, and provide the user-readable output via output circuitry operably coupled to the at least one processor.

Implementations of the non-transitory computer-readable medium may include one or more of the following features.

In some examples of the non-transitory computer-readable medium, the drug titration learning model can include a plurality of drug titration learning model parameters, weights, and vectors. In some examples, the computer-executable instructions can further include additional instructions that, when executed by the one or more processors, cause the one or more processors to validate the drug titration learning model using a validation data set of historical ECG metrics, drug identifiers, dosage measurements, and heart rates. In some examples, the computer-executable instructions can further include additional instructions that, when executed by the one or more processors, cause the one or more processors to train the drug titration learning model using a training data set including at least one ECG metric extracted from raw patient ECG signals. In some examples, the at least one ECG metric extracted from the raw patient ECG signals can include at least one of heart rate and heart rate variability.

In some examples of the non-transitory computer-readable medium, the at least one learning model output can include at least one of the predicted heart rate and the drug recommendation.

In some examples of the non-transitory computer-readable medium, the user-readable output can include information relating to at least one of the predicted heart rate and the drug recommendation.

In some examples of the non-transitory computer-readable medium, the computer-executable instructions can further include additional instructions that, when executed by the one or more processors, cause the one or more processors to store at least one of a sensitivity parameter and a specificity parameter for the drug titration learning model. In some examples, the computer-executable instructions can further include additional instructions that, when executed by the one or more processors, cause the one or more processors to provide a user interface to a user to permit changes to the at least one of the sensitivity parameter and the specificity parameter for the drug titration learning model.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples and are incorporated in and constitute a part of this specification but are not intended to limit the scope of the disclosure. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

FIG. 8 depicts a sample user interface for use by healthcare professional when selecting alert criteria, in accordance with an example of the present disclosure.

DETAILED DESCRIPTION

Figure 1:
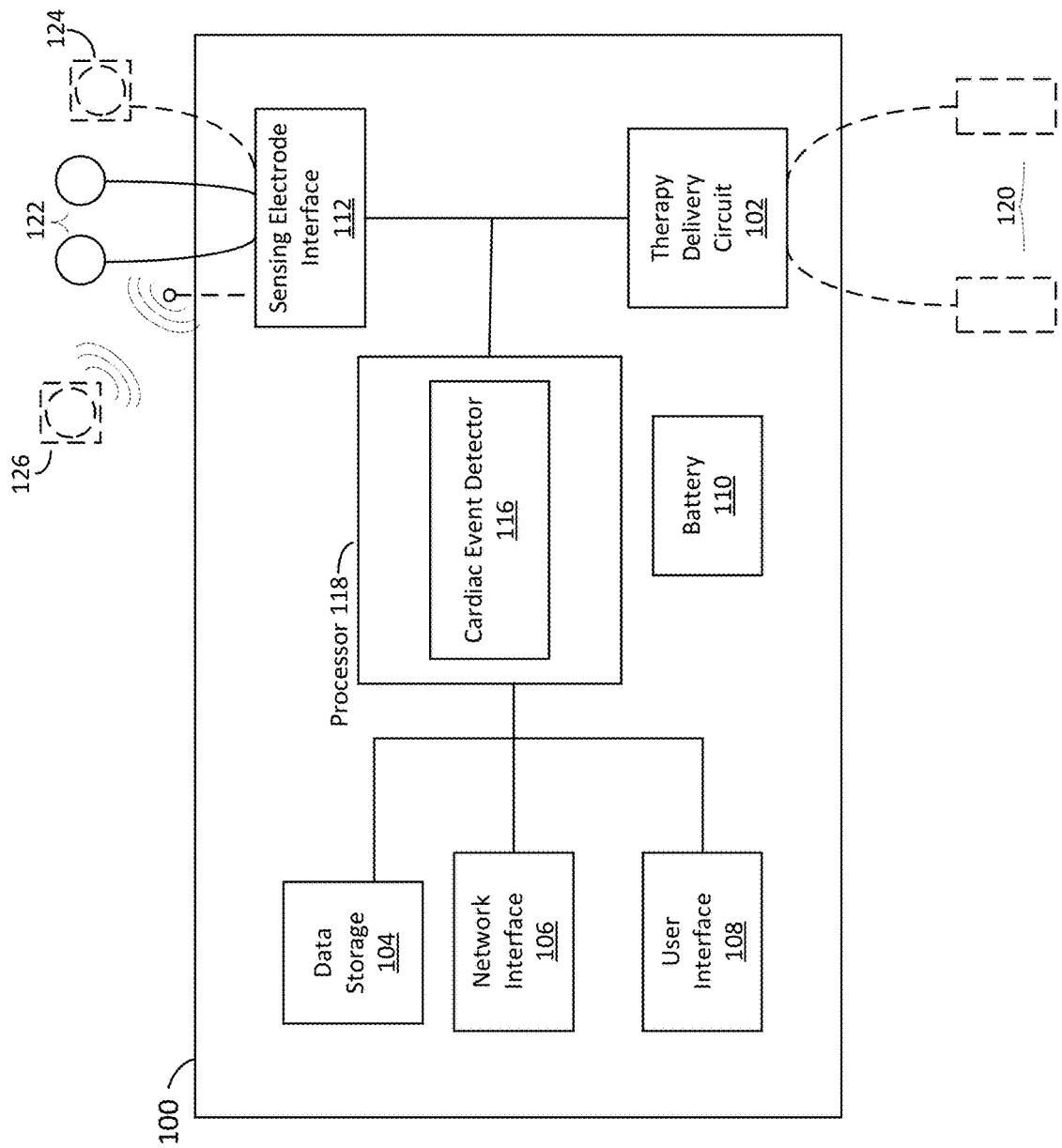
FIG. 1 depicts a schematic view of a sample controller for a wearable medical device, in accordance with an example of the present disclosure.

Wearable medical devices, such as cardiac event monitoring devices, are used in clinical or outpatient settings to monitor and/or record various physiological signals for a patient. These signals can be used to determine a current condition for a patient as well as to predict, plan, and prepare for future adverse events such as cardiac events that may occur or other adverse changes to a patient's medical health. For example, electrocardiogram (ECG) monitoring in combination with a patient's medical history can be used by, for example, a machine learning process to calculate a risk score for a patient and predict, for example, a future occurrence of a potential cardiac arrhythmia event. Examples of such a machine learning process are described in U.S. Patent Application Publication No. 2016/0135706 entitled "Medical Premonitory Event Estimation," which is hereby incorporated herein by reference. Heart failure includes clinical conditions that can result from structural or functional cardiac disorders that impair the ability of the heart to function properly (e.g., ventricles fail to fill with or eject blood completely).

Additionally, for many heart failure patients, one or more drugs are prescribed to the patient to help control or regulate one or more cardiac conditions associated with or resulting from the diagnosed heart failure. For example, a patient may be prescribed a drug such as a beta-blocker to help reduce and regulate their heart rate. Other prescribed drugs may include, but are not limited to, diuretics, ACE-inhibitors, calcium channel blockers, alpha blockers, and other similarly prescribed drugs. These drugs may be prescribed by the health care professional (HCP) that also prescribed the wearable medical device. This initial HCP can include, for example, an interventionist, a heart failure specialist, a cardiologist, a hospitalist, or an associated professional such as a physician's assistant, a nurse practitioner, or another authorized caregiver. However, in some scenarios, the HCP prescribing the initial drug and corresponding dosage may not be the same as the HCP who will be monitoring the patient throughout their treatment. For example, an interventionist and hospitalist may have a role with the patient's initial dosage, but another cardiology HCP may follow the patient through their complete treatment regimen. In certain scenarios, this could create a disconnect between the heart failure patient and the cardiology HCP. Throughout the treatment regimen, traditional data collection and reporting techniques may not provide the patient's cardiology HCP with the information needed to continually monitor patient ECG information. Nor may traditional techniques provide information sufficient to quickly and reliably predict an impact that one or more prescribed drugs and/or associated dosages may have on the patient's physiology, in particular, the patient's cardiac activity as reflected in the ECG information.

For example, heart rate related metrics are understood to be more relevant than other types of ECG metrics to control and regulate for a heart failure patient. Studies have shown that in patients being prescribed a wearable medical device such as a WCD, greater than 53% of patients have a daytime heart rate of greater than 70 bpm after an average 66-day period where the WCD is prescribed, and 8% have a daytime heart rate of greater than 90 bpm. Historic data shows that these patients have worse outcomes long-term than patients whose heart rates have been controlled and regulated to a lower daytime heart rate, e.g., about 60 bpm. One important tool in lowering a patient's heart rate is the use of prescription drugs like beta-blockers. Examples of beta-blockers include acebutolol, atenolol, carvedilol, metoprolol, nadolol, and propranolol. Finding a drug titration point for a beta-blocker involves adjusting the dosage given to the patient while monitoring for maximum benefit while still minimizing adverse side effects. In this regard, the concentration of a particular drug within a prescribed medication for a patient has to be established correctly. For example, to up-titrate (e.g., to increase a concentration of a particular drug or chemical within the patient's prescribed medication) or to down-titrate (e.g., to decrease a concentration of a particular drug or chemical within the patient's prescribed medication), an HCP needs relevant information regarding the patient's response to a current treatment plan in accordance with guideline directed medical treatment (GDMT). GDMT including beta blockers, angiotensin converting enzyme inhibitors (ACE-Is), angiotensin receptor blockers (ARBs) and aldosterone antagonists have been shown to improve outcomes in heart failure patients. Guidelines generally recommend the use of these medication classes at maximally tolerated dosages. Despite the evidence, however, less than 25% of patients with heart failure with reduced left ventricular ejection fraction (HFrEF) are on an appropriate medical regimen titrated to the target doses.

Figure 17:
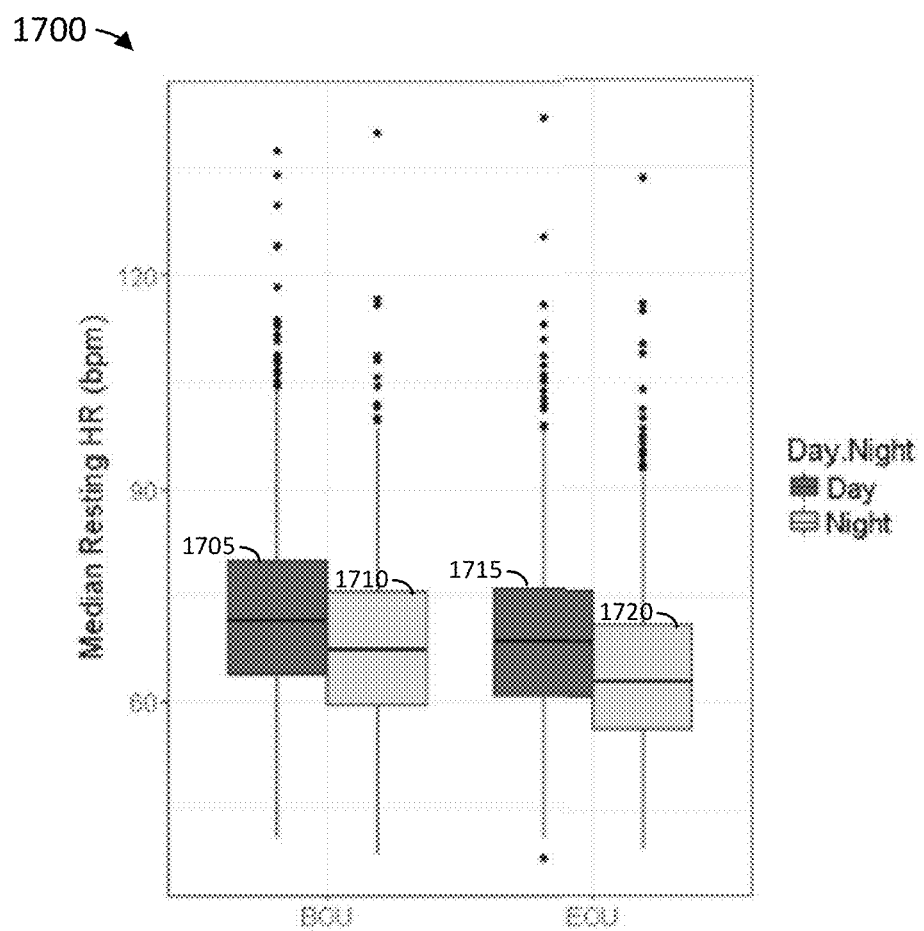
FIG. 17 depicts a box plot showing changes in resting heart rate values during a clinical study as described herein.

In another study, "Achieving Guideline-Directed Heart Rate Control Early Posthospitalization," by Jungbauer et al., which is hereby incorporated herein by reference, the benefits of reaching titration of a beta-blocker during treatment for heart failure is shown. Achieving a target resting heart rate of less than 70 BPM has been shown to be associated with improved clinical outcomes. The purpose of the study was to gauge the ability to achieve guide-line directed medical therapy heart rate control in the early posthospitalization period for heart failure patients that have been prescribed a wearable medical device such as a WCD. During the study, weekly median resting heart rates were reported from the first week of WCD use and the last week of WCD use. For example, as shown in FIG. 17, plot 1700 shows the average resting heart rate for the patient population in the study at the beginning of use (BOU) and the average resting heart rate for the patient population at the end of use (EOU). As shown in the plot 1700, the box 1705 represents the median daytime resting heart rate at the BOU for the patient population, and ranges from about 63 bpm to about 79 bpm. Box 1710 represents the median nighttime resting heart rate at the BOU for the patient population, and ranges from about 60 bpm to about 75 bpm. Box 1715 represents the median daytime resting heart rate at the EOU for the patient population, and ranges from about 60 bpm to about 75 bpm. Box 1720 represents the median nighttime resting heart rate at the EOU for the patient population, and ranges from about 55 bpm to about 70 bpm. During the study, the median WCD use period (i.e., the average period of time between BOU and EOU for the patient population) was 73 days. As shown in plot 1700, in combination with prescribed beta-blockers, the average resting heart rate for the patient population decreased between BOU and EOU.

In a traditional setting, an HCP is limited to whatever information they can obtain from the patient during an office visit. For instance, the patient may self-report or self-monitor symptoms such as heart rate and blood pressure monitoring. Such a traditional approach may require numerous office visits until the HCP is satisfied with the current prescription dosage information. In this disclosure, Applicants describe systems and techniques to address these disadvantages inherent in the conventional patient prescription and monitoring approaches. As described herein, Applicants have developed systems, processes, and techniques for correlating patient cardiac information with drug prescription information that is provided to an HCP as a graphical representation for review and analysis without any additional action on the part of the patient. For example, a monitoring system can include a remote computing device such as a remote server that is configured to receive drug prescription information from an HCP. The drug prescription information can include an identifier of the drug being administered to the patient, a dosage for the prescribed drug, and a regimen for taking the prescribed drug. The remote server is further configured to receive ECG data collected by, for example, a wearable medical device such as a WCD that has been prescribed to the patient. The remote server can then process the drug prescription information as well as the ECG data to generate a graphical representation that illustrates at least one trend in at least one heart rate parameter relative to changes in the drug prescription information. For example, the graphical representation can include changes in heart rate information as charted over a period of time with corresponding drug prescription information overlaid on the chart. This graphical representation can provide an HCP with information on how a patient is currently reacting to the drug regimen, how the patient reacted to previous drug regimens with varying dosages and dosage times, and how those factors impacted the patient's heart rate.

For example, with beta-blockers, the devices, systems and techniques described herein provide a tool to allow for optimal titration of the drug given available physiological, medical history, and cardiac health information on the patient. Such optimal titration can include an initial drug dosage based on monitored changes in the patient's heart rate after a period of time. For example, the tool may provide an output prescribed a patient 3.125 mg of a beta-blocker to be taken twice daily. After a week, the tool may review trends in the patient's ECG data during the week and adjust the dosage accordingly. In this manner, the tool can assess whether the patient has reached a drug titration point where the beta-blocker is providing a maximum benefit.

In an example, a system for providing ECG information to an HCP can include at least one network interface configured to receive drug prescription information from a computing device associated with the HCP. The drug prescription information can include a drug administered to a heart failure patient and corresponding dosage and dosage times. The network interface can be further configured to receive ECG data from an ambulatory medical device associated with the heart failure patient. The system can further include a memory operably coupled to the network interface. The memory can be configured to store the drug prescription information and the ECG data. The system can further include at least one processor operably coupled to the memory and the at least one network interface. The at least one processor can be configured to select a period of time over which to review the received drug prescription information and the received ECG data. The at least one processor can be further configured to retrieve, from the memory, the received ECG data for the selected period of time; derive, from the ECG data, one or more ECG metrics including at least one heart rate parameter; and generate a graphical representation indicating at least one trend in the one or more ECG metrics. The graphical representation can include indications of the at least one heart rate parameter relative to changes in at least one of the drug administered to the heart failure patient, the corresponding dosage, and the corresponding dosage times for the heart failure patient. The system can further include output circuitry operably coupled to the at least one processor and configured to output the graphical representation to, for example, the computing device associated with the HCP.

In addition to providing a graphical representation of current ECG data and drug prescription information data, techniques for predictive analytics and trends analysis are described herein. For example, techniques for predicting the outcome of a proposed change in medication and/or dosage information, providing a recommended medication and/or dosage information to achieve a desired outcome, and personalize predictions and recommendations for a particular patient are also described herein.

In an example, a system can include a memory configured to store a drug titration learning model trained using a training data set comprising historical ECG metrics, drug identifiers, dosage measurements, and heart rates to output at least one learning model output. The system can further include at least one network interface configured to receive drug prescription information for a heart failure patient from a computing device associated with an HCP and receive ECG information from an ambulatory medical device associated with the heart failure patient. The system also includes at least one processor operably coupled to the memory and the at least one network interface, the at least one processor configured to transform the received drug prescription information into a predetermined drug dosage data format for input to the drug titration learning model, generate the at least one of a predicted heart rate and a drug recommendation by executing the drug titration learning model stored in the memory, and generate a user-readable output for the HCP, the user-readable output comprising information relating to the at least one learning model output. The system also includes output circuitry operably coupled to the at least one processor and configured to provide the user-readable output.

In an example, methods, devices, and systems as disclosed herein can provide informational alerts to HCPs regarding the patients' heart rate status, including information indicating whether the patients' heart rates are under control in accordance with an appropriate GDMT. For example, an informational alert can take the form of a physician alert 900, 920, and/or 940 as shown, for example, in FIGS. 9A-C and described below. In implementations, such alerts can include information in addition to heart rate control information. For example, the alert can include information about one or more cardiac events such as bradycardia, tachycardia, and/or pause events in the preceding heart rate control period over which heart rate control information is provided (e.g., prior 3 days, nights, or other predetermined period). Alternatively or additionally, the alert can include compliance and/or wear time information over the preceding period over which heart rate control information is provided. Such information can help HCP adjust the patient's drug dosage and/or titration to achieve GDMT.

These examples, and various other similar examples of benefits and advantages of the techniques, processes, and approaches as provided herein, are described in additional detail below.

Patient monitoring and treatment devices are used to monitor and record various physiological or vital signals for a patient and provide treatment to a patient when necessary. For patients at risk of a cardiac arrhythmia, specialized cardiac monitoring and/or treatment devices such as a cardiac event monitoring device, a wearable cardioverter defibrillator (WCD), or a hospital wearable defibrillator can be prescribed to and worn by the patient for an extended period of time. For example, a patient having an elevated risk of sudden cardiac death, unexplained syncope, prior symptoms of heart failure, an ejection fraction of less than 45%, less than 35%, or other such threshold deemed of concern by a physician, and other similar patients in a state of degraded cardiac health can be prescribed a specialized cardiac monitoring and/or treatment device.

For example, a WCD such as the LifeVest® Wearable Cardioverter Defibrillator from ZOLL Medical Corporation (Chelmsford, MA), can be prescribed to the patient. As described in further detail below, such a device includes a garment that is configured to be worn about the torso of the patient. The garment can be configured to house various components such as ECG sensing electrodes and therapy electrodes. The components in the garment can be operably connected to a monitoring device that is configured to receive and process signals from the ECG sensing electrodes to determine a current cardiac condition of the patient and, if necessary, provide treatment to the patient using the therapy electrodes.

FIG. 1 illustrates an example component-level view of the medical device controller 100 included in, for example, a wearable medical device such as a WCD. As shown in FIG. 1, the medical device controller 100 can include a therapy delivery circuitry 102, a data storage 104, a network interface 106, a user interface 108, at least one battery 110, a sensor interface 112, a cardiac event detector 116, and least one processor 118. In some examples, the patient monitoring medical device can include a medical device controller 100 that includes like components as those described above but does not include the therapy delivery circuitry 102 (shown in dotted lines).

The therapy delivery circuitry 102 can be coupled to one or more electrodes 120 configured to provide therapy to the patient. For example, the therapy delivery circuitry 102 can include, or be operably connected to, circuitry components that are configured to generate and provide the therapeutic shock. The circuitry components can include, for example, resistors, capacitors, relays and/or switches, electrical bridges such as an h-bridge (e.g., including a plurality of insulated gate bipolar transistors or IGBTs), voltage and/or current measuring components, and other similar circuitry components arranged and connected such that the circuitry components work in concert with the therapy delivery circuitry and under control of one or more processors (e.g., processor 118) to provide, for example, at least one therapeutic shock to the patient including one or more pacing or defibrillation therapeutic pulses.

Pacing pulses can be used to treat cardiac arrhythmia conditions such as bradycardia (e.g., less than 30 beats per minute) and tachycardia (e.g., more than 150 beats per minute) using, for example, fixed rate pacing, demand pacing, anti-tachycardia pacing, and the like. Defibrillation pulses can be used to treat ventricular tachycardia and/or ventricular fibrillation.

The capacitors can include a parallel-connected capacitor bank consisting of a plurality of capacitors (e.g., two, three, four or more capacitors). In some examples, the capacitors can include a single film or electrolytic capacitor as a series connected device including a bank of the same capacitors. These capacitors can be switched into a series connection during discharge for a defibrillation pulse. For example, a single capacitor of approximately 140 uF or larger, or four capacitors of approximately 650 uF can be used. The capacitors can have a 1600 VDC or higher rating for a single capacitor, or a surge rating between approximately 350 to 500 VDC for paralleled capacitors and can be charged in approximately 15 to 30 seconds from a battery pack.

For example, each defibrillation pulse can deliver between 60 to 180 joules of energy. In some implementations, the defibrillating pulse can be a biphasic truncated exponential waveform, whereby the signal can switch between a positive and a negative portion (e.g., charge directions). This type of waveform can be effective at defibrillating patients at lower energy levels when compared to other types of defibrillation pulses (e.g., such as monophasic pulses). For example, an amplitude and a width of the two phases of the energy waveform can be automatically adjusted to deliver a precise energy amount (e.g., 150 joules) regardless of the patient's body impedance. The therapy delivery circuitry 102 can be configured to perform the switching and pulse delivery operations, e.g., under control of the processor 118. As the energy is delivered to the patient, the amount of energy being delivered can be tracked. For example, the amount of energy can be kept to a predetermined constant value even as the pulse waveform is dynamically controlled based on factors such as the patient's body impedance which the pulse is being delivered.

The data storage 104 can include one or more of non-transitory computer-readable media, such as flash memory, solid state memory, magnetic memory, optical memory, cache memory, combinations thereof, and others. The data storage 104 can be configured to store executable instructions and data used for operation of the medical device controller 100. In certain examples, the data storage can include executable instructions that, when executed, are configured to cause the processor 118 to perform one or more operations. In some examples, the data storage 104 can be configured to store information such as ECG data as received from, for example, the sensing electrode interface. In some implementations, the data storage 104 can be configured to store drug prescription information entered into the medical device controller 100 via the user interface 108, for example, or received from a remote computing device via the network interface 106.

In some examples, the network interface 106 can facilitate the communication of information between the medical device controller 100 and one or more other devices or entities over a communications network. For example, where the medical device controller 100 is included in an ambulatory medical device, the network interface 106 can be configured to communicate with a remote computing device such as a remote server or other similar computing device. The network interface 106 can include communications circuitry for transmitting data in accordance with a Bluetooth® wireless standard for exchanging such data over short distances to an intermediary device. For example, such an intermediary device can be configured as a base station, a "hotspot" device, a smartphone, a tablet, a portable computing device, and/or other devices in proximity of the wearable medical device including the medical device controller 100. The intermediary device(s) may in turn communicate the data to a remote server over a broadband cellular network communications link. The communications link may implement broadband cellular technology (e.g., 2.5G, 2.75G, 3G, 4G, 5G cellular standards) and/or Long-Term Evolution (LTE) technology or GSM/EDGE and UMTS/HSPA technologies for high-speed wireless communication. In some implementations, the intermediary device(s) may communicate with a remote server over a Wi-Fi™ communications link based on the IEEE 802.11 standard.

In certain examples, the user interface 108 can include one or more physical interface devices such as input devices, output devices, and combination input/output devices and a software stack configured to drive operation of the devices. These user interface elements can render visual, audio, and/or tactile content. Thus, the user interface 108 can receive input or provide output, thereby enabling a user to interact with the medical device controller 100.

The medical device controller 100 can also include at least one battery 110 configured to provide power to one or more components integrated in the medical device controller 100. The battery 110 can include a rechargeable multi-cell battery pack. In one example implementation, the battery 110 can include three or more 2200 mAh lithium ion cells that provide electrical power to the other device components within the medical device controller 100. For example, the battery 110 can provide its power output in a range of between 20 mA to 1000 mA (e.g., 40 mA) output and can support 24 hours, 48 hours, 72 hours, or more, of runtime between charges. In certain implementations, the battery capacity, runtime, and type (e.g., lithium ion, nickel-cadmium, or nickel-metal hydride) can be changed to best fit the specific application of the medical device controller 100.

The sensor interface 112 can include physiological signal circuitry that is coupled to one or more sensors configured to monitor one or more physiological parameters of the patient. As shown, the sensors can be coupled to the medical device controller 100 via a wired or wireless connection. The sensors can include one or more sensing electrodes 122, vibration sensor 124, and tissue fluid monitors 126 (e.g., based on ultra-wide band radiofrequency devices). In some implementations, the sensors can include a plurality of conventional ECG sensing electrodes in addition to digital sensing electrodes.

The sensing electrodes 122 can be configured to monitor a patient's ECG information. For example, by design, the digital sensing electrodes 122 can include skin-contacting electrode surfaces that may be deemed polarizable or non-polarizable depending on a variety of factors including the metals and/or coatings used in constructing the electrode surface. All such electrodes can be used with the principles, techniques, devices and systems described herein. For example, the electrode surfaces can be based on stainless steel, noble metals such as platinum, or Ag—AgCl.

In some examples, the electrodes 122 can be used with an electrolytic gel dispersed between the electrode surface and the patient's skin. In certain implementations, the electrodes 122 can be dry electrodes that do not need an electrolytic material. As an example, such a dry electrode can be based on tantalum metal and having a tantalum pentoxide coating as is described above. Such dry electrodes can be more comfortable for long term monitoring applications.

Referring back to FIG. 1, the vibration sensors 124 be configured to detect cardiac or pulmonary vibration information. For example, the vibration sensors 124 can detect a patient's heart valve vibration information. For example, the vibration sensors 124 can be configured to detect cardio-vibrational signal values including any one or all of S1, S2, S3, and S4. From these cardio-vibrational signal values or heart vibration values, certain heart vibration metrics may be calculated, including any one or more of electromechanical activation time (EMAT), percentage of EMAT (% EMAT), systolic dysfunction index (SDI), and left ventricular systolic time (LVST). The vibration sensors 124 can also be configured to detect heart wall motion, for instance, by placement of the sensor in the region of the apical beat. The vibration sensors 124 can include a vibrational sensor configured to detect vibrations from a subject's cardiac and pulmonary system and provide an output signal responsive to the detected vibrations of a targeted organ, for example, being able to detect vibrations generated in the trachea or lungs due to the flow of air during breathing. In certain implementations, additional physiological information can be determined from pulmonary-vibrational signals such as, for example, lung vibration characteristics based on sounds produced within the lungs (e.g., stridor, crackle, etc.). The vibration sensors 124 can also include a multi-channel accelerometer, for example, a three-channel accelerometer configured to sense movement in each of three orthogonal axes such that patient movement/body position can be detected and correlated to detected cardio-vibrations information. The vibration sensors 124 can transmit information descriptive of the cardio-vibrations information to the sensor interface 112 for subsequent analysis.

The tissue fluid monitors 126 can use radio frequency (RF) based techniques to assess fluid levels and accumulation in a patient's body tissue. For example, the tissue fluid monitors 126 can be configured to measure fluid content in the lungs, typically for diagnosis and follow-up of pulmonary edema or lung congestion in heart failure patients. The tissue fluid monitors 126 can include one or more antennas configured to direct RF waves through a patient's tissue and measure output RF signals in response to the waves that have passed through the tissue. In certain implementations, the output RF signals include parameters indicative of a fluid level in the patient's tissue. The tissue fluid monitors 126 can transmit information descriptive of the tissue fluid levels to the sensor interface 112 for subsequent analysis.

In certain implementations, the cardiac event detector 116 can be configured to monitor a patient's ECG signal for an occurrence of a cardiac event such as an arrhythmia or other similar cardiac event. The cardiac event detector can be configured to operate in concert with the processor 118 to execute one or more algorithms to process received ECG signals from, for example, the sensing electrodes 122 and determine the likelihood that a patient is experiencing a cardiac event. The cardiac event detector 116 can be implemented using hardware or a combination of hardware and software. For instance, in some examples, cardiac event detector 116 can be implemented as a software component that is stored within the data storage 104 and executed by the processor 118. In this example, the instructions included in the cardiac event detector 116 can cause the processor 118 to perform one or more algorithms for analyzing a received ECG signal to determine whether an adverse cardiac event is occurring. In other examples, the cardiac event detector 116 can be an application-specific integrated circuit (ASIC) that is coupled to the processor 118 and configured to monitor ECG signals for adverse cardiac event occurrences. Thus, examples of the cardiac event detector 116 are not limited to a particular hardware or software implementation.

In some implementations, the processor 118 includes one or more processors (or one or more processor cores) that each are configured to perform a series of instructions that result in manipulated data and/or control the operation of the other components of the medical device controller 100. In some implementations, when executing a specific process (e.g., cardiac monitoring), the processor 118 can be configured to make specific logic-based determinations based on input data received and be further configured to provide one or more outputs that can be used to control or otherwise inform subsequent processing to be carried out by the processor 118 and/or other processors or circuitry with which processor 118 is communicatively coupled. Thus, the processor 118 reacts to specific input stimulus in a specific way and generates a corresponding output based on that input stimulus. In some example cases, the processor 118 can proceed through a sequence of logical transitions in which various internal register states and/or other bit cell states internal or external to the processor 118 can be set to logic high or logic low. As referred to herein, the processor 118 can be configured to execute a function where software is stored in a data store coupled to the processor 118, the software being configured to cause the processor 118 to proceed through a sequence of various logic decisions that result in the function being executed. The various components that are described herein as being executable by the processor 118 can be implemented in various forms of specialized hardware, software, or a combination thereof. For example, the processor 118 can be a digital signal processor (DSP) such as a 24-bit DSP. The processor 118 can be a multi-core processor, e.g., having two or more processing cores. The processor 118 can be an Advanced RISC Machine (ARM) processor such as a 32-bit ARM processor or a 64-bit ARM processor. The processor 118 can execute an embedded operating system, and include services provided by the operating system that can be used for file system manipulation, display & audio generation, basic networking, firewalling, data encryption and communications.

As noted above, an ambulatory medical device such as a WCD can be designed to include a digital front-end where analog signals sensed by skin-contacting electrode surfaces of a set of digital sensing electrodes are converted to digital signals for processing. Typical ambulatory medical devices with analog front-end configurations use circuitry to accommodate a signal from a high source impedance from the sensing electrode (e.g., having an internal impedance range from approximately 100 Kiloohms to one or more Megaohms). This high source impedance signal is processed and transmitted to a monitoring device such as processor 118 of the controller 100 as described above for further processing. In certain implementations, the monitoring device, or another similar processor such as a microprocessor or another dedicated processor operably coupled to the sensing electrodes, can be configured to receive a common noise signal from each of the sensing electrodes, sum the common noise signals, invert the summed common noise signals and feed the inverted signal back into the patient as a driven ground using, for example, a driven right leg circuit to cancel out common mode signals.

Figure 2:
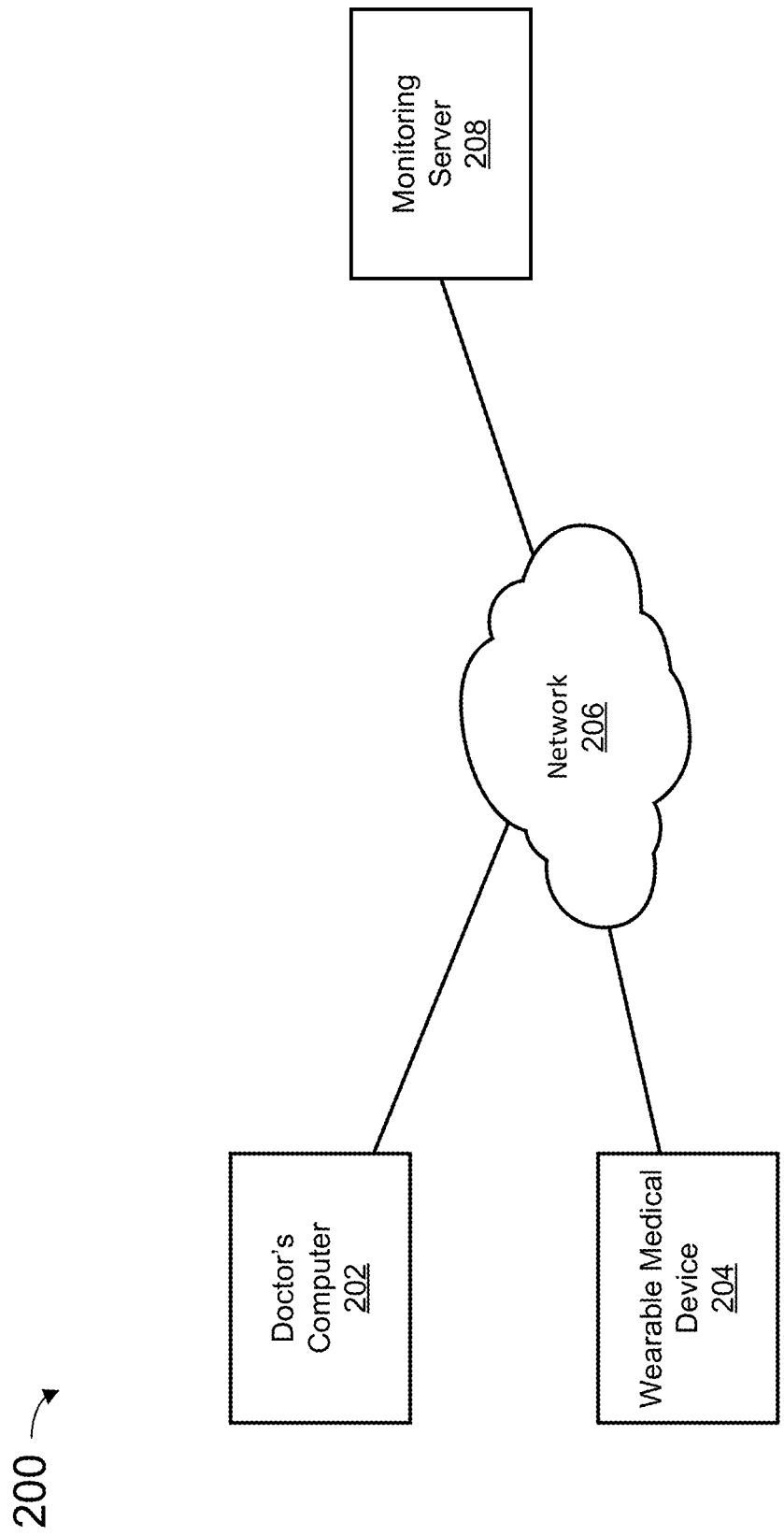
FIG. 2 depicts a sample network overview, in accordance with an example of the present disclosure.

FIG. 2 illustrates a sample network 200 depicting a sample topology illustrating how a wearable medical device (e.g., a medical device including medical device controller 100 as described above) can be operably connected to a remote server. As described above in connection with FIG. 2, the wearable medical device controller 100 includes a network interface 106 for transmitting data over a wireless link such as a Bluetooth® wireless link (e.g., via a "hotspot" or other base station or intermediate device), a broadband cellular link, or a Wi-Fi™ communications link based on the IEEE 802.11 standard. As shown in FIG. 2, a doctor's computer 202 and a wearable medical device 204 can be operably connected to a monitoring server 208 through network 206. In certain implementations, while being worn, the wearable medical device 204 can collect information related to the patient such as various patient metrics and parameters as described herein. For example, the wearable medical device 204 can collect physiological and ECG data related to the patient for the period of time that the patient has been prescribed the wearable medical device. Depending upon the connection to network 206, and the programming of wearable medical device 204, the wearable medical device can be configured to regularly transmit the collected information to the monitoring server 208 for storage and further processing and analysis. The network 206 may be a private, secure network configured to allow for intercommunication between authorized devices 204, computer 202, and server 208. For example, the private network may be implemented as a virtual private network (VPN) that can be formed using a plurality of encrypted communication techniques, including the creation of secure communication channels (called "tunnels") within a public network. As an example, a device 204 or computer 202 may implement a temporary or permanent dedicated communication software application to securely communicate with the server 208 via such a tunnel. The dedicated communication software application can encrypt and send and messages to the server 208 and receive and decrypt messages received from the server 208. Some types of such dedicated communication software applications can embed encrypted messages in formatted data packets, so that the encrypted messages are unreadable from outside of the secure communication channel.

Figure 3:
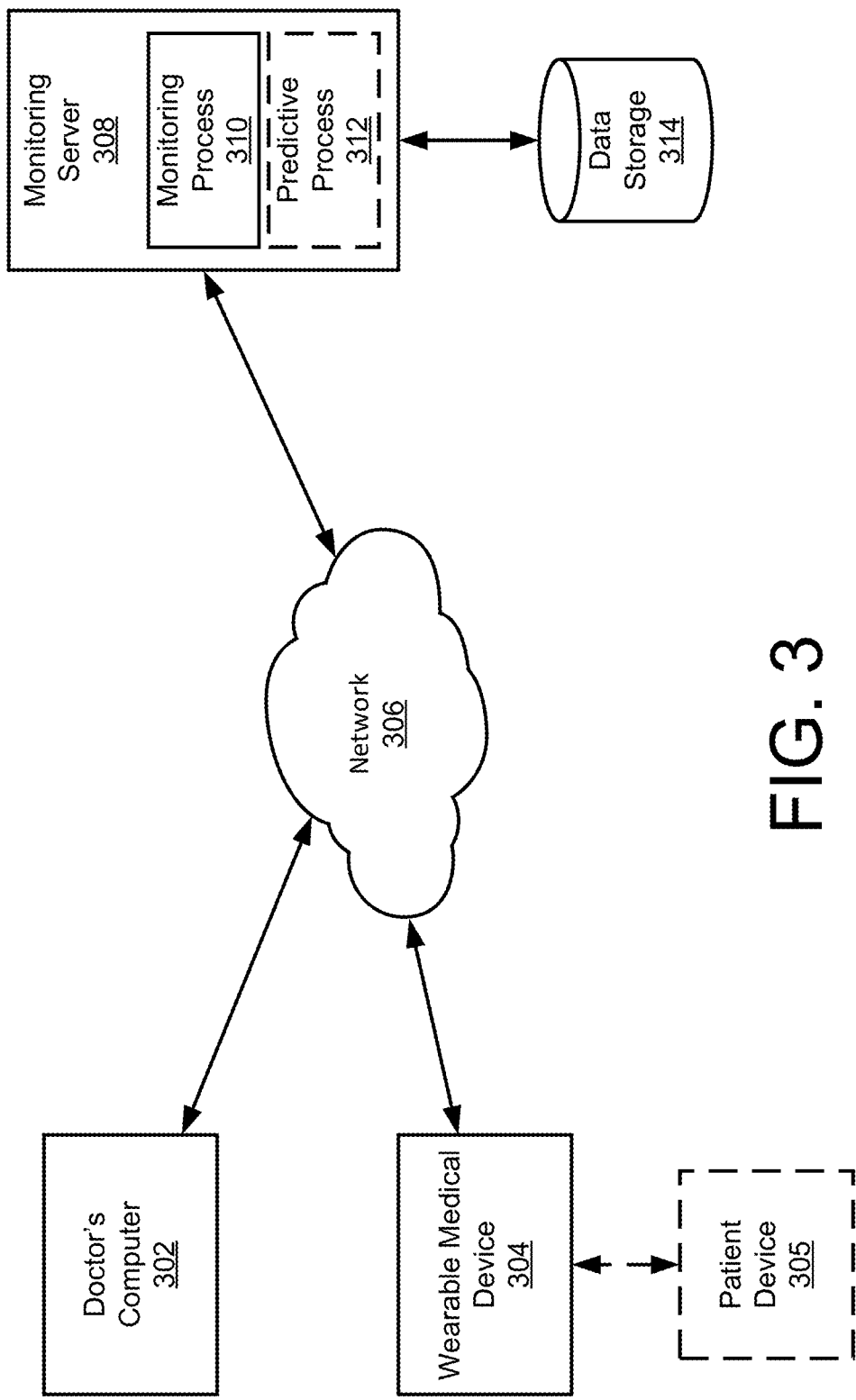
FIG. 3 depicts a second sample network overview, in accordance with an example of the present disclosure.

FIG. 3 illustrates a sample network 300 depicting a sample topology illustrating how a remote server can be operably connected to and configured to collect information from a wearable medical device and a doctor's computing device. Similar to FIG. 2, a doctor's computer 302 and a wearable medical device 304 can be operably connected to a monitoring server 308 through network 306. However, to implement the processes and techniques as described herein, the monitoring server can include a monitoring process 310. The monitoring process 310 can be configured to use information collected from the doctor's computer 302 and/or the wearable medical device 304 to monitor the patient and determine one or more relationships between collected information such as, for example, how drug prescription information may be impacting one or more ECG metrics such as heart rate metrics for the patient. More detail related to the monitoring process is provided in the discussion of FIGS. 5A and 5B below.

In some examples, the monitoring server 308 can also include a predictive process 312. The predictive process 312 can be configured, for example, to use a trained drug titration learning model to provide predictive analytics for a patient. More detail related to the predictive process is provided in the discussions of FIG. 11 below.

In some examples, the various components as included in network 300 can be configured to exchange information. For example, the doctor's computer 302 can be configured to transfer patient information, drug prescription information (including, for example, drug name, dosage amounts, dosage timing information, and other prescription information), alert criteria, patient parameters and/or ECG metrics of interest during monitoring, and other related information to the monitoring server 308 via the network 306. Similarly, the wearable medical device 304 can be configured to transfer data collected by the wearable medical device including, but not limited to, ECG data, motion data, acoustical data, body fluid content information (measured, for example, using radio frequency fluid measurement techniques), alerts, indications of arrhythmia conditions, and other similar information to the monitoring server 308 via the network 306. In certain implementations, the information received from the wearable medical device can include continuously collected information related to the patient. For example, the ECG data can include continuously collected ECG data from which a range of continuous ECG metrics can be derived as described herein. The patient information as collected herein provides for a complete collection of historical data that has been continuously collected and can be further analyzed for any specific time period, e.g., the last 24 hours, last week, two weeks ago, and other similar predefined historical periods as described herein. In some implementations, the ECG data can include discretely recorded ECG strips of predetermined lengths, ranging from a few seconds to several minutes. For instance, the ECG data can include ECG strips of 30 seconds, 1 minute, 2 minutes, 6 minutes, or 10 minutes.

For example, the ECG data can be recorded when a patient experiences and chooses to report a symptom such as fatigue, chest pain, tightness in the chest, a racing heartbeat, dizziness, and/or syncope. In implementations, the ECG data can be automatically recorded when a symptom is detected by processor 118 based on motion data from one or more sensors such as motion sensors. Such symptoms can include changes in a patient's gait, swaying, and patient fall. For example, the processor 118 can detect one or more such symptoms by establishing a baseline of the patient's normal movements over a period of time. Then, when the patient's gait changes from the established baseline in a manner than transgresses a predetermined threshold, the processor 118 can classify the movement as a change in gait and/or abnormal swaying. When such an event is detected, the patient's ECG data is automatically recorded and stored in data storage 104.

In some examples, the wearable medical device can be operably coupled to another patient device 305 such as a patient's computing device. The patient device 305 can be configured to receive data from the wearable medical device 304. In certain implementations, the patient device 305 can include a personal computer, a tablet computer, a smartphone, and other similar computing devices. In some examples, the patient device 305 can be associated with a caregiver that is caring for the patient wearing the wearable medical device 304.

The monitoring server 308 can be operably connected to a data storage device 314 that is configured to store the information received from the doctor's computer 302 and the wearable medical device 304. In some examples, the data storage device 314 can be integrated into the monitoring server 308 (as described in FIG. 4 below as memory 404) or can be integrated into a separate computing device operably coupled to the monitoring server.

Figure 4:
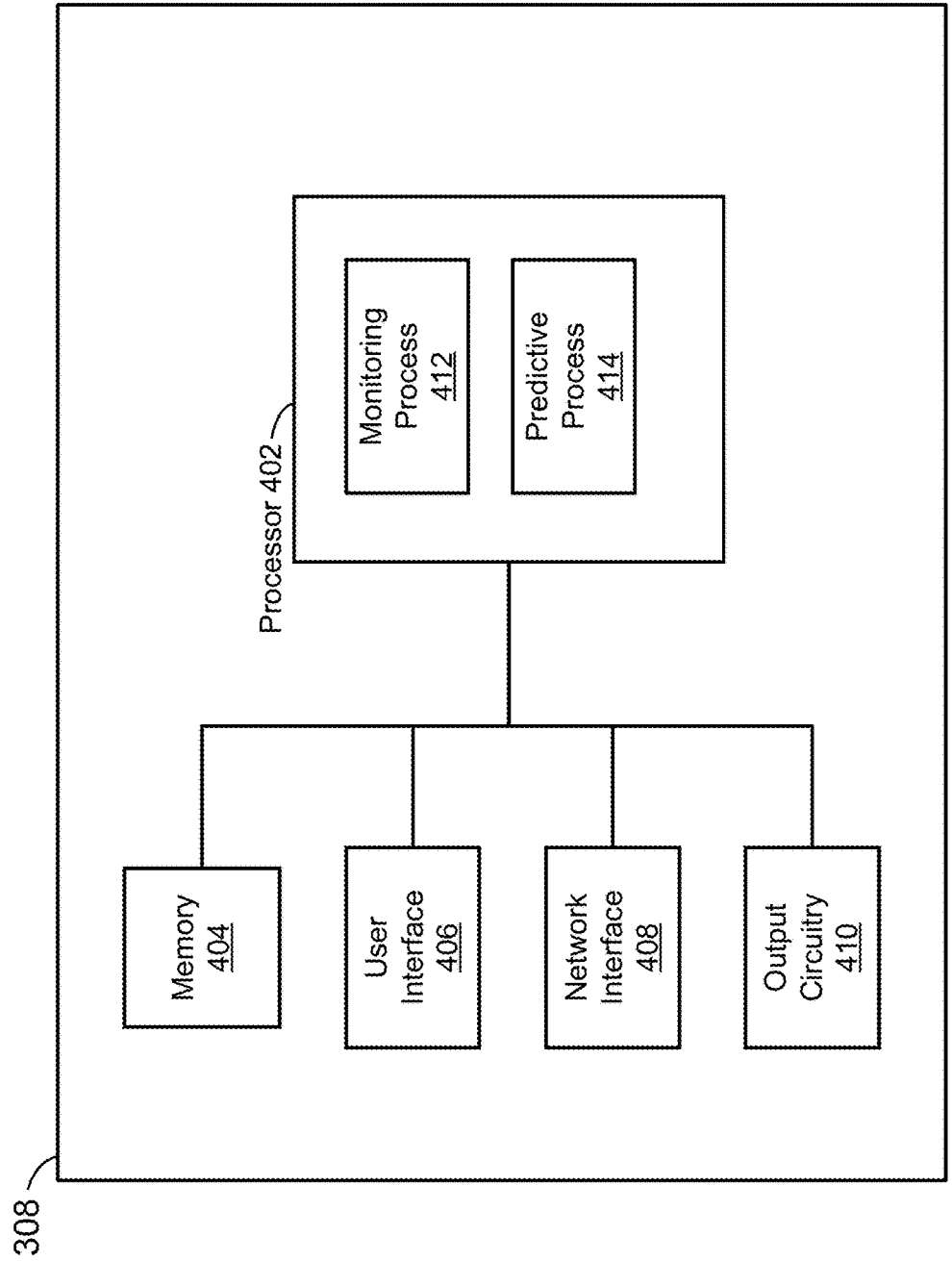
FIG. 4 depicts a schematic view of a remote computing device, in accordance with an example of the present disclosure.

FIG. 4 illustrates a sample architecture of a remote computing device such as monitoring server 308 as described above. As seen in FIG. 4, the monitoring server 308 can include a processor 402, a memory 404, a user interface 406, a network interface 408, and output circuitry 410.

In some implementations, the processor 402 includes one or more processors (or one or more processor cores) that each are configured to perform a series of instructions that result in manipulated data and/or control the operation of the other components of the monitoring server 308. In some implementations, when executing a specific process, the processor 402 can be configured to make specific logic-based determinations based on input data received and be further configured to provide one or more outputs that can be used to control or otherwise inform subsequent processing to be carried out by the processor 402 and/or other processors or circuitry with which processor 402 is communicatively coupled. Thus, the processor 402 reacts to specific input stimulus in a specific way and generates a corresponding output based on that input stimulus. In some example cases, the processor 402 can proceed through a sequence of logical transitions in which various internal register states and/or other bit cell states internal or external to the processor 402 can be set to logic high or logic low. As referred to herein, the processor 402 can be configured to execute a function where software is stored in a data store coupled to the processor 402, the software being configured to cause the processor 402 to proceed through a sequence of various logic decisions that result in the function being executed. The various components that are described herein as being executable by the processor 402 can be implemented in various forms of specialized hardware, software, or a combination thereof. The processor 402 can execute an embedded operating system, and include services provided by the operating system that can be used for file system manipulation, display & audio generation, basic networking, firewalling, data encryption and communications. In some examples, the processor 402 can be configured to process ECG data and drug prescription information and perform the monitoring and/or predictive processes as described herein. For example, as shown in FIG. 4, the processor 402 can be configured to implement one or both of monitoring process 412 and predictive process 414, each of which are discussed in greater detail below.

The memory 404 can include one or more of non-transitory computer-readable media, such as flash memory, solid state memory, magnetic memory, optical memory, cache memory, combinations thereof, and others. The memory 404 can be configured to store executable instructions and data used for operation of the monitoring device 308. In certain examples, the memory 404 can include executable instructions that, when executed, are configured to cause the processor 402 to perform one or more operations. In some examples, the memory 404 can be configured to store information such as ECG data as received from, for example, a wearable medical device such as wearable medical device 304 as shown in FIG. 3. Similarly, in some examples, the memory 404 can be configured to store drug prescription information received from, for example, a doctor's computer such as doctor's computer 302 as shown in FIG. 3.

In certain examples, the user interface 406 can include one or more physical interface devices such as input devices, output devices, and combination input/output devices operably coupled to the user interface and a software stack configured to drive operation of the devices. These user interface elements can render visual, audio, and/or tactile content. Thus, the user interface 406 can receive input or provide output, thereby enabling a user to interact with the monitoring server 308. For example, the user interface 406 can be implemented as one or more remote computing devices configured to interface with the server 308 via the network interface 408. The user interface 406 in such instances can include desktop computers, workstations, laptops, handheld devices, smart phones, smart watches, and/or combination thereof. The user interface 406 is configured to permit technicians or otherwise authorized users to perform a variety of system maintenance, monitoring, or new device/service actions. Such actions can include adding new patients for whom drug prescription information is to be retrieved from one or more of a doctor, hospital, or other caregiver computer network system, adding new devices associated with patients who are newly prescribed one or more cardiac monitoring and/or treatment devices, remotely changing the monitoring and/or treatment parameters of such devices, entering informational, reminder, and/or prescriptive messages that are transmitted to displays associated with the devices for viewing by patients or other persons associated with the patients, monitoring the operational status of devices, querying the devices for the most current ECG, physical activity, and/or other physiological information collected by the devices, remotely adding or changing one or more types of monitoring service implemented by the device (e.g., switching a cardiac monitoring only service to a cardiac monitoring and treatment service), querying a doctor, hospital or other caregiver network system for updated drug prescription information associated with a patient.

In some examples, the network interface 408 can facilitate the communication of information between the monitoring server 308 and one or more other devices or entities over a communications network. For example, in the example as illustrated in FIG. 3, the network interface 408 can be configured to communicate with one or more remote communicating devices such as doctor's computer 302 and wearable medical device 304 via a network such as network 306 using, for example, a wired or wireless connection between the network interface and the network.

In some examples, the output circuitry 410 can facilitate generation of output information to be displayed or otherwise directed to authorized personnel accessing the monitoring server 308. In some examples, the output circuitry 410 can be configured to generate visual representations of information to be displayed on, for example, a display device operably coupled to the user interface 406. In certain implementations, the output circuitry can be configured to generate one or more messages including, for example, alert information, visual representations of information, patient reports, and other similar information for transmission to a remote computing device (e.g., the doctor's computer 302 as shown in FIG. 3) via the network interface. For example, the output circuitry 410 can be configured to provide the server output to one or more remote output devices configured to have a wired or wireless connection with the server 308. The output devices in such instances can include desktop computers, workstations, laptops, handheld devices, smart phones, smart watches, and/or combination thereof.

The processes as described herein can provide for an improved workflow for HCPs as more information is provided to the HCPs on an as-needed or requested basis. Additionally, the processes as described herein provide benefit to both HCPs and patients from improved outcomes that result from timely and actionable presentation of patient information. For example, by providing beta-blocker titration information, an example is provided of using electronic health information to enhance patient outcomes. However, it should be noted that beta-blockers and beta-blocker titration are described herein by way of example only. The concepts as described in regard to the systems, processes, and techniques as described herein can be applied to additionally prescribed drugs including, but not limited to, diuretics, ACE-inhibitors, calcium channel blockers, alpha blockers, and other similarly prescribed drugs.

Figure 5A:
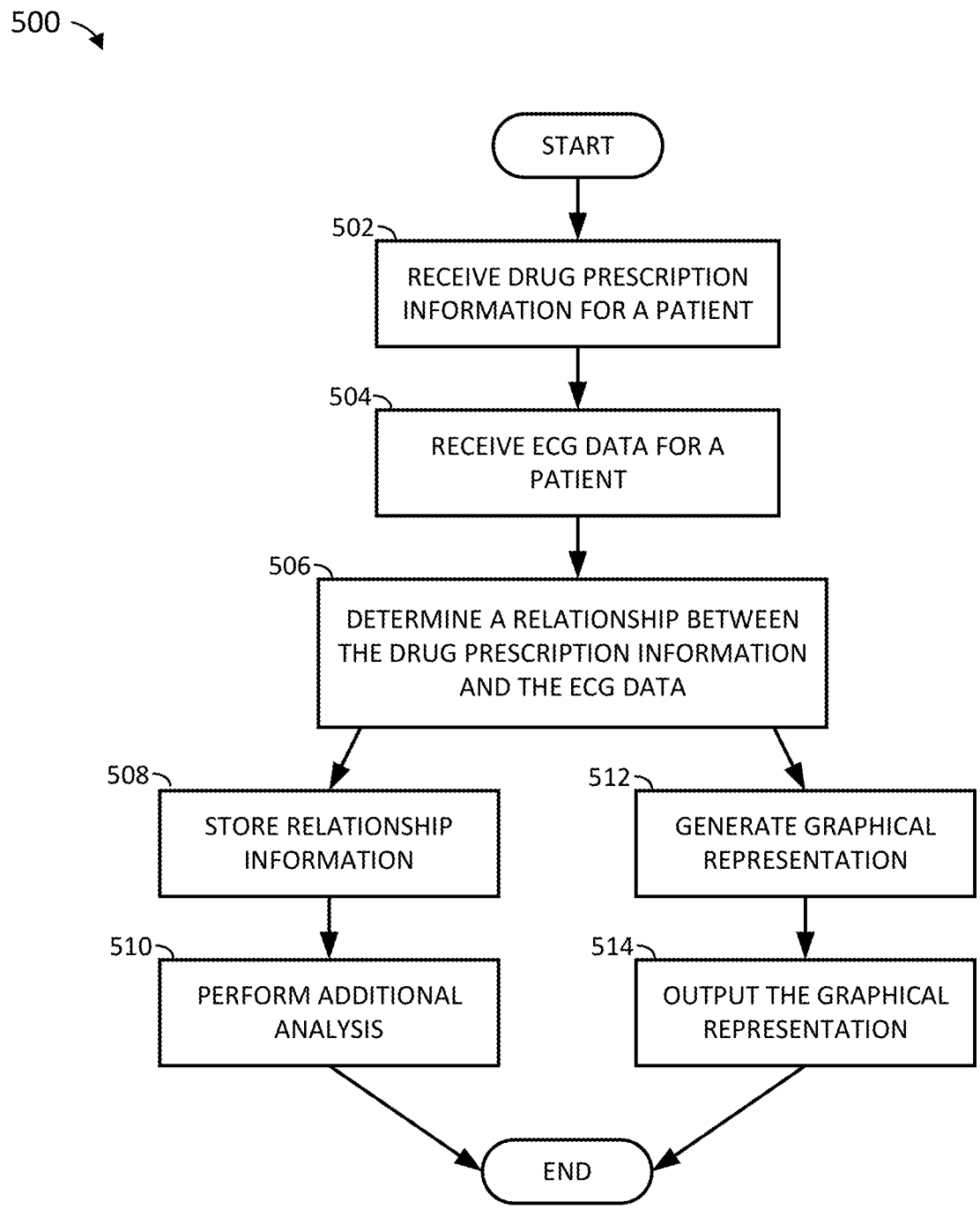
FIG. 5A depicts a sample process flow for determining a relationship between patient electrocardiogram (ECG) information and drug prescription information, in accordance with an example of the present disclosure.

FIG. 5A illustrates a sample process 500 for processing information collected for a patient (e.g., ECG data collected by a wearable medical device such as wearable medical device 304) as well as drug prescription information for the patient (received from, for example, a doctor's computer such as doctor's computer 302). As shown in FIG. 5A, a processing device (such as processor 402 as shown in FIG. 4) can be configured to operate in concert with, for example, a network interface (such as network interface 408 as shown in FIG. 4) to execute a monitoring process (such as monitoring process 412 as shown in FIG. 4). The process 500 can include the network interfacing receiving 502 drug prescription information for a patient. The drug prescription information for a patient can be received 502 directly from an HCP (e.g., from a computing device such as a laptop, smartphone, tablet computing device, or other similar computing devices) and stored in a local storage device and/or at a remotely located storage device. For example, the drug prescription information can include drug type and name, dosage amount and dosage timing information, and other related information. In certain implementations, the dosage amount and timing information can include at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

The network interface can further receive 504 ECG data for the patient. Like the drug prescription information, the ECG data can be stored in a local storage device and/or a remotely located storage device.

In some examples, the process 500 can include collecting ECG data continuously over an extended period of time. In such an example, the ECG data for the particular periods of time can be stored until later accessed for further processing. For example, the collected and stored ECG data can include data for a period of 24 hours, 48 hours, 72 hours, one week, two weeks, a month, 2 months, 6 months, and other similar periods of time.

Figure 5B:
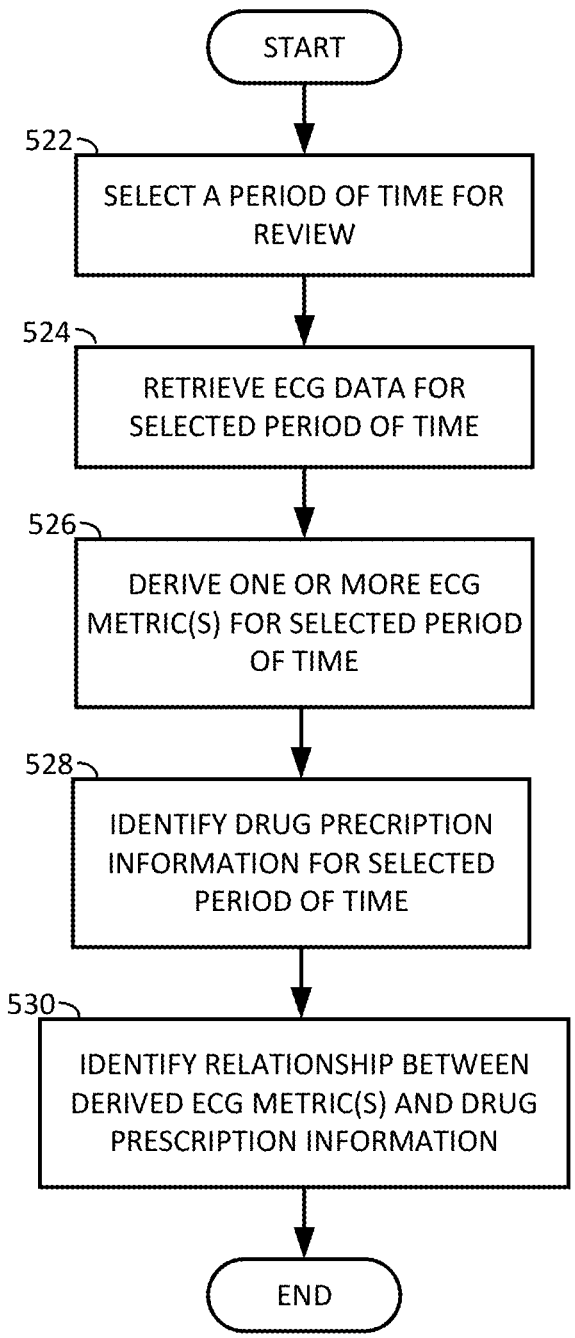
FIG. 5B depicts a sample implementation of a process of determining a relationship between drug prescription information and ECG data as shown in FIG. 5A, in accordance with an example of the present disclosure.

Referring back to FIG. 5A, the processor can determine 506 a relationship between the drug prescription information and the ECG data. In certain implementations, determining 506 the relationship can include correlating a specific time associated with a portion of the ECG data with drug prescription information for that specific time. FIG. 5B illustrates a more detailed process 520 for determining 506 the relationship.

As shown in FIG. 5B, process 520 can include the processor selecting 522 a period of time for review. Depending upon the application, process 500 as shown in FIG. 5A can be configured to run automatically on a set schedule (e.g., every 24 hours or upon receiving updated ECG data from a patient's wearable medical device). When running automatically, the processor can be configured to select 522 a standard period of time such as one week. In some examples, the period of time can be selected 522 based upon a request received from an HCP. For example, the request can include a request for information for the previous two weeks, or for a period of time beginning on a first date and ending on a second date, thereby defining a specific range of time. Once the period of time has been selected 522, the processor can retrieve 524 ECG data for that period of time. For example, the processor can access stored ECG data on a remotely located storage device and retrieve 524 the ECG data for the selected period of time. In some examples, the processor can retrieve 524 the ECG data directly from a wearable medical device if the ECG data is not available. For example, if the selected period of time is the past 24 hours, and the wearable medical device has not provided or otherwise uploaded updated ECG data that covers this period, the processor can retrieve 524 the data directly from the wearable medical device. The processor can analyze the ECG data to derive 526 one or more ECG metrics for the selected time period. For example, the one or more ECG metrics can include cardiac parameters such as heart rate metrics. Heart rate metrics can include average heart rate for a predetermined period of time, such as the past 8 hours, past 24 hours, past 2 days, past week, past 2 weeks, or for any configurable duration of time. Heart rate metrics can include average day time heart rate, night time heart rate, resting heart rate, minimum measured heart rate, maximum measured heart rate, or heart rate during certain physical or other activities for a predetermined period of time such as the past 8 hours, past 24 hours, past 2 days, past week, past 2 weeks, or for any configurable duration of time. Heart rate metrics can include median and/or mode or other statistical measures of a series of actual heart rate values. Heart rate metrics can include one or more statistical surrogates derived from a series of actual heart rates recorded from ECG, pulse, or other underlying physiological signals of the patient.

While the examples and discussion as described herein are generally related to heart rate metrics, additional ECG metrics can be derived 526 as well. For example, an additional ECG metric can include heart rate variability and related heart rate variability metrics. Heart rate variability metrics can include average NN (normal-to-normal) intervals, minimum NN interval, maximum NN interval, the standard deviation of all NN intervals, the square root of the mean squared difference of successive NN intervals measured in seconds, the number of successive intervals greater than 50 ms, and the percent of intervals of successive NN intervals greater than 50 ms. In certain implementations, additional ECG metrics can include, but are not limited to, premature ventricular complex (PVC) burden or counts, atrial fibrillation burden metrics, pauses, heart rate turbulence, QRS height, QRS width, changes in a size or shape of morphology of the ECG data, cosine R-T, artificial pacing, QT interval, QT variability, T wave width, T wave alternans, T-wave variability, and ST segment changes. In some examples, the ECG metric includes a single value that is representative of the ECG metric for the entire period of time. For example, the ECG metric can include a single average heart rate for a 24-hour period. For example, the ECG metric can include a single average heart rate variability value for a 24-hour period. In some examples, the ECG metric can include a series of values that are derived to correspond to subperiods within the selected period of time. For example, the ECG metric can include three average heart rate values representing 8-hour periods within a 24-hour day. For example, the ECG metric can include three average heart rate variability values representing 8-hour periods within a 24-hour day. In examples, the ECG metric values can be derived to represent average heart rate or heart rate variability when resting, average heart rate or heart rate variability when performing a prescribed activity such as a prescribed exercise regimen, and an average heart rate or heart rate variability associated with spontaneous activity.

As further shown in FIG. 5B, the processor can identify 528 drug prescription information for the selected period of time. Identifying 528 the drug information can include, for example, determining what type of drug the patient was prescribed during the selected time period, what the drug's name is, what the current dosage and dosage timing information is, and whether there were any changes to the drug prescription information during the selected time period. The processor can further identify 530 a relationship between the derived one or more ECG metrics and the drug prescription information. For example, the relationship can include whether changes to the drug prescription information (e.g., dosage information) correspond to changes in the one or more ECG metrics. Additional relationship information can include synchronization of timing information for the one or more ECG metrics and the drug prescription information as shown, for example, in FIGS. 6A and 6B below. For example, the relationship may be identified based on fitting a mathematical function to the underlying drug prescription information and ECG metrics for the selected time period. For example, a simple relationship may be an inverse linear relationship indicating drug dosage increases correlate with a decreasing trend in heart rate. Other types of relationships may be determined based on analyzing the data including a quadratic relationship, an inverse square law relationship, or one or more combinations thereof. Once the underlying relationship is determined, the processor can calculate projected drug prescription information and/or projected ECG data trends over a selected period of time in the future. For instance, in such implementations, the processor can calculate that if the patient's drug dosage is increased in a predetermined manner, the patient's heart rate may trend according to the determined relationship.

Referring back to FIG. 5A, the processor can store 508 the relationship information. Additionally, the processor can store the received 502 drug prescription information as well as the received 504 ECG data for the patient. The processor can perform 510 additional analysis on the stored information as is described below in additional detail in the description of FIGS. 10-15.

Additionally, as shown in FIG. 5A, the processor can also generate 512 a graphical representation of the relationship information as well as the drug prescription information and/or a portion of the ECG information as well as other output information for review and/or additional analysis. This generated output can then be output 514 via a display or as a notification sent to the patient's HCP. For example, the HCP can request to see a patient's heart rate data as well as their drug prescription information for a particular period of time in a single graphical representation. The processor can access one or more data storage devices to determine drug prescription information as well as a portion of ECG data for the patient that corresponds to the particular period of time associated with the request. The processor can determine a relationship between the drug prescription information and the ECG data (e.g., what particular drug prescription information corresponds to the portion of ECG data for the particular period of time) and generate a graphical representation of the relationship data.

Figure 6A:
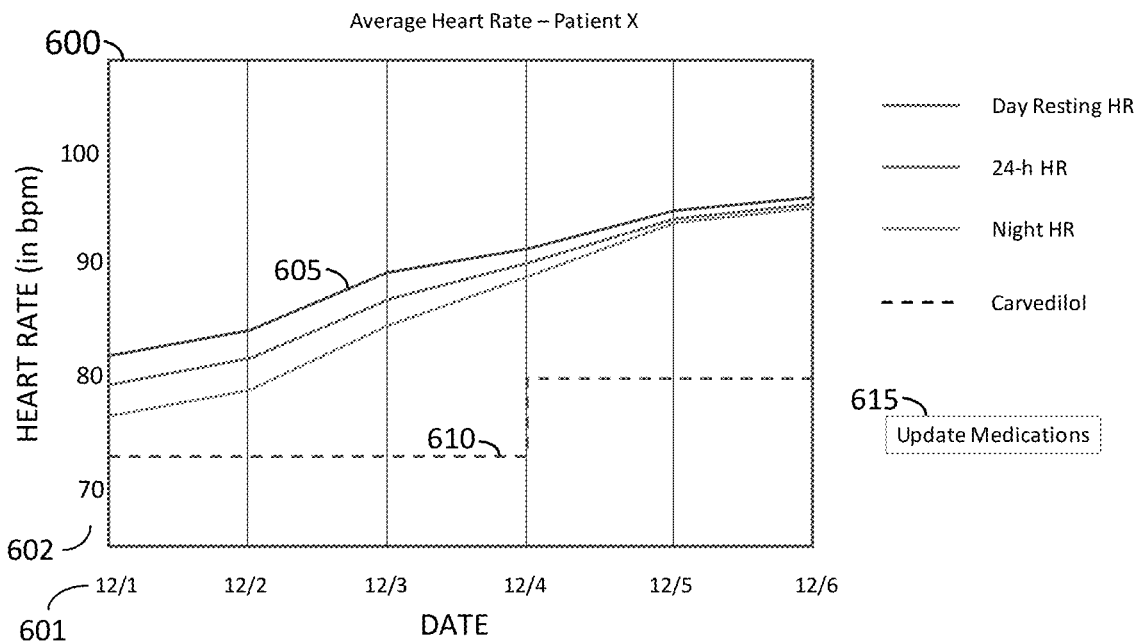
FIGS. 6A and 6B depict sample graphical representations of an output showing a relationship between patient ECG data and drug prescription information, in accordance with an example of the present disclosure.
Figure 6B:
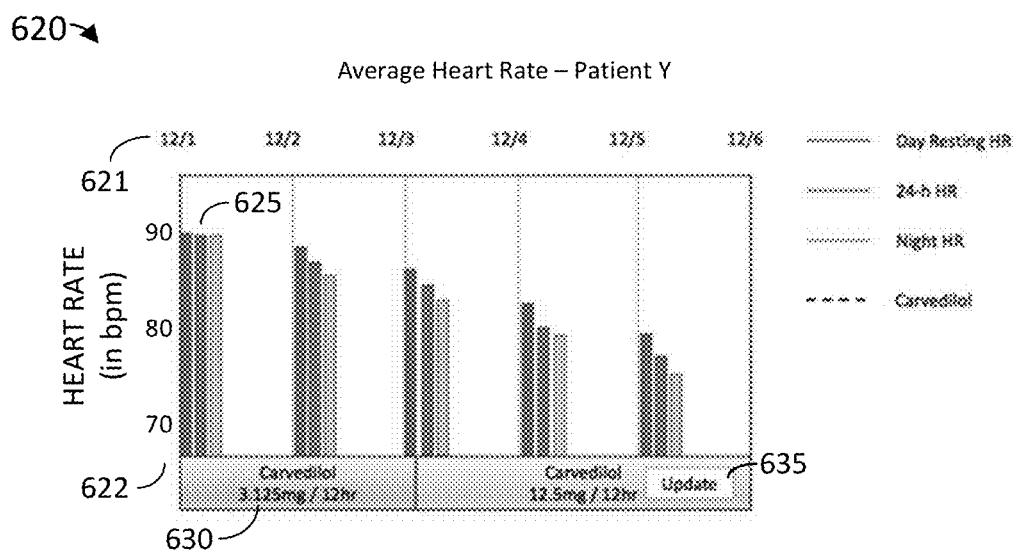

Example graphical representations of the relationship data are shown in FIGS. 6A and 6B. For example, FIG. 6A illustrates a line graph 600 that includes heart rate information for a patient X collected over a period of six days (e.g., December first through December sixth). For example, as shown in line graph 600, the X-axis 601 can include time (shown in this example in day increments) and the Y-axis 602 can include heart rate (shown in this example in increments of 10 bpm). The line graph 600 includes various indicators 605 related to the patient's ECG data as well as an indicator 610 that provides information related to drug prescription information. As can be seen in the line graph 600, the patient has been prescribed the beta-blocker carvedilol, and the dosage information changed on December fourth. An HCP that has accessed the information as shown in FIG. 6A can quickly and reliably determine what the patient's heart rate information is over the selected period of time as well as the drug information for the patient. From this interface, in some implementations, the HCP can also be provided with the option to update medication information for the patient. For example, upon receiving a user selection of the update medication button 615, the processor can provide the HCP access to a portal where they can alter the patient's current dosage and/or dosage time information. As shown in FIG. 6A, even with the increased dosage of carvedilol on December fourth, the patient's heart rate has continued to increase. In light of this information, the HCP may opt to increase the dosage again or to continue to monitor the patient's heart rate for any additional changes.

In another example, FIG. 6B illustrates a bar chart 620 that includes heart rate information for a patient Y collected over a period of six days (e.g., December first through December sixth). As shown in bar chart 620, the X-axis 621 can include time (shown in this example in day increments) and the Y-axis 622 can include heart rate (shown in this example in increments of 10 bpm). The bar chart 620 includes various sets of bars 625 related to the patient's ECG data as well as drug prescription information 630 that provides information related to drug dosages and dosage times over the time period as shown in the bar graph. As can be seen in the bar chart 620, the patient has been prescribed the beta-blocker carvedilol, and the dosage information changed on December third (from 3.125 mg every 12 hours to 12.5 mg every twelve hours). An HCP that has accessed the information as shown in FIG. 6B can quickly and reliably determine what the patient's heart rate information is over the selected period of time as well as the drug information for the patient. From this interface, in some implementations, the HCP can also be provided with the option to update medication information for the patient. For example, upon selecting the update medication button 635, the HCP can access a portal where they can alter the patient's current dosage and/or dosage time information. As shown in FIG. 6B, with the increased dosage of carvedilol on December third, the patient's heart rate has continued to decrease. In light of this information, the HCP may opt to maintain the dosage and continue to monitor the patient's heart rate for any additional changes.

It should be noted that the process 500 as shown in FIG. 5 is provided by way of example only and can be modified to include additional features and/or process actions. For example, the process 500 can include generating an updated graphical representation showing, in certain implementations, an updated time period based upon a request from an HCP. FIG. 5C illustrates a sample process 540 for generating an updated graphical representation.

Figure 5C:
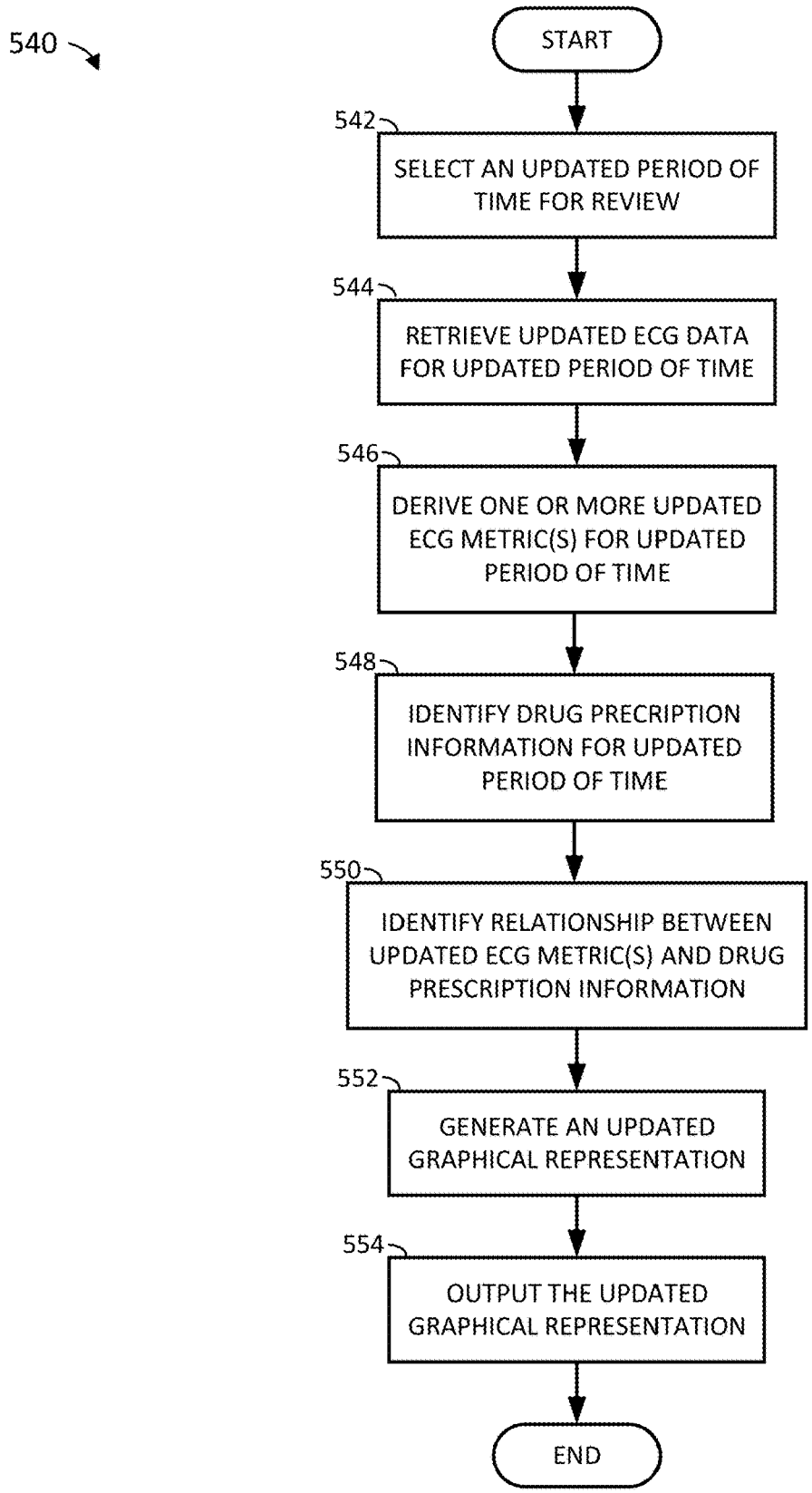
FIG. 5C depicts a sample process flow for generating an updated graphical representation showing a relationship between drug prescription information and ECG data, in accordance with an example of the present disclosure.

As shown in FIG. 5C, the process 540 can include the processor selecting 542 an updated period of time for review. For example, the updated period of time can be selected based upon a request received from an HCP. For example, the request can include a request for information for an updated period of time adjacent to (e.g., preceding or following) the time period used to generate the original graphical representation. In other examples, the updated period of time can be unrelated to the period of time used to generate the original graphical representation. In some implementations, the updated period of time can be selected automatically based upon a passage of time since a previous graphical representation was generated. For example, process 500 as shown in FIG. 5A can be configured to run automatically on a set schedule (e.g., every 24 hours). When running automatically, the processor can be configured to select 542 a period of time that is similar or corresponds to the previous period of time. For example, the processor can be set to generate the original graphical representation covering a period of time equal to the past 24 hours. After the passage of a subsequent 24 hours, the processor can implement process 540 and select 542 the most recent 24 hours as the updated period of time for review.

In some implementations, the updated period of time can be determined based on an occurrence of one or more events as detected from the underlying data. For example, the one or more events may be cardiac events such as pauses in cardiac activity, heart rate increases, heart rate decreases, occurrence of one or more arrhythmias, and onsets or offsets of arrhythmias such as bradycardia, tachycardia, or atrial fibrillation. In some implementations, the one or more events may be patient activity events, such as the beginning of a physical activity like a brisk walk, a light jog, a run, or other similar activity. When such one or more events are detected, the processor can initiate a request to update the ECG information and/or drug prescription information.

In implementations, the system can provide a technician or other authorized user with interface options (e.g., via interface 406 as shown in FIG. 4) to select the type of underlying data that is to be automatically updated on a schedule as described above, or on occurrence of an event. For instance, a default may be to update ECG information on a first periodic schedule (such as every 2 hours) and drug prescription information on a second periodic schedule (such as once every week). When a certain event occurs as described above, the system can immediately request the updated ECG and drug prescription information. The system may allow the user to specify the type of information, resolution of the information (e.g., detailed high resolution ECG data or lower resolution ECG data), and a length of time of the updated data. The interface includes options to allow the user to specify the types of events that would trigger changes in the data update schedule and/or the among or nature of data requested.

The HCP can query historical data for a given patient as well. For example, a specific patient may have been prescribed a wearable medical device such as a cardiac monitor or a wearable defibrillator approximately two years ago. Such a patient may have since ended their use of the device but has been on a beta blocker drug or other cardiac drug since that time. In a more recent clinic visit, the HCP may wish to access information related to the time when the patient was previously wearing the wearable medical device. For example, the HCP may wish to compare the prior heart rate information and drug dosage information as monitored during the prior period of time the patient wore the wearable medical device to recently acquired heart rate and drug dosage information collected, for example, during the clinic visit. The HCP can analyze this information to determine, for example, whether the patient should be prescribed different, similar or updated dosage of the beta blocker drug or other medication, or if the patient should be prescribed a cardiac monitor or a wearable defibrillator.

Referring again to FIG. 5C, once the updated period of time has been selected 542, the processor can retrieve 544 updated ECG data for that updated period of time. For example, the processor can access stored ECG data on a remotely located storage device and retrieve 544 the ECG data for the selected updated period of time. In some examples, the processor can retrieve 544 the ECG data directly from a wearable medical device if the ECG data is not available. For example, if the selected period of time is the past 24 hours, and the wearable medical device has not provided or otherwise uploaded updated ECG data that covers this period, the processor can retrieve 544 the updated ECG data directly from the wearable medical device. The processor can analyze the updated ECG data to derive 546 one or more updated ECG metrics for the selected time period. For example, the one or more ECG metrics can include cardiac parameters such as heart rate. However, as noted above, while the examples as described herein are generally related to heart rate, additional updated ECG metrics, such as heart rate variability, can be derived 546 as well.

As further shown in FIG. 5C, the processor can identify 548 updated drug prescription information for the selected updated period of time. Identifying 528 the drug information can include, for example, determining what type of drug the patient was prescribed during the selected time period, the drug's name (e.g., brand name or other generic name), the current dosage and dosage timing information, and changes to the drug prescription information during the selected time period. Depending upon the duration and timing of the updated period of time, there may be little or no changes to the drug prescription information. In such a case, the drug prescription information for the updated time period may be identical or similar to the previous time period used to generate the original graphical representation. In examples, the processor can identify 550 a relationship between the derived one or more updated ECG metrics and the drug prescription information. For example, the relationship can include whether changes to the drug prescription information (e.g., dosage information) correspond to changes in the one or more ECG metrics. The processor can generate 552 an updated graphical representation of the updated relationship information. The graphical representation can also include a portion of the drug prescription information and/or a portion of the updated ECG information for review and/or additional analysis. This generated output can then be output 554 via a display or as a notification sent to the patient's HCP. The HCP can then review the updated graphical representation to ascertain an updated snapshot of the patient's data as well as use the information contained within the updated graphical representation to make informed decisions regarding the patient's treatment.

Figure 6C:
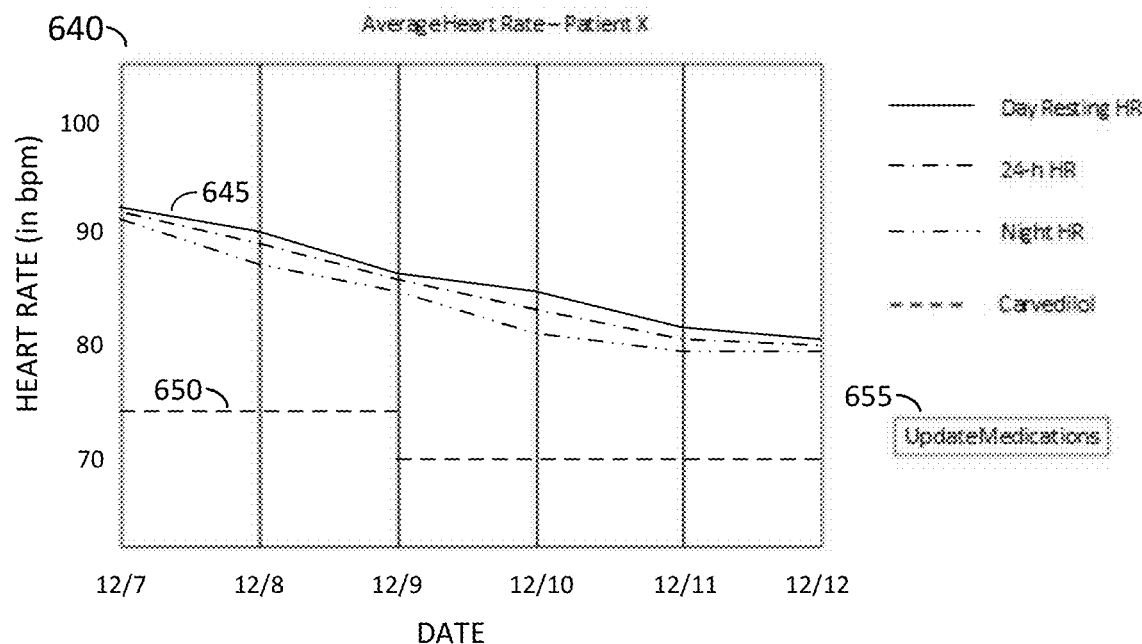
FIGS. 6C and 6D depict sample updated graphical representations of an updated output showing a relationship between patient ECG data and drug prescription information for an updated period of time, in accordance with an example of the present disclosure.
Figure 6D:
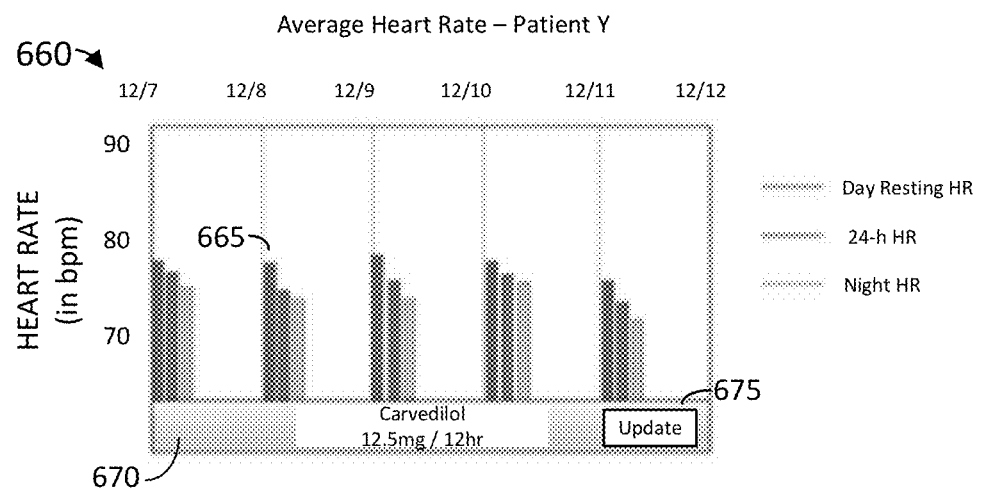

Example updated graphical representations of the relationship data as determined using, for example, process 540 are shown in FIGS. 6C and 6D. For example, FIG. 6C illustrates a line graph 640 that includes heart rate information for a patient X collected over a period of six days (e.g., December seventh through December twelfth). In this example, the updated period of time as shown in FIG. 6C represents the six days immediately following the period of time as shown in FIG. 6A. However, this is by way of example only and the updated period of time as illustrated in FIG. 6C can represent any updated period of time as selected during process 540 as described above.

As shown in FIG. 6C, the line graph 640 includes various indicators 645 related to the patient's ECG data as well as an indicator 650 that provides information related to drug prescription information. As can be seen in the line graph 640, the patient has been prescribed the beta-blocker carvedilol, and the dosage information changed on December ninth. An HCP that has accessed the information as shown in FIG. 6C can quickly and reliably determine what the patient's heart rate information has been over the selected period of time as well as the drug information for the patient. From this interface, in some implementations, the HCP can also be provided with the option to update medication information for the patient. For example, upon receiving a user selection of the update medication button 655, the processor can provide the HCP access to a portal where they can alter the patient's current dosage and/or dosage time information. In some implementations, the information associated with the updated time period as shown in FIG. 6C can be appended to or otherwise displayed with the information as shown in FIG. 6A, thereby providing both the original graphical representation (as shown in FIG. 6A) as well as the updated information contained in the updated graphical representation (as shown in FIG. 6C).

In another example, FIG. 6D illustrates a bar chart 660 that includes heart rate information for a patient Y collected over a period of six days (e.g., December seventh through December twelfth). In this example, the updated period of time as shown in FIG. 6D represents the six days immediately following the period of time as shown in FIG. 6B.

However, this is by way of example only and the updated period of time as illustrated in FIG. 6D can represent any updated period of time as selected during process 540 as described above.

The bar chart 660 includes various sets of bars 665 related to the patient's ECG data as well as drug prescription information 670 that provides information related to drug dosages and dosage times over the updated time period as shown in the bar chart. As can be seen in the bar chart 660, the patient has been prescribed the beta-blocker carvedilol, and the dosage information has remained consistent at 12.5 mg every 12 hours. An HCP that has accessed the information as shown in FIG. 6D can quickly and reliably determine what the patient's heart rate information has been over the selected period of time as well as the drug information for the patient. From this interface, in some implementations, the HCP can also be provided with the option to update medication information for the patient. For example, upon selecting the update medication button 675, the HCP can access a portal where they can alter the patient's current dosage and/or dosage time information. As shown in FIG. 6D, with the current dosage of carvedilol, the patient's heart rate has stabilized. In light of this information, the HCP may opt to maintain the dosage and continue to monitor the patient's heart rate for any additional changes or, if the HCP wants to lower the patient's heart rate further, may opt to increase the dosage. In some implementations, the information associated with the updated time period as shown in FIG. 6D can be appended to or otherwise displayed with the information as shown in FIG. 6B, thereby providing both the original graphical representation (as shown in FIG. 6B) as well as the updated information contained in the updated graphical representation (as shown in FIG. 6D).

It should be noted that, as described herein, the information as shown in FIGS. 6A-6D is described as being presented to an HCP by way of example only. However, in some examples, a portion of the patient information as shown in FIGS. 6A-6D can be provided to the patient and/or a caregiver of the patient. For example, the patient information as shown in FIG. 6A and included in line graph 600 can be provided to the user on a computing device such as patient device 305 as described above. However, when being displayed to the patient (or to a caregiver), the information can be modified to remove, for example, the update medication button 615. By providing at least a portion of the data to the patient and/or caregiver, the patient can be kept updated on their progress through their treatment regimen. In certain implementations, the information presented to the user can include a similar button as update medication button 615 that provides the patient or caregiver with access to a patient portal where they can provide additional data. For example, the patient portal can include queries to the patient about daily activity, sleep schedules, medication compliance, and other similar factors that can contribute to changes in the patient's information as shown, for example, in line graph 600. By providing such a patient portal, the patient can also participate in the reviewing and editing of data throughout the treatment regimen.

In addition to providing for updated graphical representations, the processes as described herein can also be used to provide for recommended changes to the patient's drug prescription information such as dosage amounts and/or dosage times. Such processes can be executed by, for example, using the predictive analytics techniques described below in the discussion of FIGS. 10-15B. However, the relationship data as determined in, for example, process 520 as described above can also be used to generate one or more recommendations for an HCP to consider when reviewing patient data.

Figure 5D:
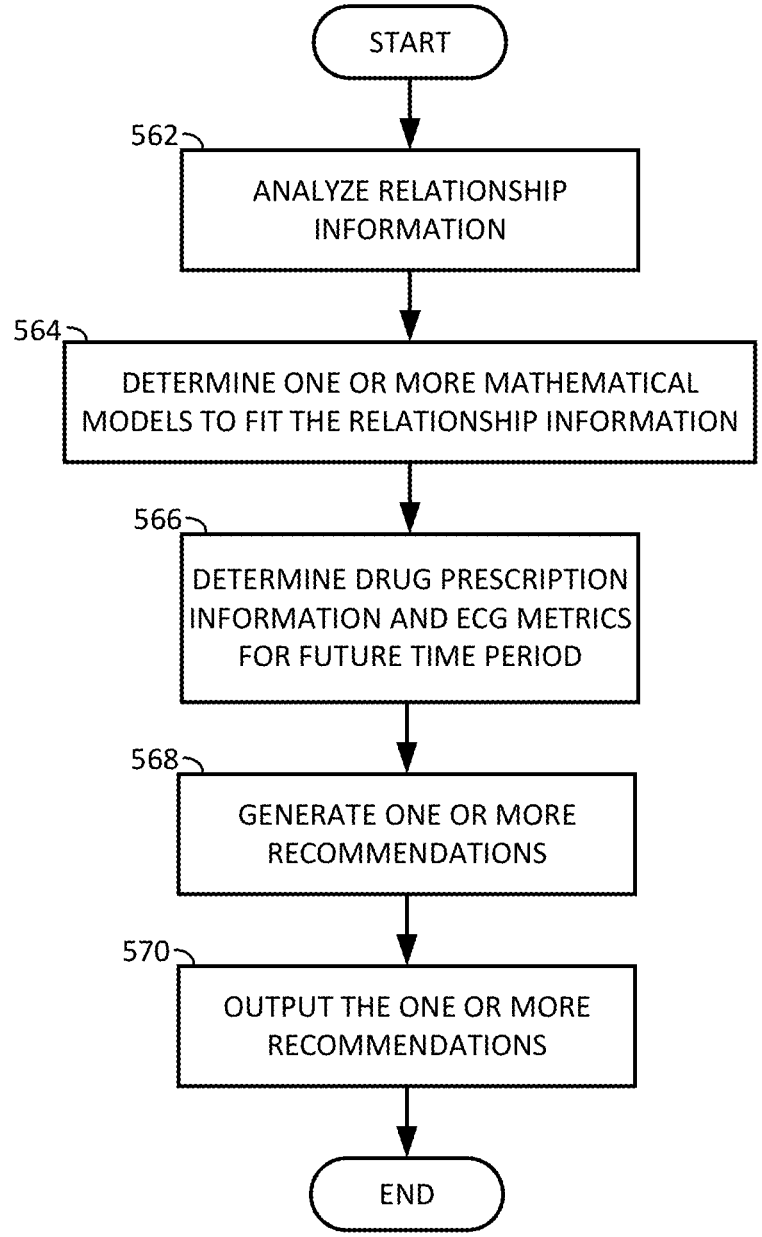
FIG. 5D depicts a sample process flow for generating a recommended course of action based upon analysis of a determined relationship between drug prescription information and ECG data, in accordance with an example of the present disclosure.

For example, FIG. 5D illustrates a process 560 for generating one or more recommendations for an HCP. As shown in FIG. 5D, the process 560 can include a processor analyzing 562 the relationship information as previously determined using, for example, process 520 as described above. The processor can analyze 562 the relationship information to determine 564 if there are one or more mathematical models that fit the relationship information. For example, as noted above, a simple relationship may be an inverse linear relationship indicating drug dosage increases correlate with a decreasing trend in heart rate. In such an example, the processor can determine 564 a line that best fits the relationship information and is representative of the linear relationship. Other types of relationships may be determined based on analyzing the data including a quadratic relationship, an inverse square law relationship, or one or more combinations thereof. In such examples, the processor can determine 564 a simple or complex curve that best fits the relationship information. Once the underlying relationship is determined, the processor can determine 566 drug prescription information and/or projected ECG data trends over a selected period of time in the future. For instance, in such implementations, the processor can calculate that if the patient's drug dosage is increased in a predetermined manner, the patient's heart rate may trend according to the determined relationship and fitted model.

Based upon the determined 566 future information, the processor can generate 568 one or more recommendations. For example, the recommendation can include changes to the patient's drug prescription information such as changes to dosage amounts and/or dosage times. Additional recommendations can include recommended setting changes to the patient's wearable medical device. For example, the recommendations can include a recommended change to providing updated patient ECG data or a more regular basis, e.g., every 8 or 12 hours rather than every 24 hours. Such a change can provide the HCP with more up-to-date information for review. Additional recommendations can include changes to the patient's overall treatment regimen such as recommended increases or decreases to prescribed periods of patient activity.

Figure 6E:
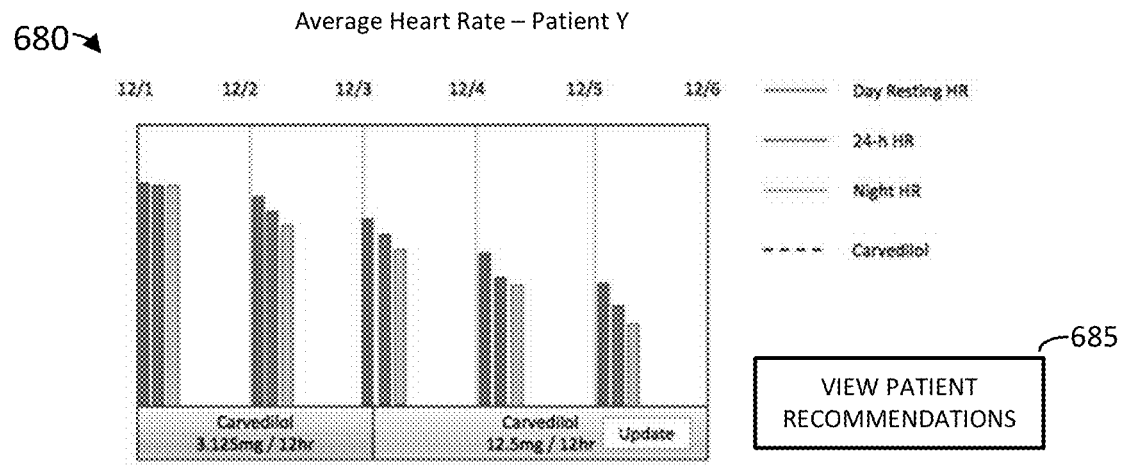
FIGS. 6E and 6F depict sample graphical representations including prescription recommendation information, in accordance with an example of the present disclosure.
Figure 6F:
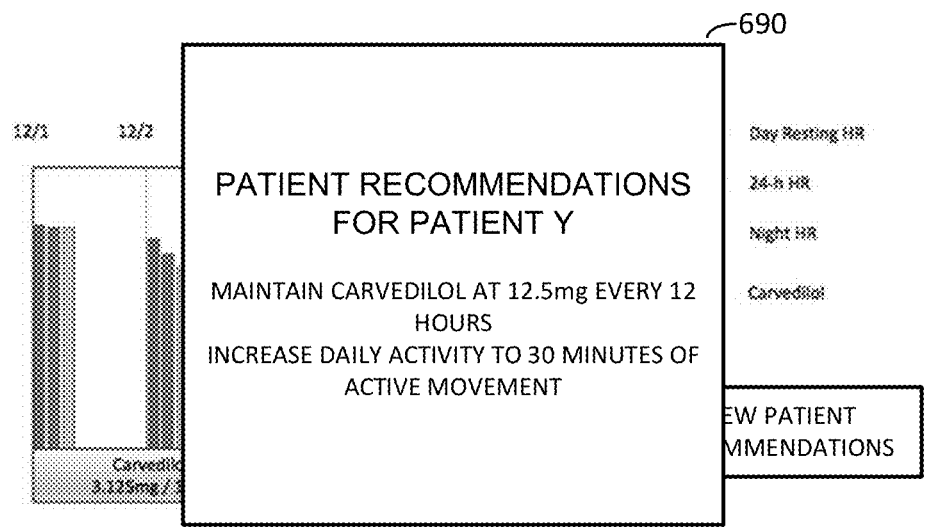

As further shown in FIG. 5D, the processor can output 570 the recommendations to, for example, the HCP or other designee of the HCP. As shown in FIGS. 6E and 6F, the recommendation information can be included in the graphical representations of the patient data. For example, as shown in FIG. 6E, a bar chart 680, similar to bar chart 620 as shown in FIG. 6B, can include a user-selectable feature 685 to access patient recommendations. Upon selection of feature 685, the HCP can be provided with additional recommendations 690 as shown in FIG. 6F. For example, as shown in FIG. 6F, the recommendations include maintaining the patient's dosage information as well as recommended changes to prescribed periods of activity.

In the above discussions, it should be noted that process 500 as shown in FIG. 5A is described in reference to components from the remote server 308 as shown in FIG. 4 by way of example only. In certain implementations, the process 500 as shown in FIG. 5A (and, by extension, process 520 as shown in FIG. 5B, process 540 as shown in FIG. 5C, and process 560 as shown in FIG. 5D) can be executed by other computing devices and processors. For example, processes 500, 520, 540, and/or 560 can be configured to be executed on processor 118 of the medical device controller 100 as shown in FIG. 1 and described above. In such an example, the patient's wearable medical device can be configured to determine a relationship between ECG data and drug prescription information and provide an indication of that relationship to the patient or to another person that is interacting with the wearable medical device. For example, when the patient visits their HCP for a checkup, the HCP may use the patient's prescribed wearable medical device to execute processes 500, 520, 540, and/or 560 to determine and display the relationship between the patient's ECG data and drug prescription information.

The graphical representations are shown in FIGS. 6A-6F as either a line graph or a bar chart by way of example only. In some examples, the graphical representation can include a pie chart, a box plot, a scatter plot, a histogram, a heat map, a contour plot, other such graphs and graphical representation types or combinations thereof. In certain implementations, the type of graphical representation can vary based upon, for example, the type of information being displayed. In some examples, the person viewing the information (e.g., the HCP) can select a specific format for the graphical representation to be displayed.

Figure 7A:
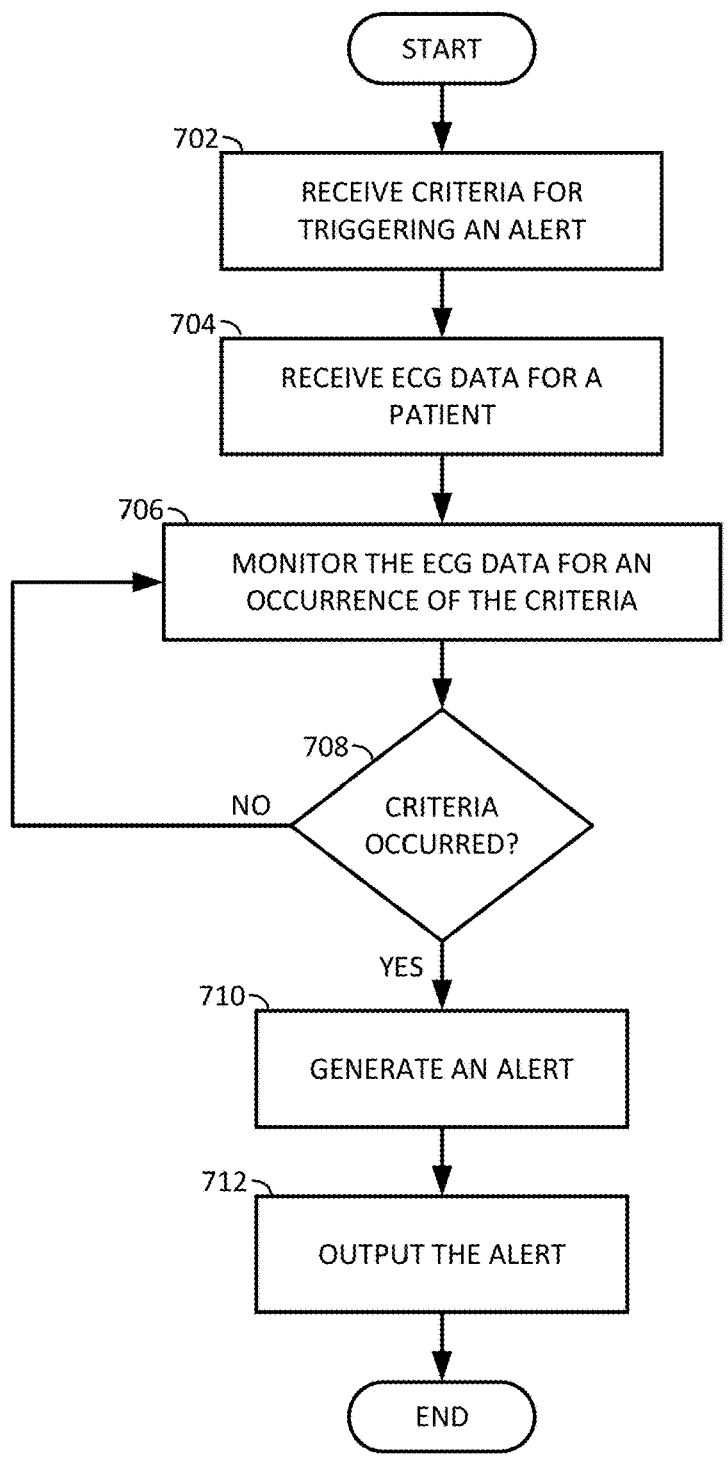
FIG. 7A depicts a sample process flow for providing an alert to a healthcare professional, in accordance with an example of the present disclosure.

In addition to providing HCPs with graphical representations of patient information as described above, the techniques as described herein can also be used to provide an alert to an HCP that patient has satisfied a certain criterion or set of criteria in a particular period of time, e.g., over a particular heart rate control period. In certain implementations, the HCP can provide or otherwise set one or more factors that determine when alerts are generated and delivered to a particular recipient. For example, if a patient's heart rate exceeds a certain threshold (e.g., 120 bpm) a certain number of times (e.g., three times) over a selected heart rate control period of time (e.g., 24 hours), then an automatic alert can be generated and sent to the patient's HCP. FIG. 7A illustrates a sample process 700 for generating and sending an alert to an HCP.

Figure 8:
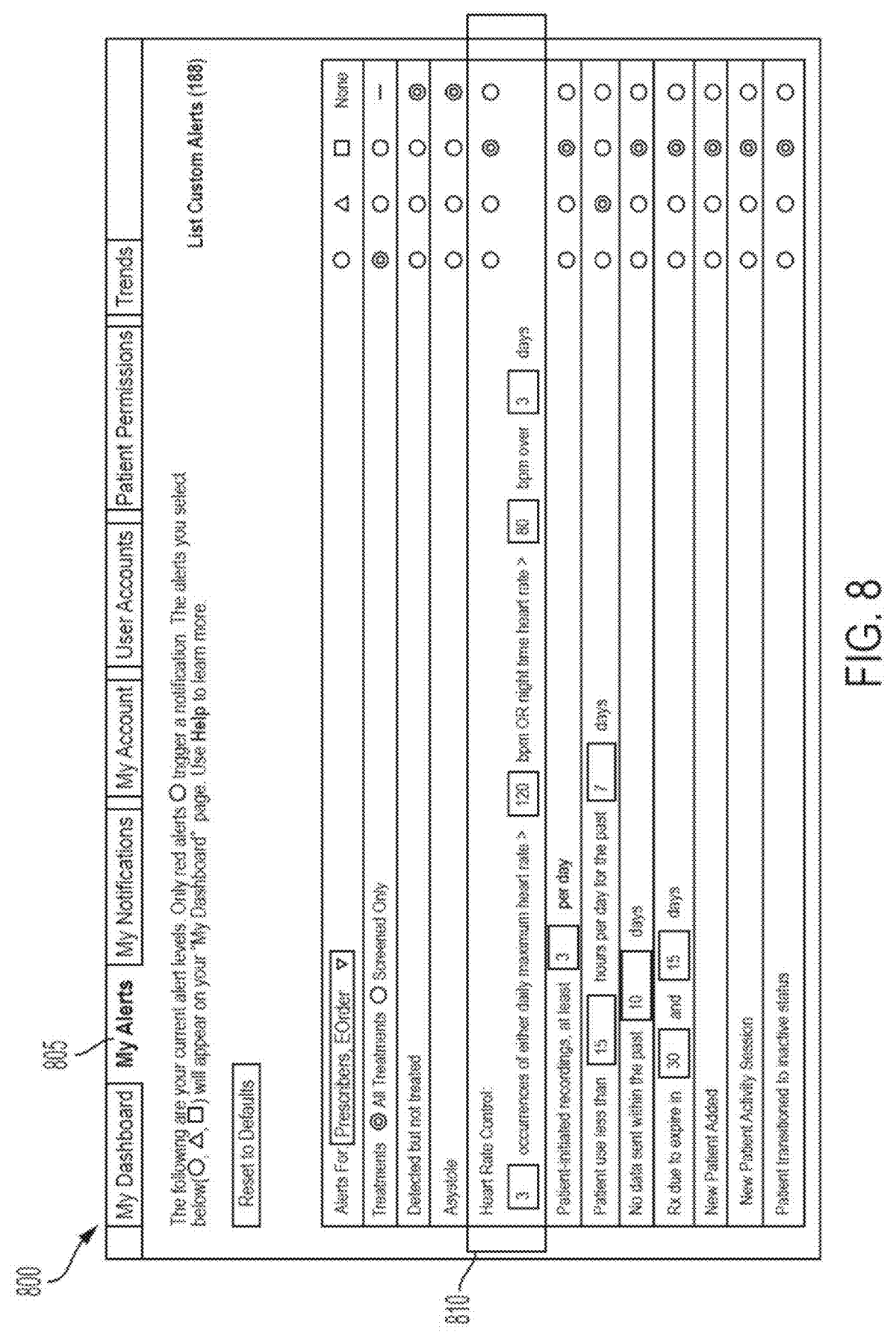

As shown in FIG. 7A, a processor (such as processor 402 as shown in FIG. 4) can operate in concert with a network interface (such as network interface 408 as shown in FIG. 4) to execute process 700. The process 700 can include the network interface receiving 702 criteria for triggering an alert. For example, an HCP can access a user interface associated with, in some examples, a physicians' portal hosted by a device manufacturer and configured to provide the HCP with access to information related to a wearable medical device that has been prescribed to a patient. FIG. 8 illustrates an example user interface 800 that an HCP may use to access such a physicians' portal. As shown in FIG. 8, the user interface 800 can include various tabs, drop down menus, and interactive portions that an HCP can select to access and/or provide information. As shown in FIG. 8, upon selection of the "My Alerts" tab 805, the user interface 800 can display information related to alert criteria that can be selected by the HCP. For example, as shown in FIG. 8, the HCP has selected row 810 to provide information related to criteria for triggering an alert as described herein. As shown in row 810, the HCP has set the triggering criteria to include three occurrences of either a daily maximum heart rate greater than 120 bpm or three occurrences of a night time heart rate over 80 bpm as measured over a three-day heart rate control period. If, during monitoring, the patient satisfies this triggering criteria, an alert will be triggered and delivered to the HCP. However, it should be noted that the values as shown in row 810 are provided by way of example only. In some examples, the values in user interface 800 can be pre-populated as default values. In some implementations, the HCP can choose to leave the default values, update the default values per their personal preference or to reflect patient-specific values, or use a combination of default and updated values. For example, as shown in row 810, a heart rate control period of three days can be the default setting. The HCP can update the period to include, for example, one day, five days, one week, two weeks, and other similar periods of time.

Figure 9A:
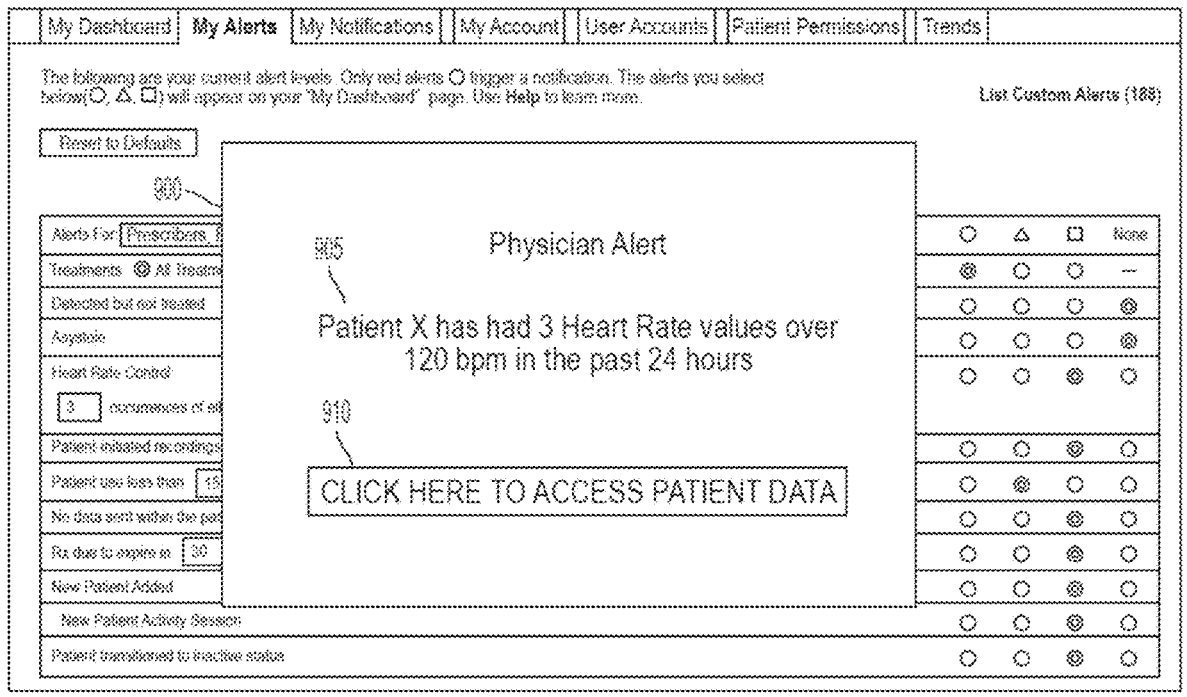
FIGS. 9A-9C depict sample alerts as sent to a healthcare professional, in accordance with an example of the present disclosure.

Referring back to FIG. 7A, the network interface can receive 704 ECG data for a patient. Similar to action 504 of process 500 as described above, receiving 704 the ECG data can include retrieving stored ECG data from a data storage device, receiving the ECG data directly from a wearable medical device, or some combination of the two. The processor can then monitor 706 the ECG for an occurrence of the triggering criteria. To continue the above example, the process 700 can include monitoring 706 the ECG data for either 3 instances of a daily heart rate over 120 bpm over a three-day period or three instances of a night time heart rate over 80 bpm over the three-day period. The processor can determine 708 whether the triggering criteria has occurred. If the triggering criteria has not occurred, the processor can continue monitoring 706 the ECG data. However, if the triggering criteria has occurred, the processor can generate 710 an alert to the HCP and output 712 the alert. For example, the alert can include a text message, an email, a notification window, a combination of alert types, and other similar alerts. For example, as shown in FIG. 9A, an alert 900 can be overlaid on the physicians' portal as described above in FIG. 8. The alert 900 can include a text portion 905 that provides a set of details about which patient the alert refers to and what criteria were met that triggered the alert. The alert 900 can also include a link 910 or other selectable feature that can be selected by the HCP to access additional details.

Figure 9B:
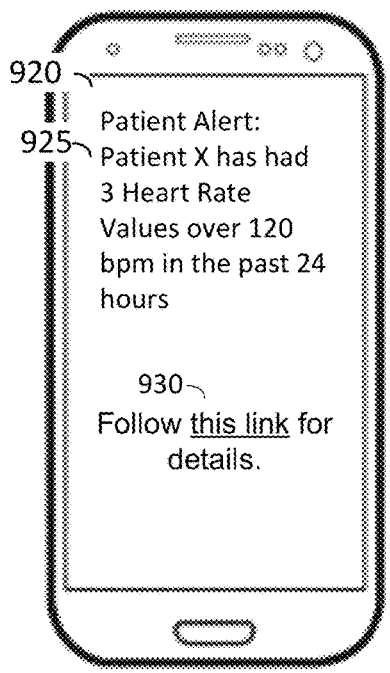

FIG. 9B illustrates an alternative alert 920 sent, for example, as a text message to a mobile device associated with the HCP. As further shown in FIG. 9B, the alert 920 can include a text portion 925 that provides a set of details about which patient the alert refers to and what criteria were met that triggered the alert. The alert 920 can also include a link 930 or other selectable feature that can be selected by the HCP to access additional details. Depending upon the security capabilities of the mobile device receiving alert 920, link 930 may not be included in the message.

Figure 9C:
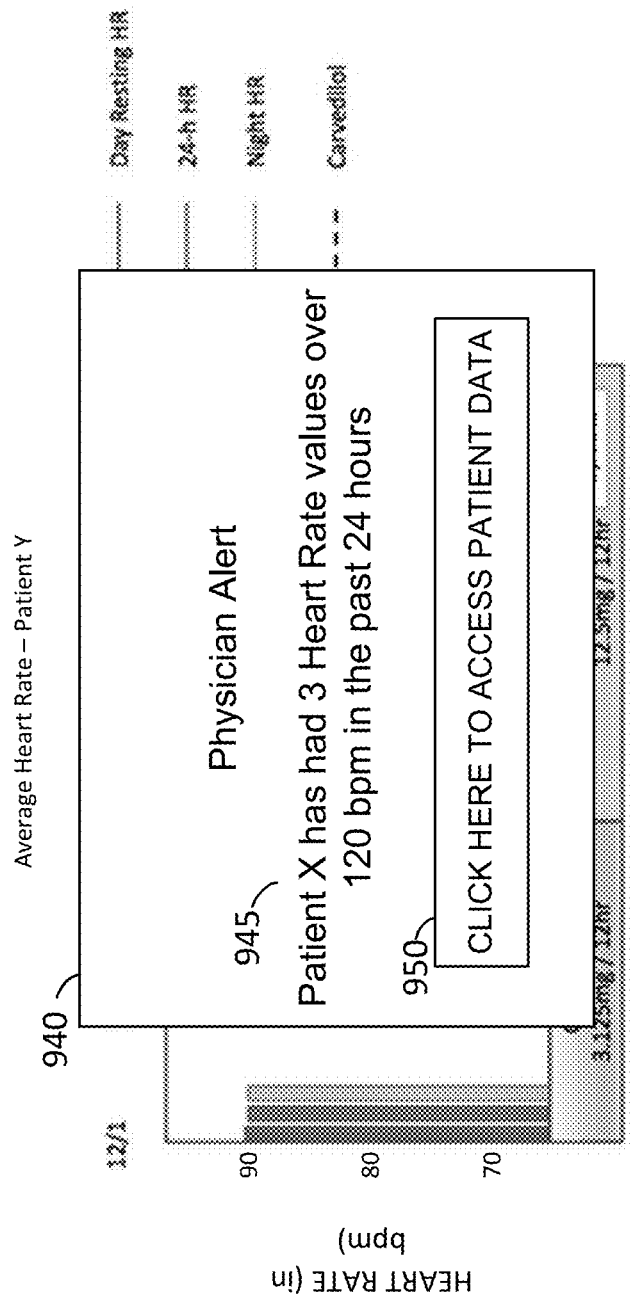

FIG. 9C illustrates an alternate alert 940 that can be displayed to the HCP when accessing, for example, the graphical representation of the patient's data as described above in the discussion of, for example, FIGS. 6A-6F. The alert 940 can include a text portion 945 that provides a set of details about which patient the alert refers to and what criteria were met that triggered the alert. The alert 940 can also include a link 950 or other selectable feature that can be selected by the HCP to access additional details such as more detailed ECG metric information, a rendering of the ECG trace itself for a time period that can be user-configurable by either an authorized user or the HCP, and/or drug prescription information.

The alerts 900, 920, and 940 as shown in FIGS. 9A-9C are provided by way of example only to show a sample formatting of the message. In some examples, the alerts may be more generic to protect the patient's identity. Rather than include the patient's name and triggering criteria information, the alert can simply be an indication that at least one of the HCP's patients has triggered a notification alert, and the HCP should access a secure information exchange such as the physician's portal as described herein to access additional information. Similarly, the type of text 905, 925, and 945 shown in the alerts 900, 920, and 940 is shown by way of example only. Additional information such as current patient condition, arrhythmia occurrence information, asystole occurrence information, and other related information that may be of interest or concerning to the HCP can be included in the alerts 900, 920, and 940.

Referring back to FIG. 7A, it should be noted that process 700 is provided by way of example only and various portions can be altered. For example, the HCP may have the option to access the user interface (e.g., user interface 800 as shown in FIG. 8) and provide updated criteria for triggering the alert during the process. In such an example, the process 700 can include updating the received criteria to reflect the updated criteria as received form the HCP. In such an example, the process would include monitoring the ECG data for an occurrence of the updated criteria over a particular heart rate control period. Additionally, it should be noted that portions of the process 700 as shown in FIG. 7A can be integrated into another process such as process 500 as shown in FIG. 5. In such an example, the HCP can provide the criteria for triggering an alert during process 500, for example, when providing the drug prescription information.

Figure 7B:
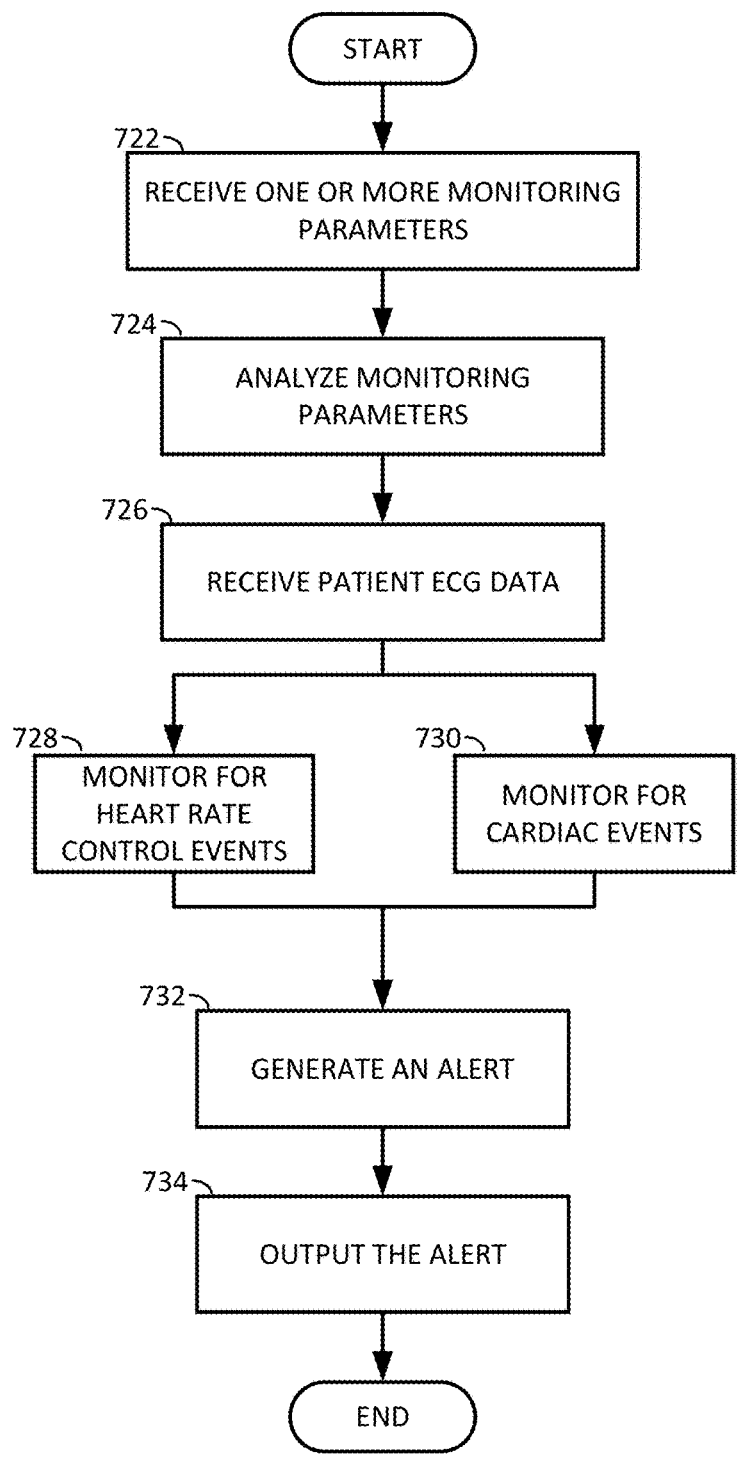
FIG. 7B depicts an alternative sample process flow for providing an alert to a healthcare professional, in accordance with an example of the present disclosure.

FIG. 7B illustrates a process 720 for generating and sending an additional informational alert to an HCP. For example, in addition to monitoring for and reporting an occurrence of a cardiac event, the informational alert can include heart rate control information for the patient collected over a heart rate control period as described herein. For example, the heart rate control information can include average daytime heart rate information for the patient, average nighttime heart rate information for the patient, maximum daytime and nighttime heart rates for the patient, minimum daytime and nighttime heart rates for the patient, median heart rate information over the heart rate control period, and other similar heart rate control information.

As shown in FIG. 7B, a processor (such as processor 402 as shown in FIG. 4) can operate in concert with a network interface (such as network interface 408 as shown in FIG. 4) to execute process 720. The process 720 can include the network interface receiving 722 one or more monitoring parameters from an HCP-controllable user interface such as interface 800 as shown in FIG. 8. As described above, an HCP can access a user interface associated with, in some examples, a physicians' portal hosted by a device manufacturer and configured to provide the HCP with access to information related to a wearable medical device that has been prescribed to a patient. The processor can analyze 724 the one or more monitoring parameters. For example, the processor can determine one or more heart rate control criteria based upon the analysis. The heart rate control criteria can include, for example, HCP-provided heart rate threshold values for identifying one or more heart rate control information as described above as well as a heart rate control period over which the heart rate control criteria is to be applied. Additionally, the processor can determine one or more cardiac event parameters. For example, the cardiac event parameters can include threshold information related to an adverse cardiac event such as bradycardia or tachycardia as described herein.

As further shown in FIG. 7B, the processor can receive 726 the patient ECG information received from, for example, the network interface as described above. The processor can monitor 728 the received patient ECG information for one or more heart rate control events over the heart rate control period as described herein. In certain implementations, the processor can identify the one or more heart rate control events based upon the heart rate threshold values as described above. The processor can also monitor 730 the ECG information for one or more cardiac events as defined by, for example, the cardiac event parameters as described herein.

Based upon the monitoring 728 and 730, the processor can generate an informational alert for the HCP. The informational alert can include, for example, information on any monitored heart rate control events that occurred during the heart rate control period as well as information on any monitored cardiac events. In certain implementations, the alert can include cardiac events that occurred during the heart rate control period, e.g., during the last three days. However, in some examples, the alert can include cardiac events that occurred before and/or after the heart rate control period. For example, if the heart rate control period is set to three days, the alert can include an indication of any cardiac events that occurred in the past week, including four days before the most recent heart rate control period.

As further shown in FIG. 7B, the processor can output 734 the alert to, for example, output circuitry for delivery to the HCP.

It should be noted that the process as shown in FIG. 7B is shown by way of example and can be modified depending upon actual implementation. In certain implementations, process 720 as shown in FIG. 7B can be repeated on a regular basis as defined by the heart rate control period. For example, if the heart rate control period is set for a duration of three days, the monitoring and alerting as shown in process 720 can be repeated every three days. However, in some examples, the monitoring as shown in FIG. 7B can be implemented as an ongoing process and the alerts are generated to cover a period equal to the heart rate control period, three days in this example. In such an implementation, the alerts can be generated on a shorter schedule than the heart rate control period (e.g., daily as compared to every three days). However, in the alerts, the heart rate control information can be limited to information collected during the most recent heart rate control period.

In implementations, alerts 900, 920, and 940 as shown in FIGS. 9A-9C can include additional information about other cardiac events during the heart rate control period. For example, the HCP can specify via one or more thresholds for such events via one or more HCP-controllable or HCP-programmable user interface parameters. As noted above, such additional cardiac events can include bradycardia, tachycardia, atrial fibrillation, and/or heart pause events. For example, methods, devices, and systems herein can use the below criteria for monitoring for such events.

In some implementations, the event parameters can specify various threshold information for triggering the recording of additional cardiac event information for use in the alerts 900, 920, and 940. The informational alerts regarding heart rate control can include additional cardiac event information as noted below that can be considered by HCP in up-titrating or down-titrating in achieving GDMT. For example, event parameters can be HCP-specified for abnormal heart rates, abnormal morphologies, ventricular ectopic beats (VEBs), supraventricular ectopic beats (SVEBs), bradycardia, tachycardia, atrial fibrillation, heart pauses, ventricular runs, ventricular bigeminy, ventricular trigeminy, ventricular tachycardia, supraventricular tachycardia, 2nd Atrioventricular (AV) block, and 3rd Atrioventricular (AV) block.

As an example, the HCP-controllable event parameters may include bradycardia thresholds as follows. A bradycardia onset heart rate can be specified in a range from 20 to 100 beats per minute, with a default value of around 40 beats per minute. When the patient's average heart rate (calculated over, e.g., 20 beats) drops below the value set by the HCP-controllable event parameters, methods, devices, and systems herein can report via the informational alert that the patient has entered bradycardia. A bradycardia offset heart rate can be specified in a range from 20 to 100 beats per minute, with a default value of around 45 beats per minute. When the patient is in bradycardia and the patient's average heart rate (calculated over, e.g., 20 beats) rises above the value set by the HCP-controllable event parameters, methods, devices, and systems herein can report via the informational alert that the patient has exited bradycardia. A bradycardia duration threshold can be specified in a range from 0 to 700 seconds, with a default value of around 30 seconds. In an example, the patient may remain in bradycardia for longer than the duration set by the value in this field before the methods, devices, and systems herein can report the event via the informational alert.

Figure 18A:
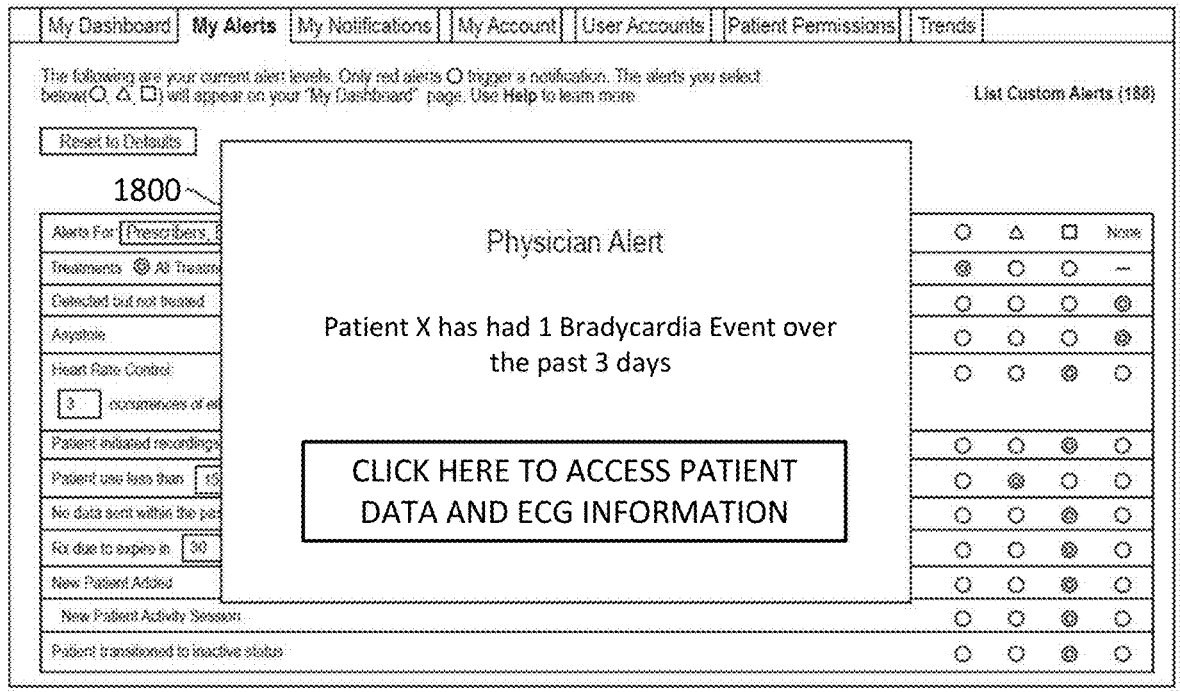
FIGS. 18A-18D depict additional sample alerts as sent to a healthcare professional, in accordance with an example of the present disclosure.

An example alert 1800 with such bradycardia information is shown in FIG. 18A. In examples, alert 1800 can include a link to additional patient data such as an ECG strip showing a bradycardia onset event and/or a bradycardia offset event (e.g., 30 to 120 second ECG strips corresponding to each such event). In some examples, additional details about the bradycardia event including time of day, average recorded heart rate, etc. can be provided in the alert 1800.

Similarly, as an example, the HCP-controllable event parameters may include tachycardia thresholds as follows. A tachycardia onset heart rate can be specified in a range from 100 to 250 beats per minute, with a default value of around 120 beats per minute. When the patient's average heart rate (calculated over, e.g., 20 beats) rises above the value set by the HCP-controllable event parameters, methods, devices, and systems herein can report via the informational alert can report that the patient has entered tachycardia. A tachycardia offset heart rate can be specified in a range from 100 to 150 beats per minute, with a default value of around 110 beats per minute. When the patient is in tachycardia and the patient's average heart rate (calculated over, e.g., 20 beats) drops below the value set by the HCP-controllable event parameters, methods, devices, and systems herein can report via the informational alert that the patient has exited tachycardia. A tachycardia duration threshold can be specified in a range from 0 to 700 seconds, with a default value of around 30 seconds. The patient may remain in tachycardia for longer than the duration set by the value in this field before methods, devices, and systems herein can report the event via the informational alert.

Figure 18B:
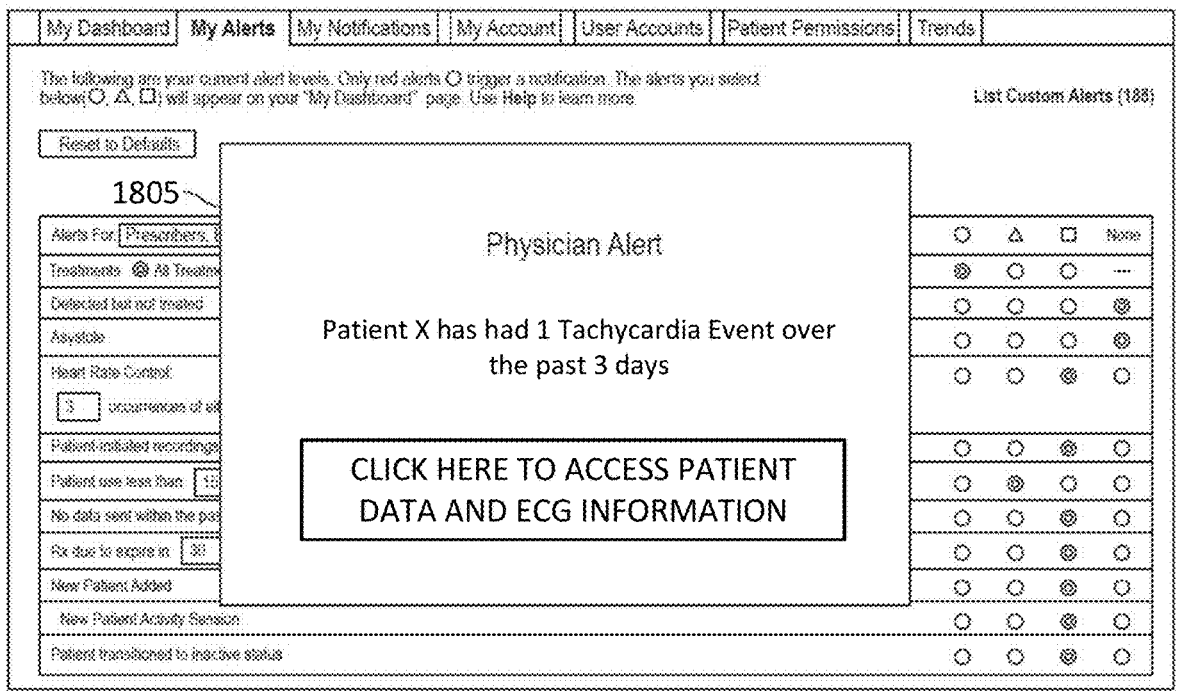

An example alert 1805 with such tachycardia information is shown in FIG. 18B. Similar to FIG. 18A, in examples, alert 1805 can include a link to additional patient information such as an ECG strip showing tachycardia onset event and/or a tachycardia offset event (e.g., 30 to 120 second ECG strips corresponding to each such event). In some examples, additional details about the tachycardia event including time of day, average recorded heart rate, etc. can be provided in the alert 1805.

In an example, a patient may remain in atrial fibrillation for longer than an atrial fibrillation duration threshold set by the value in the HCP-controllable event parameters before methods, devices, and systems herein can report the event via the informational alert. For example, the atrial fibrillation duration threshold can be set between 0 and 60 minutes, with a default value of around 10 minutes.

Figure 18C:
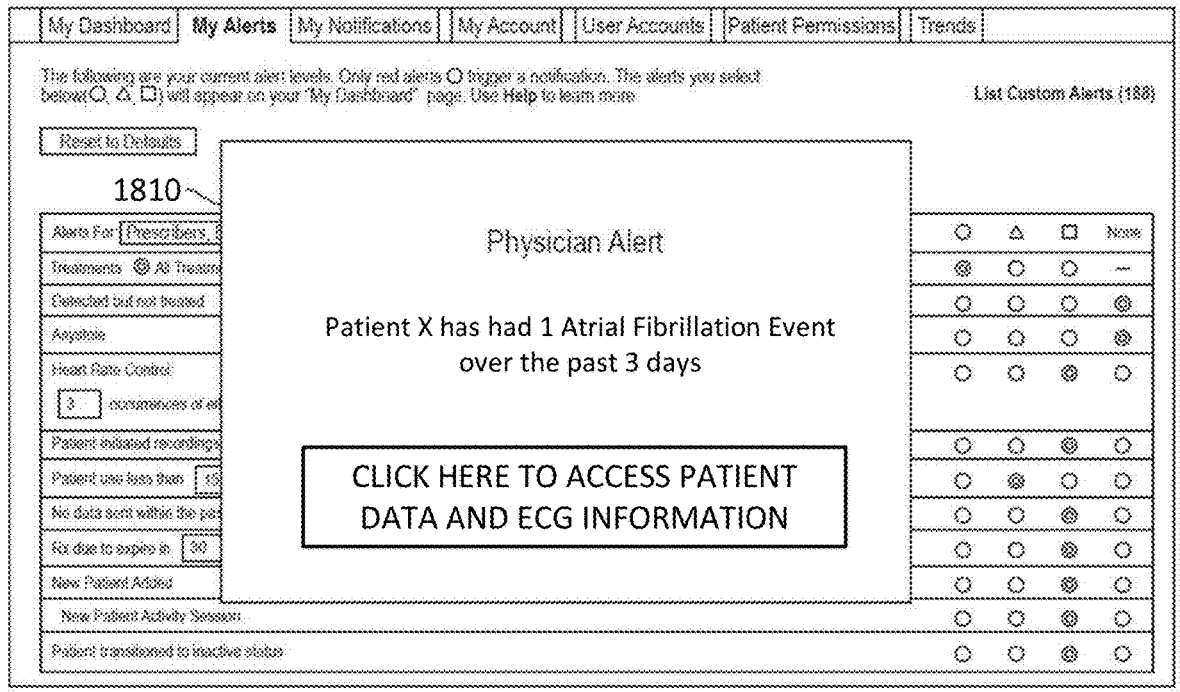

An example alert 1810 showing such atrial fibrillation information is shown in FIG. 18C. A link to similar patient information as described above for FIGS. 18A and 18B can be provided.

A patient may experience a heart pause with a duration greater than a heart pause duration set by the value in the HCP-controllable event parameters before methods, devices, and systems herein can report the event via the informational alert. For example, the heart pause duration threshold can be set between 1000 and 15000 milliseconds, with a default value of around 2500 milliseconds.

Figure 18D:
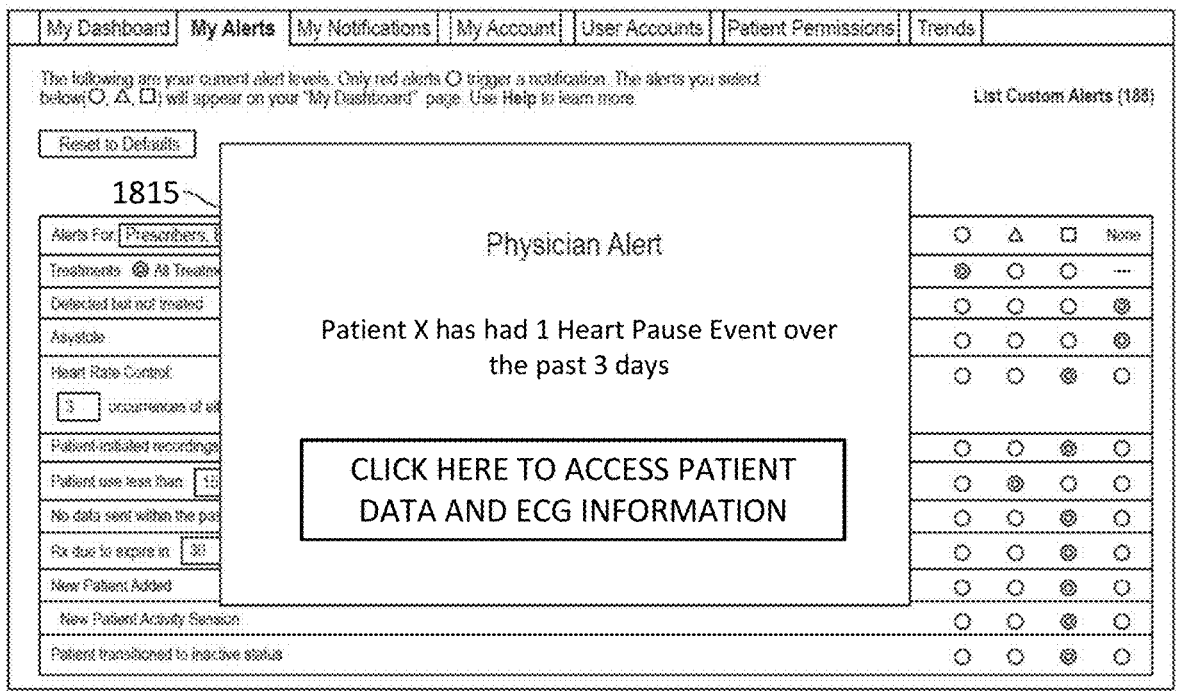

An example alert 1815 with such heart pause information is shown in FIG. 18D. A link to similar patient information as described above for FIGS. 18A and 18B can be provided.

In examples, increase in beta blockers (and other cardioactive medications) can sometimes result in adverse events such as heart blocks, prolonged PR intervals, and/or other ECG-detectable conditions that indicate poor cardiac conduction of the electrical heart activity. Accordingly, the informational alerts 900, 920, and 940 can provide additional ECG metrics to permit an HCP to make informed adjustments to achieve GDMT. For example, a prolonged QRS duration alert can be reported within the informational alert if, e.g., there is a more than a predetermined increase in QRS duration above a certain threshold. The predetermined increase and threshold are HCP-controllable. For instance, an HCP can specify that the informational alert indicate if there is at least a 20% increase in QRS duration or indicate if there is an increase of around 10 ms above a predetermined value of 120 ms.

In implementations, a prolonged PR duration alert can be reported within the informational alert if, e.g., there is a more than a predetermined increase in PR duration above a certain threshold. The predetermined increase and threshold are HCP-controllable. For instance, an HCP can specify that the informational alert indicate if there is at least a 20% increase in PR duration or indicate if there is an increase of around 20 ms above a predetermined value of 200 ms.

In implementations, a prolonged QT duration alert can be reported within the informational alert if, e.g., there is a more than a predetermined increase in QT duration above a certain threshold. The predetermined increase and threshold are HCP-controllable. For instance, an HCP can specify that the informational alert indicate if there is at least a 20% increase in QT duration or indicate if there is an increase of around 40 ms above a predetermined value of 320 ms.

In examples, the information alert can provide information about predetermined changes in ST segments and T waves during the heart rate control period. For example, ST segment threshold parameters can be specified via the HCP-controlled event parameters. For example, the parameters can specify that an ST segment change event be triggered when there is a 1 mm of ST segment depression or elevation. The threshold for reporting can be HCP-controlled via HCP-controlled user interface parameters. For example, the parameters can specify that a T wave change event be triggered when there is an inversion in the T wave.

In implementations, the informational alerts 900, 920, and 940 can provide patient compliance data during the preceding heart rate control period over which heart rate control status is being reported. For example, the informational alert can indicate wear time information. For instance, if the patient wore the cardiac monitoring and/or treatment device for about 4 hours of the night (e.g., preconfigured for 8 hours from 10 PM to 6 AM), then the alert can indicate 50% wear time during a night. The alert can similarly report wear time information for each night of the heart rate control period (e.g., preceding 3 nights). For example, the alert can indicate that on the night of date Jan. 26, 2020 to date Jan. 27, 2020, the wear time was 50%, on the night of date Jan. 27, 2020 to date Jan. 28, 2020, the wear time was 75%, and on the night of date Jan. 29, 2020 to date Jan. 30, 2020, the wear time was 100%. Accordingly, when reviewing an information alert regarding the patient's night time heart rate over the preceding 3 nights, the HCP can also view the patient's wear time status during those 3 nights. As previously noted, and shown in FIG. 8, the HCP can specify custom thresholds for the heart rates and/or number of days or nights for the heart rate control period.

The alert can similarly report wear time information for each day of the heart rate control period (e.g., preceding 3 days). For example, the alert can indicate that on date Jan. 26, 2020, the wear time was 50%, on date Jan. 27, 2020, the wear time was 75%, and on date Jan. 29, 2020, the wear time was 100%. For calculation of wear time, the day can be regarded as beginning at 00:00 hours of a certain date and ending at 24:00 hours of that date. Accordingly, when reviewing an information alert regarding the patient's daily maximum heart rate over the preceding 3 days, the HCP can also view the patient's wear time status during those 3 days. As previously noted, and shown in FIG. 8, the HCP can specify custom thresholds for the heart rates and/or number of days for the heart rate control period.

The wear time information can be provided by the wearable medical monitoring and/or treatment device. For example, wear time can be determined by measuring the amount of time that a patient is wearing a wearable medical device. For example, the medical device can be configured to monitor whether one or more electrodes such as ECG sensing electrodes and/or therapy electrodes as described herein are connected to a controller of the medical device and whether an integrated arrhythmia detection system is activated. If the electrodes are connected and the detection system is activated, the controller can begin recording wear time information. Upon disconnection of the electrodes and/or deactivation of the detection system, the controller can stop recording wear time information. Based upon analysis of the recorded wear time information as provided by the wearable medical device, total wear time can be calculated and, as noted above, included in some examples of the alert.

As noted above, in addition to providing a graphical representation of relationship information between ECG data and drug prescription data, as well as highlighting trends information for the ECG data and the drug prescription information, the techniques as described herein can also be used to apply supervised and/or unsupervised machine learning techniques to optimize heart control medication prescriptions. For example, machine learning techniques can be used to analyze ECG data and drug prescription data for a particular patient to predict various additional information. For example, an expected outcome of a change in medication and/or dosage information can be predicted for a patient. Additionally, in some examples, recommended changes to settings on the patient's wearable medical device (such as treatment settings for a WCD) can be recommended to an HCP based upon analysis of the ECG data and the drug prescription data. Similarly, an HCP can set a desired outcome (e.g., an average daily heart rate of less than 80 bpm) and the machine learning techniques as described herein can be used to recommend medication and/or dosage amounts or changes that are likely to achieve the desired outcome. As such, the techniques as described herein can provide for personalized predictions and recommendations for a particular patient, thereby allowing their HCP to personalize a treatment regimen that is likely to avoid or reduce the risk of any adverse health conditions such as progressing heart failure or repeated arrhythmias.

One approach to providing the personalized predictions can include using collaborative filtering. Collaborative filtering includes making predictions for a person by analyzing outcomes involving similar patients. The underlying assumption of the approach is that if person A is similar to person B in several known attributes then person A will be similar to person B in unknown attributes. In the examples as described herein, a patient population can be studied to determine patient outcomes and, based upon these outcomes, a model such as a trained learning model can be used to make predictions for a particular patient. Examples of learning models include classification models or regression models, for example, regression tree decisions models such as random forest and gradient boosting (e.g., implemented using R or any other statistical/mathematical programming language), artificial neural networks including support vector machines as described herein, linear classifiers or regression models such as logistic regression techniques and naïve Bayes classifiers, nearest neighbor techniques as described herein, and other similar machine learning classifier processes.

In certain implementations, particular data for the patient population can be collected or otherwise extracted from the population data set. For example, drug prescription information can be extracted, ECG and other physiological signals and/or markers can be extracted, clinical outcome data can be extracted, and other similar data that can be used to train the learning model classifier or regression model can be extracted from the population data set. In general, the drug prescription information can include, for example, drug identifiers and drug dosage information such as dosage amount and dosage timing information. In general, the ECG and other physiological signals and/or markers can include historical ECG metrics, pulse oximetry readings, accelerometer data, heart sounds data, blood pressure measurements, thoracic impedance measurements, demographic information, genotype information, protein biomarkers, weight and body mass index information, and other related information that can be determined for the patient population. In general, the clinical outcome data can include symptoms and medical diagnosis associated with the patient population including, for example, acute myocardial infarctions, decompensated congestive heart failure, non-ischemic cardiomyopathy, chest pain, lightheadedness, ejection fraction improvement, heart rate improvement, stabilized heart failure classification, worsening heart failure classification, and other similar potential symptoms and outcomes.

In general, various techniques can be used to model a predictive outcome or to analyze/determine trends in patient ECG data and drug prescription information. For example, FIG. 10 as described below provides a sample overview of a predictive analysis process. A set of patient metrics 1000, including, for example, patient ECG information, drug prescription information, and ECG/drug relationship information (determined, for example, using process 500 as described above) can be provided to a predictive process 1005. Depending upon the design of the process and the expected output, various types of programming can be used for the predictive process 1005. For example, the predictive process 1005 can use machine learning such as artificial neural networks, which is described in greater detail below. By processing the input patient metrics 1000, the predictive process 1005 can produce one or more outputs 1010. For example, the output 1010 can include a current condition of the patient including current heart rate information for the patient and any likely changes to the patient's heartrate as a result of the drug prescription information and the relationship information. Depending upon the desired output of the predictive process 1005, additional information can be output such as what is a likely patient response to a change in drug prescription information and/or what dosage information should the patient be prescribed to achieve a particular desired heart rate.

To properly model an outcome with a desired level of sensitivity and specificity, the predictive process 1005 as described above can be trained using a training data set, thereby resulting in a trained classification or regression model. An example process of training a classification or regression model is described below in the discussion of FIG. 14. In some examples, the predictive process 1005 can use an artificial neural network. Examples of artificial neural networks are described below in the discussion of FIG. 15A.

Figure 10:
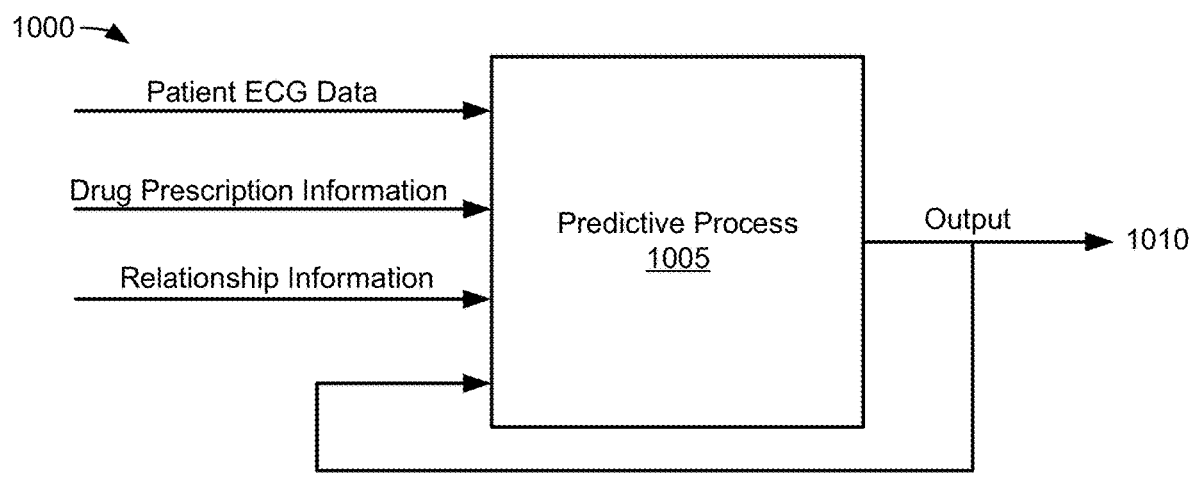
FIG. 10 depicts a sample overview of a process using a predictive analysis, in accordance with an example of the present disclosure.

It should be noted that the overview as shown in FIG. 10 is shown by way of example only. For example, three metrics are shown as an example of the number of metrics that can be used. In actual practice, various other numbers of input metrics can be used for both the predictive analysis as shown in FIG. 10.

Figure 11:
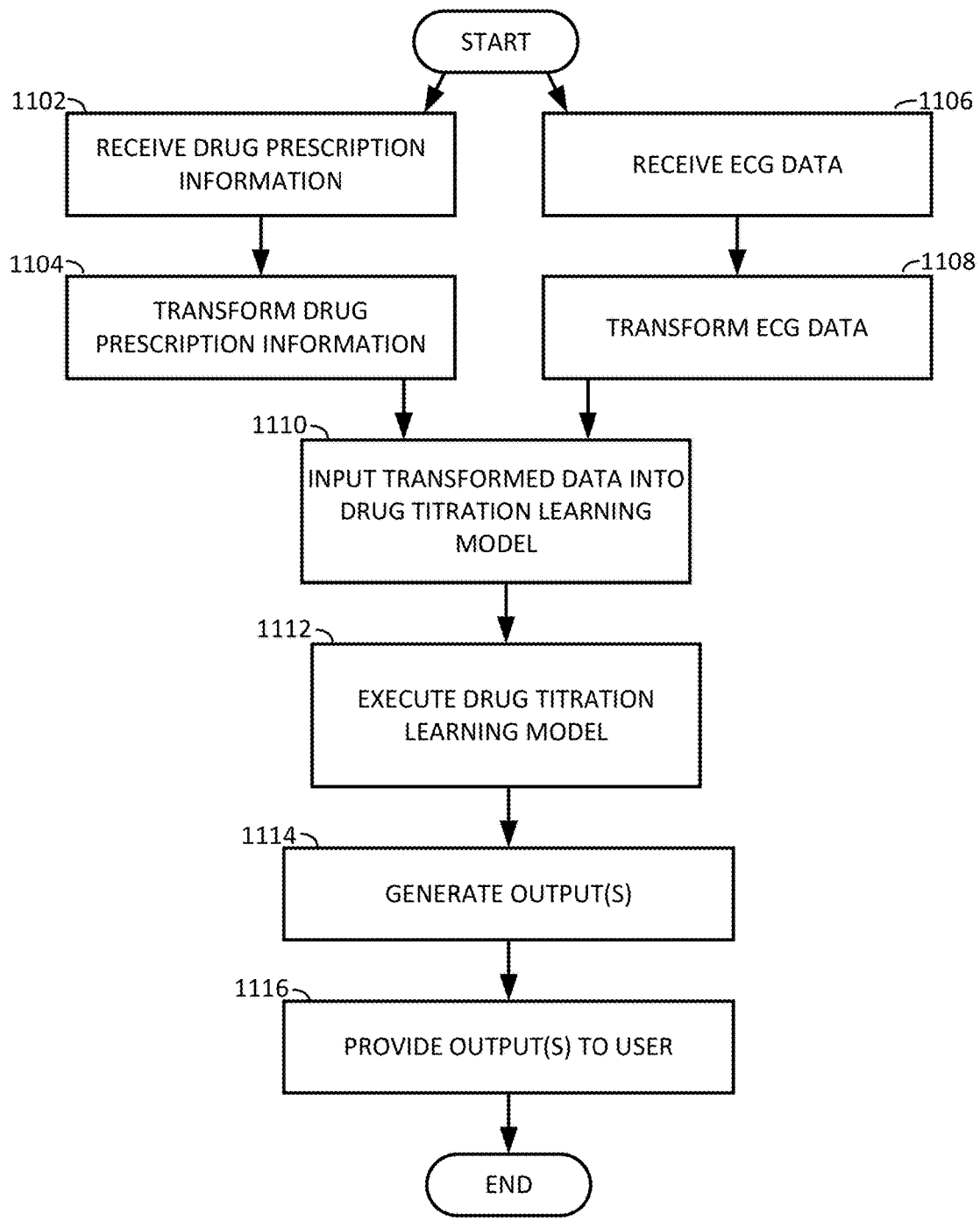
FIG. 11 depicts a sample process flow for generating personalized patient information, in accordance with an example of the present disclosure.

FIG. 11 illustrates a process 1100 for providing personalized predictions and recommendations for a particular patient based on the patient's heart rate information as well as drug prescription information as described above. The process 1100 as shown in FIG. 11 can be implemented by, for example, a monitoring device such as monitoring server 308 as described above. For example, a network interface such as network interface 408 as described above can be configured to receive 1102 drug prescription information. A processor operably coupled to the network interface, such as processor 402 as described above, can be configured to transform 1104 the drug prescription information into a predetermined format for input into a drug titration learning model. For example, the drug titration learning model can be a predictive process similar to predictive process 414 as shown in FIG. 4 or predictive process 1005 as shown in FIG. 10. The drug titration learning model can be configured to receive various input data and generate one or more predicted results and/or recommendations based upon the input data. In some examples, the drug titration learning model includes various drug titration learning model parameters (weights, thresholds, functions, etc.) that have been trained, determined, and/or otherwise set during a learning model training process similar to that as shown, for example, in FIG. 14 below.

Referring back to FIG. 11, the network interface can be further configured to receive 1106 ECG data for a heart failure patient. The processor can be further configured to transform 1108 the ECG data into a predetermined format for input into the drug titration learning model. As further shown in process 1100, the processor can input 1110 the transformed data into the drug titration learning model and execute 1112 the drug titration learning model. Based upon the output of the executed drug titration learning model, the processor can generate 1114 one or more outputs. For example, the processor can generate 1114 a predicted heart rate for the heart failure patient if the current drug dosage information is maintained. The processor can also generate 1114 a predicted heart rate for the heart failure patient if the current drug dosage information is changed. For example, the output can also include a recommended dosage change for a particular drug as generated by a first drug titration learning model as well as a prediction of a resulting change in heart rate for the heart failure patient as generated by a second drug titration learning model. The processor can be further configured to provide 1116 the output to a user via, for example, output circuitry such as output circuitry 410 as described above.

In certain examples, process 1100 as shown in FIG. 11 can include additional actions. For example, the HCP for the heart failure patient can use the drug titration learning model to determine a recommended dosage for a particular desired outcome. The HCP can provide the desired outcome (e.g., an average daily heart rate of 75 bpm) as an additional input for the drug titration learning model. The processor can execute the drug titration learning model with the transformed drug prescription information and the desired outcome as input. The drug titration learning model can be configured to output recommended drug information including, for example, recommended dosage amounts including changes to dosage and/or dosage timing information that are likely to achieve the desired outcome for the heart failure patient.

In some examples of process 1100, the data input into the drug titration learning model can be extended with patient demographic and patient medical history information. For example, patient demographic information can include age, gender, race, etc. For example, patient medical history information includes prior medical conditions, diagnoses, prior hospitalizations, etc. A sample patient history record may include information as indicated below and sample input to the patient monitoring system is also shown below in TABLE 1.

TABLE 1

| Patient X: | Example input to patient monitoring processes |
|---|---|
| Patient is 57 years old, white, female, smoker | Age = 0.75 (0 = below 30, 0.5 = between 30-45; 0.75 = between 45 and 60; 0.9 = between 60 and 80; 1 = over 80) |
| Infectious Diseases: Usual childhood illnesses. No history of rheumatic fever. | Prior_Heart_Failure diagnosis = 1 (0 = No; 1 = Yes) |
| Immunizations: Flu vaccine yearly. Pneumovax 1996 Allergic to Penicillin-developed a diffuse rash after an injection 20 years ago. | Prior_Arrhythmia = 1 (0 = No; 1 = Yes) |
| Transfusions: 4 units received in 1980 for GI hemorrhage, transfusion complicated by Hepatitis B infection. | Prior_Diabetes = 0.75 (0 = No; 0.5 = Yes, under control and management; 0.75 = Yes, intervention needed to better control; 1 = Yes, no control) |
| Hospitalizations: 1996 chest pain; patient was first admitted when she presented with a complaint of intermittent midsternal chest pain, | Smoker = 1 (0 = No; 1 = Yes) Prior_Heart_Related_Hospitalization = 1 (0 = No; 1 = Yes) Prior_MI_Condition = 0 (0 = No; 1 = Yes) |
| ECG showed first degree atrioventricular block, and a chest X-ray showed mild pulmonary congestion, with cardiomegaly. | Renal_assessment = 0.75 (range from 0 to 1; 0 = no prior renal disease; 1 = end stage renal disease - need to go or on dialysis) |
| Myocardial infarction was ruled out by the lack of electrocardiographic and cardiac enzyme abnormalities. Patient was discharged after a brief stay on a regimen of enalapril, and lasix, and digoxin, for presumed congestive heart failure. Since then she has been followed closely by her cardiologist. | Hypercholesterolemia = 0.6 (range from 0 to 1; 0 = no high cholesterol detected in blood; 1 = extremely high levels of cholesterol detected) Blood pressure = 0.6 (range from 0 to 1; 0 = normal blood pressure, well within range; 0.5 = borderline blood pressure, under control; 0.6 = high blood pressure, under control by |
| Operations: 1) Normal childbirth 15 years ago 2) 1989 Gastrointestinal hemorrhage 3) September 1995 chest pain- see history of present illness | medication; 0.7 = high blood pressure, uncontrolled; 1 = dangerously high blood pressure) |

In some implementations, an additional set of physiological metrics may be derived based on patient activity test data from one or more physical activity tests performed by the patient while wearing the wearable medical device. For example, the device may monitor one or more activity tests performed by the patient. In one example, the activity may be a physician ordered physical assessment such as a Walk-Test™ activity assessment administered by the LifeVest® WCD. The purpose of the assessment is to monitor the patient's progress during the activity such as a number of steps, distance traveled during the assessment, and a moving rate of the patient while the patient walks for about 6 minutes.

In certain other implementations, the process 1100 can classify patients in accordance with heart failure classifications adopted by a physician's or hospital group, association, or other regulatory authority. For example, such authority may be the American College of Cardiology (ACC), the American Heart Association (AHA), and the New York heart Association (NYHA). In this regard, the process 1100 may automatically classify the patients based on similar scoring schemes as noted above into the appropriate classes and/or stages of heart failure prior to execution of the drug titration learning model. For example, there may be a specifically trained and configured drug titration learning model for each particular classification.

In some implementations, a user may configure in advance via a user configurable parameter which classification scheme the process 1100 is to implement (e.g., which version of the drug titration learning model to use). For example, a user may be prompted at set up to indicate a classification scheme in accordance with one or more the below options. The user may indicate their option via a user interface (e.g., either locally, on the device, or via a remote configuration parameter on a server that is then transmitted to the device).

Proprietary scoring scheme (as described above)
ACC/AHA scheme
NYHA scheme
ACC/AHA scheme can be implemented as follows:
Stage A: Patients at risk for heart failure who have not yet developed structural heart changes (i.e. those with diabetes, those with coronary disease without prior infarct)
Stage B: Patients with structural heart disease (i.e. reduced ejection fraction, left ventricular hypertrophy, chamber enlargement) who have not yet developed symptoms of heart failure
Stage C: Patients who have developed clinical heart failure
Stage D: Patients with refractory heart failure requiring advanced intervention (i.e. biventricular pacemakers, left ventricular assist device, transplantation)

NYHA scheme can be implemented as follows. The NYHA has categorized each of the diagnosis into four classifications. Class I and Class II are considered mild. Class III is considered moderate and Class IV is severe. In Class I there are no restrictions of physical activity. With Class II heart failure, patients will feel slight restrictions with everyday physical actions like bending over or walking. Class III heart failure patients experience definite limitations during physical activity. Patients in Class IV heart failure are virtually unable to do any physical activity without discomfort.

In certain implementations, the classifications as described above may be used to determine which drug titration learning model to use. For example, with patients in NYHA Class I, the generated output of a particular drug titration learning model may include a less aggressive approach to regulating the patient's heart rate through changes to dosage amounts. Conversely, for a more serious heart failure patient such as patient in NYHA Class III, the generated output of a particular drug titration learning model may include a more aggressive approach to regulating and reducing the patient's heart rate through changes to dosage amounts.

Figure 12:
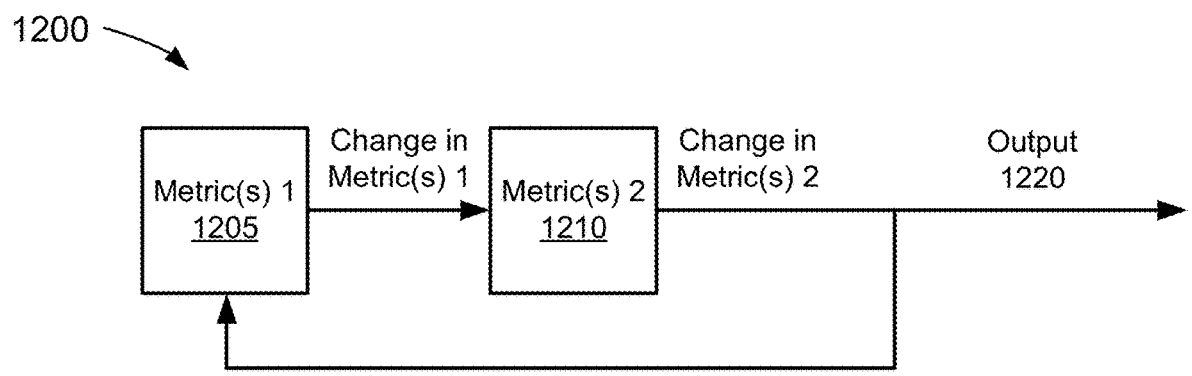
FIG. 12 depicts a sample overview of a process using a trends analysis, in accordance with an example of the present disclosure.

In addition to providing heart rate predictions and drug recommendations, patient ECG data and drug prescription information as described herein can also be used to identity one or more trends in the data. FIG. 12 illustrates a sample overview of a trends analysis process. The process 1200 can include monitoring a first metric(s) 1205. If a change is detected in the first metric 1205, or the first metric(s) exceeds a certain threshold, the process 1200 can trigger monitoring a second metric(s) 1210. Similarly, if a change is detected in the second metric(s) 1210, or the second metric (s) exceeds a certain threshold, the process can output 1220 an indication to, for example, the patient or the patient's physician. In an example, the process 1200 can be used to monitor for trends in a patient's condition that are indicative of changes in heart rate. For example, if in process 1200 it is detected that there is a change in the patient's drug prescription information (metric 1), the process can monitor the patient's heart rate (metric 2) for any changes. If the patient's heart rate changes and exceeds a particular threshold (e.g., a change of more than 10 bpm over a 24-hour period), output 1220 can be generated showing the changes in the heart rate trend. As shown, the output 1220 can be fed back into the trends analysis process to cause the process to adjust its response to the changes in the underlying metrics.

Figure 13:
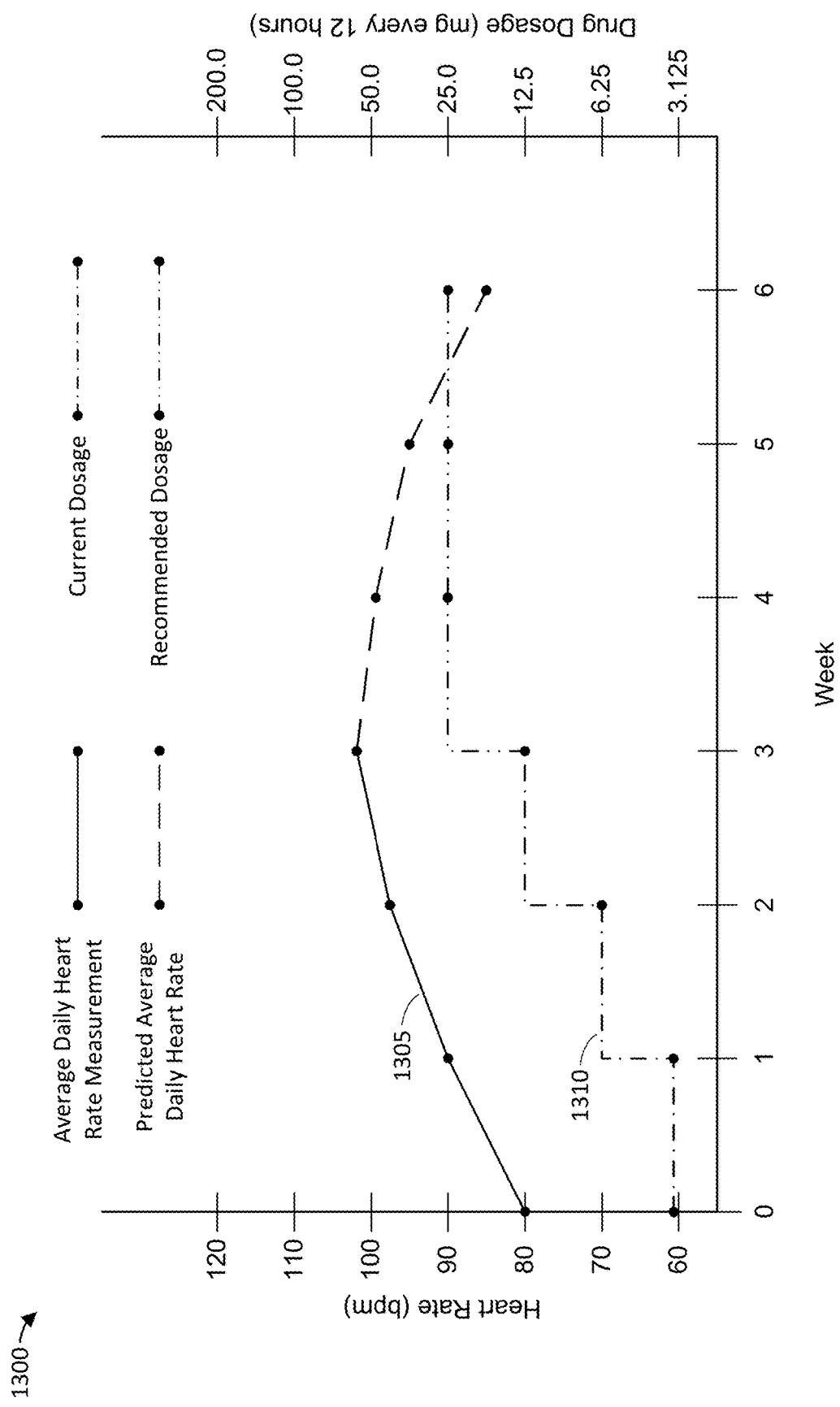
FIG. 13 depicts a sample graph showing predicted outcomes of a personalized treatment regimen, in accordance with an example of the present disclosure.

In some examples, one or both of the outputs of process 1100 and/or 1200 can be provided graphically to, for example, an HCP for a heart failure patient. For example, graph 1300 as shown in FIG. 13 includes both an identified trend (e.g., as determined by process 1200) as well as a recommended change in drug dosage and a predicted heart rate change (e.g., as determined by process 1100). For example, as shown by line 1305, the patient's heart rate continued to climb between week zero and week three. Similarly, as shown by line 1310, as the patient's drug dosage was increased from 3.125 mg/12 hrs (at week 1) to 12.5 mg/12 hrs (at week 3), the patient's heart rate continued to trend upward. However, at week three, a prediction was made that, upon increasing the drug dosage to 25 mg/12 hrs, the patient's predicted heart rate will begin to drop, as shown in the predicted portion of line 1305 between week three and week six. Thus, the graph 1300 includes representations of trend data (the observed and known data between week zero and week three), predicted heart rate information (the predicted portion of line 1305 between week three and week six), and recommended drug information (the recommended change in drug dosage between week three and week four).

It should be noted that the information as shown contained in graph 1300 as shown in FIG. 13 is provided by way of example only. In certain examples, the graphical representation as provided to a user such as an HCP can include trend data, predicted heart rate information, recommended changes to drug information, or some combination of the various output data.

Figure 14:
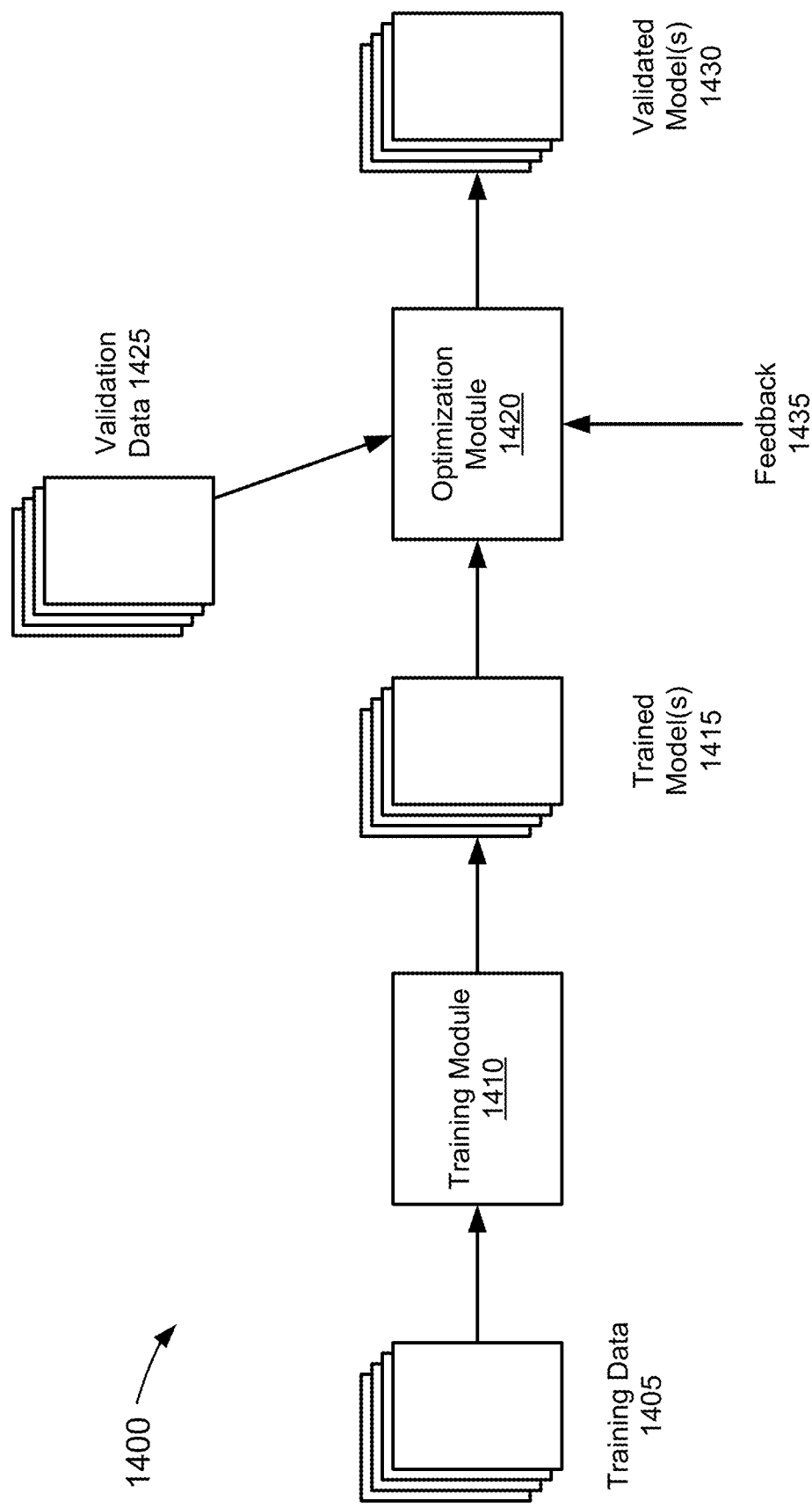
FIG. 14 depicts a sample process for developing a machine learning process, in accordance with an example of the present disclosure.

As noted above, the predictive process 1005 and the drug titration learning model as described in the discussion of FIG. 11 can be based upon learning models that have been trained and validated using a sample population. FIG. 14 illustrates a sample flow 1400 for training and validating one or more classification or regression models for a machine learning process as described above. A set or population of known patient records can be provided as the data set used to train and validate the classification or regression models. For example, the known patient records data set may include 1000 patients that have suffered from a specific type of heart condition such as high heart rate, their treatment regimens, and the associated outcomes for each patient. A percentage of the known patient data records can be used as the training data set 1405. For example, 80%, or 800, of the patient records can be used as the training data set 1405. The training data set 1405, as noted above, can include a variety of available information for a plurality of patients, including, but not limited to, historical ECG metrics, prescribed drug identifiers, dosage measurements, dosage timing information, heart rate information, demographic and medical history data, patient activity and test data, and other related data. The training data set 1405 can also include historical information regarding how each training data set was classified or scored into an appropriate score category (or NYHA class or ACC/AHA stage). As such, one or more trained models can be developed for, for example, each classification in the NYHA class system as described above.

In certain implementations, the training data can include training variables extracted from data such as raw patient ECG signals. For example, to predict heart rate changes over time as related to changes in drug prescription information, the learning model training data can include one or more metrics extracted from the raw ECG signals. In certain implementations, the training data set 1405 can include heart rate information as well as heart rate variability information as extracted from the raw ECG signals. In some examples, the training data set 1405 can include additional ECG metrics such as PVC burden or counts, atrial fibrillation burden, pauses, heart rate turbulence, QRS height, QRS width, changes in a size or shape of morphology of the ECG data, cosine R-T, artificial pacing, QT interval, QT variability, T wave width, T wave alternans, T-wave variability, and ST segment changes.

The training data set 1405 can be fed into a training module 1410. The training module 1410 can include one or more untrained data structures such as a series of data trees (e.g., organized using a random forest tool). Using the known input variables and known outcomes from the training data set 1405, the training module 1410 can iteratively process each data point in the training set, thereby training the data structures to more accurately produce the expected (and known) outcomes.

Once the training module 1410 has exhausted the training data set 1405, the training module can output one or more trained classifier or regression models 1415. The one or more trained classifier or regression models 1415 can represent a set of models that provide the most accurate classification and generation of an outcome for a known set of input variables that could be generated from the training data set 1405. An optimization module 1420 can be configured to further refine the trained classifier or regression model(s) 1415 using additional patient records. For example, a validation data set 1425 can be input into the optimization module 1420 for further optimization of the one or more trained classifier or regression models 1415. To continue the above example, the validation data set 1425 can include 200 patient records. Typically, there is no overlap between a training data set and a validation data set as there is no advantage to running the same data set twice.

As shown in FIG. 14, the optimization module 1420 can process the validation data set 1425 to optimize the trained classifier or regression models 1415 by, for example, refining thresholds, tuning learning parameters (e.g., learning rate and regularization constant information), and other similar optimization processes. The optimization module 1420 can produce one or more validated classifier or regression models 1430. Depending upon the intended purpose of the validated classifier or regression models 1430, the models can have certain classifier or regression parameters (e.g., a certain specificity and/or sensitivity).

As the validated classifier or regression models are used to classify or provide output values for new patients (e.g., to produce new outputs for a set of patient metrics as described herein), the produced outcomes can be used to better validate the process using a closed loop feedback system. For example, as a patient is classified and treated, the result of that treatment can be included in the patient record and verified by, for example, the patient's physician. The patient's record, now updated to include a known outcome, can then be provided as feedback 1435 to the optimization module 1420. The validation module can process the feedback 1435, comparing a generated output against the known outcome for the patient. Based upon this comparison, the optimization module 1420 can further refine the validated or regression models 1430, thereby providing a closed loop system where the models are updated and upgraded regularly. Additionally, the validated classifier or regression models 1430 can be further refined based upon user-provided changes to the classifier or regression parameters. For example, process 1100 as shown in FIG. 11 and described above can further include receiving user-selected changes to at least one of the classifier or regression parameters of the drug titration learning model. In certain implementations, the user can access a user interface (e.g., similar to user interface 800) that includes an option to change at least one of the classifier or regression parameters of the drug titration learning model. The drug titration learning model can then be refined or otherwise updated to reflect the changes to the classifier or regression parameters.

Figure 15A:
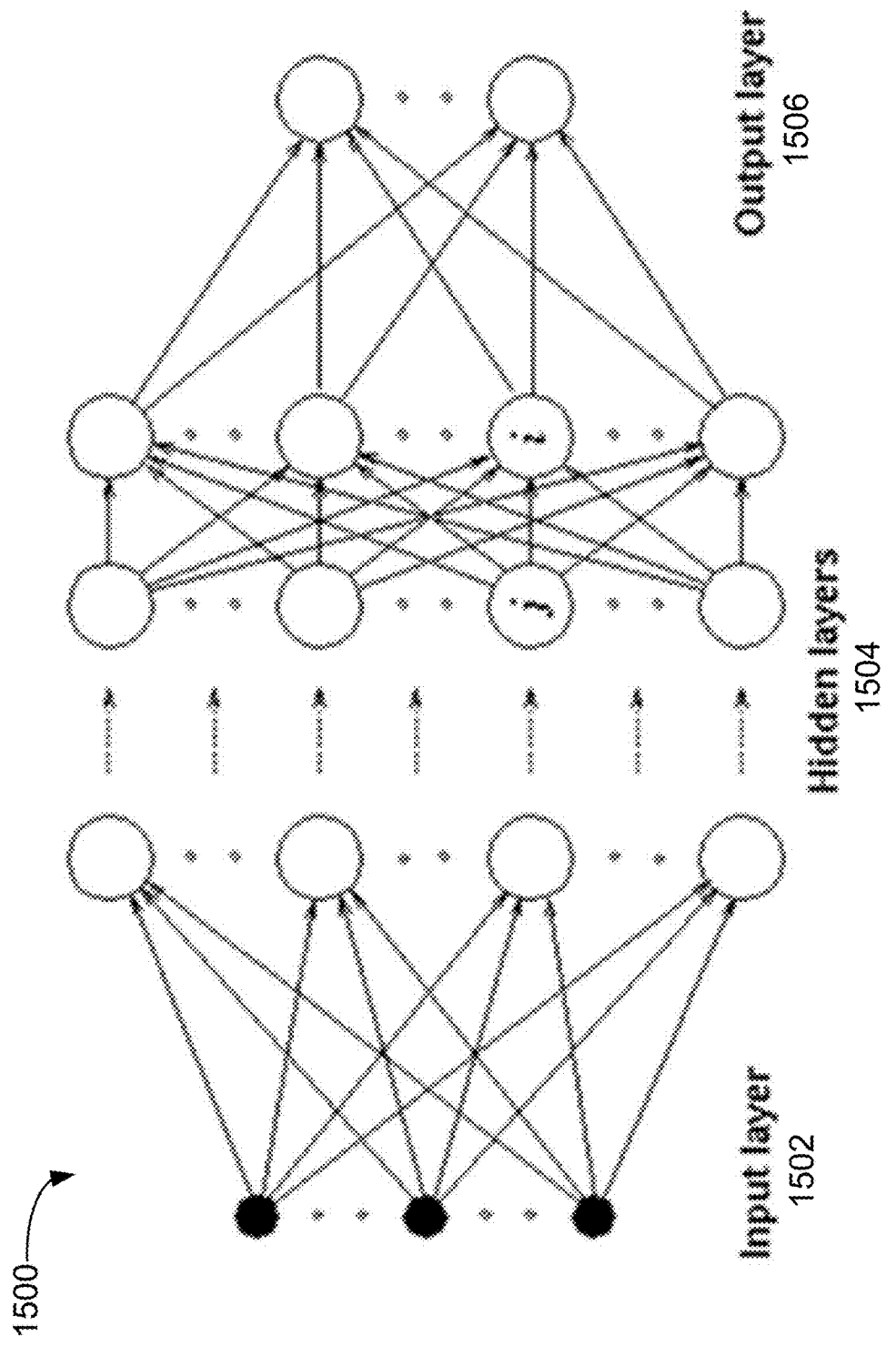
FIG. 15A depicts a sample architecture of an artificial neural network, in accordance with an example of the present disclosure.

In another example, a predictive process such as the drug titration learning model as described herein can be implemented as a network of nodes interconnected to form an artificial neural network. For example, FIG. 15A illustrates a topography for a sample artificial neural network 1500. The artificial neural network 1500 can include, for example, one or more nodes organized into an input layer 1502, a series of hidden layers 1504, and one or more nodes organized into an output layer 1506.

In an artificial neural network, the nodes include a plurality of artificial neurons, each artificial neuron having at least one input with an associated weight. The artificial neural network can be trained using the physiological parameters such that the associated weight of the at least one input of each artificial neuron of the plurality of artificial neurons is adjusted in response to respective first, second and third parameters of different sets of data from the patient physiological parameters. This results in the artificial neural network being trained to produce a patient condition score.

An artificial neural network may be a mathematical model or computational model inspired by the structure and/or functional aspects of a biological neural network and implemented as a universal function approximator. In embodiments, the nodes of the artificial neural network include at least one input, at least one neuron and at least one output. The neuron may be present in a single hidden layer of the artificial neural network and may take two or more inputs. In examples where the artificial neural network has a plurality of neurons, the plurality of neurons may be distributed across one or more hidden layers. Where there is more than one layer, each layer may be interconnected with a previous and a subsequent layer.

The artificial neural network may be an adaptive system, where it changes based on external or internal information that flows through the artificial neural network during the training or learning phase. Specifically, the weight (or strength) of the connections (such as between adjacent artificial neurons, or between an input and an artificial neuron) within the artificial neural network is adapted to change to match the known outputs.

In examples, a first parameter (e.g., ECG data), and a second parameter (e.g., drug prescription information) or a combination of the first parameter and the second parameter may be classified as feature vectors of the patient physiological parameters. The artificial neural network may be trained with the feature vectors. In some examples, the artificial neural network can be trained on raw ECG signals. The artificial neural network may be implemented as instructions stored in a memory that when executed by a processor cause the processor to perform the functions of the artificial neural network.

Figure 15B:
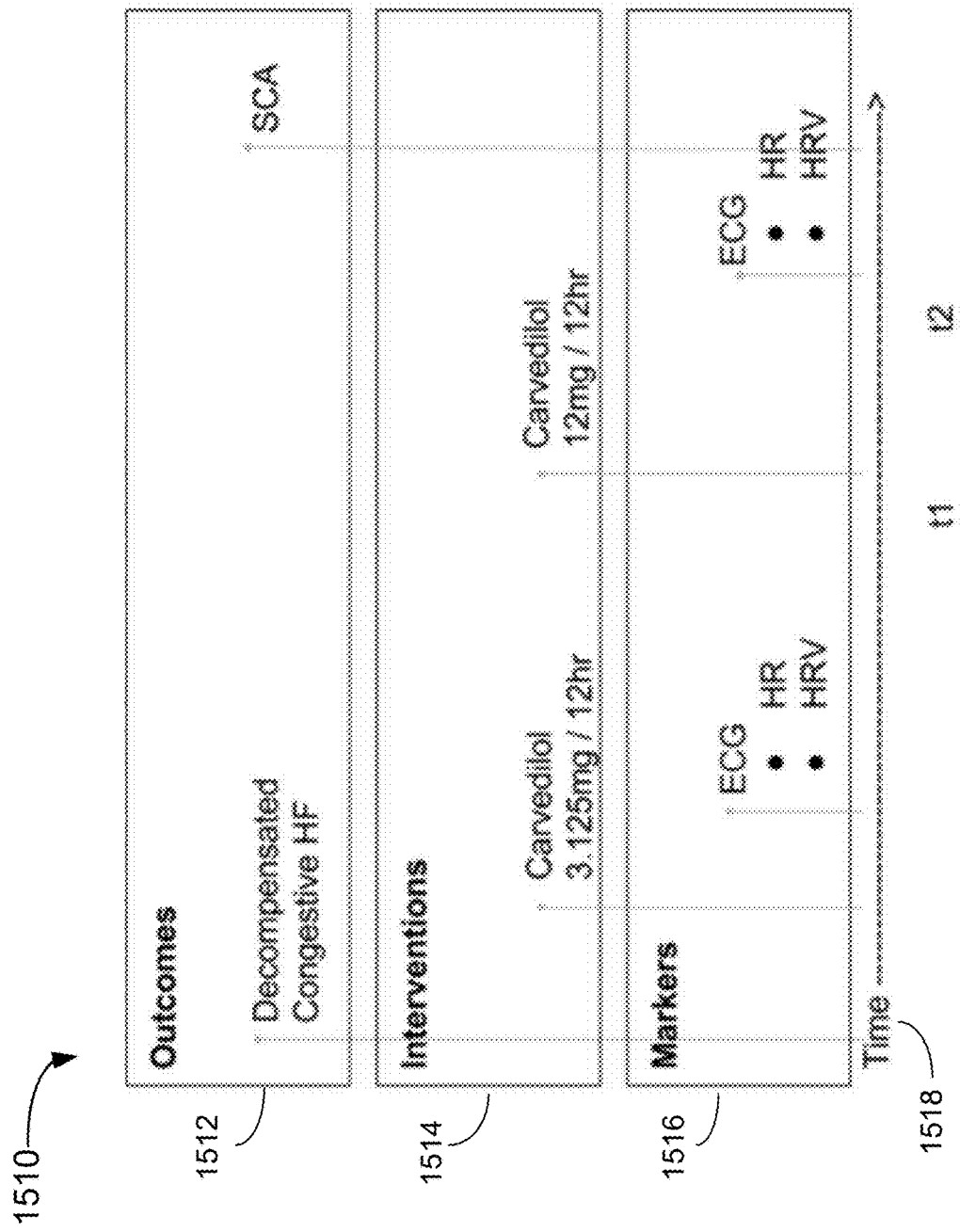
FIG. 15B illustrates a sample data stream for use in developing a prediction model, in accordance with an example of the present disclosure.

In an example, a model-based prediction approach can be used to predict potential medication and dosage changes for a particular patient. FIG. 15B illustrates a sample data stream 1510 collected over a period of time that can be used to develop a prediction model as described herein. For example, as shown in FIG. 15B, the data stream 1510 can include a set of outcomes 1512, a set of interventions 1514, and a set of markers 1516. Various pieces of data can be illustrated on the data stream 1510 over a period of time represented by timeline 1518. For example, at a time before t1 on timeline 1518, the patient experiences decompensated congestive heart failure, which is listed in the outcomes 1512. Additionally, prior to time t1, the patient was prescribed an initial dose of carvedilol (as shown in interventions 1514) and had ECG information reported (as shown in markers 1516) including heart rate and heart rate variability. At time t1 as shown on timeline 1518, the patient's prescription of carvedilol was upped to 12 mg dosage amount every 12 hours (as shown in the interventions 1514). At about time t2 on timeline 1518, additional ECG information was collected for the patient, including heart rate and heart rate variability. Sometime after t2, the patient experienced sudden cardiac arrest, as shown in outcomes 1512.

Using a supervised learning method as described above (e.g., logistic regression, artificial neural network, support vector machine), a prediction function can be trained wherein the inputs include all available information as described above (i.e., markers, outcomes, interventions as shown in the data stream of FIG. 15B) that are available at t1 as well as a new medical prescription. The output of the prediction function can include either a predicted metric or a clinical outcome at t2. More specifically, on Jan. 1, 2018 the medical history of patient that recently experienced an acute myocardial infarction including the prior five days of ECG data and derived ECG metrics, current medication and dosage information as well as potential medication and dosage change information are provided as inputs to a classifier or regression model. For example, a classifier or classification model outputs a categorical assignment (e.g. high or low risk for a heart failure event). A regression model outputs a continuous quantity, such as a heart rate in beats per minute, as described herein. Accordingly, the output of a regression model, in some implementations, is the predicted heart rate for the patient on Jan. 6, 2018 as resulting from the change in medication and dosage. Thus, the regression model can provide a prediction of heart rate change from the medication change. A classifier model can provide an indication of whether the patient's risk of developing a future serious adverse event is high or low. The classifier model or regression model can be personalized to the patient's condition by accepting a history of metrics and clinical information as the inputs.

A regression model can also be used to determine the best medication and dosage to achieve a given target. For example, a regression model may provide an indication of a recommended dosage. This can be achieved by searching the space of medication/dose for a predicted outcome that is close to the target. Using a model that is differentiable with respect to the dose input (as would be the case for a logistic regression, support vector machine, or artificial neural network), the regression model can be used to efficiently search for the optimal dose using, for example, a gradient descent method.

In another example, a memory-based prediction approach can be used to provide a prediction for a particular patient. In a memory-based approach, a neighborhood formation process can be used. First, the approach can include defining a target outcome (e.g., heart rate reduction without undesirable side effects). The approach can further include defining a target intervention (e.g., change in medication and/or dosage), a vector space of pre-intervention attributes (markers, prior interventions, and prior outcomes for a patient population), and a similarity measure to apply to that space. Examples of similarity measures can include a Pearson correlation similarity, a cosine similarity, a Euclidean distance, and a Mahalanobis distance.

Figure 15C:
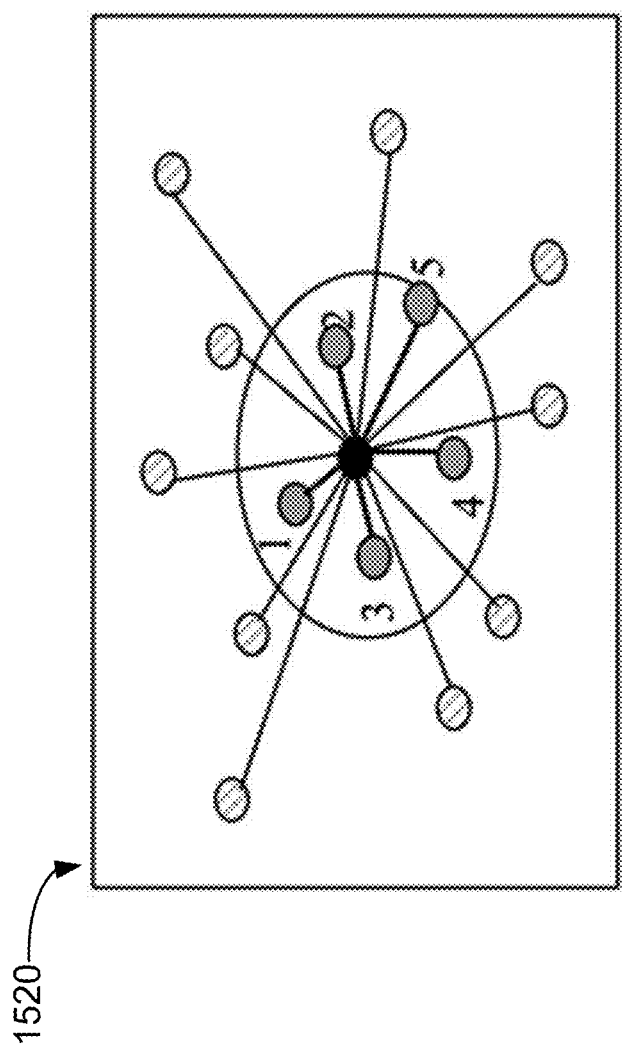
FIG. 15C depicts a sample neighborhood plot for use in a memory-based prediction model, in accordance with an example of the present disclosure.

As shown in FIG. 15C, a neighborhood plot 1520 includes a patient X (represented by the black dot) and a set of patients having similar characteristics to patient X. The distance between each of the other patients and patient X and the other patients can be computed using the similarity measurement. As shown in plot 1520, the five closest patients k to patient X have been identified and labeled as 1-5. A processor can then aggregate response information for the k nearest neighbors to patient X. For example, when determining a recommended dosage for patient X, one aggregation approach can be to take a weighted average dose for neighbors with a positive outcome to the prescribe dosage to determine a recommended dosage for patient X.

In addition to using a learning process such as an artificial neural network or other machine learning processes as described above, trends analysis can also be used to monitor a patient for changes in their condition and provide output such as changes to the patient's treatment regimen. In certain implementations, a trends analysis can include determining a presence of a substantial relationship between changes in two or more physiological parameters. For example, as described above in regard to FIG. 12, detecting a change in one particular metric can trigger monitoring of another metric. This additional monitoring can be performed to confirm trends in the monitored metrics as well as to provide additional information related to the overall condition of the patient.

One example of a trends analysis is a correlation analysis. A correlation analysis is the quantification of a linear relationship between two variables and can be represented by a value between negative 1.0 and 1.0, generally referred to as the Pearson Product Moment correlation coefficient and denoted as r. As the correlation coefficient approaches 1.0, it indicates a strong and positive association between the two variables. As the correlation coefficient approaches negative 1.0, it indicates a strong and negative association between the two variables. A correlation value close to zero indicates no linear association between the two variables.

In certain examples, there may be two sets of data samples, X and Y. For example, the X data set may be data sampled from curve X such as a heart rate curve, and the Y data set may be data sampled from curve Y such as a drug dosage information curve for a particular type of drug. In certain implementations, a correlations analysis can be performed using the Pearson correlation function, the Fisher transformation, or other similar correlation functions. For example, using the Pearson correlation function, correlation between n pairs of data {X, Y} can be calculated, wherein X and Y are samples of fixed duration. To continue the above example, X can be measured from the heart rate curve and Y can be measured from the drug dosage information curve. The Pearson Product Moment r as noted above can be obtained by substituting variances and covariances based samples of the {X, Y} data sets. The resulting value for r is a value between −1.0 and 1.0. In this example, a value of 1.0 would indicate a perfect X, Y relationship, i.e., that as heart rate increases then drug dosage increases accordingly. A value of −1.0 would indicate a perfect negative relationship. For example, as heart rate increases then drug dosage decreases. Conversely, as heart rate decreases then drug dosage increases. A value of 0.0 implies there is no linear relationship between the variables. Such an analysis can be used to determine a value of r for a particular patient population to determine if there is a correlation between heart rate and dosage information for a particular population of patients.

A predictive recommendation tool as described above can be based on at least two components: a predictive model and a recommendation engine.

As noted above, a predictive model takes as input at least the following:
 history of heart rate and other information derived from a wearable device;
 history of medication type and dosage;
 a new medication and dosage;
Such a predictive model can output a predicted heart rate or other outcome (e.g. hospitalization related to heart failure) at some specified point in the future.

The recommendation engine then accepts a desired outcome at some specified point in the future (e.g. a target heart rate in N days) and outputs a recommended medication and dosage. In examples, the output can also include a predicted outcome or a range of predicted outcomes from the predictive model.

In measuring a performance of such a tool, Applicants can measure the error between the actual and predicted outcomes. Example measures that can be implemented include:
 Root mean squared error (RMSE), in BPM, between predicted and actual heart rate
 Estimated probability that the actual heart rate is within a desired range of the target heart rate (e.g. target +/−5 BPM)
 Estimated probability of severe bradycardia or pauses
 Estimated probability that the actual heart rate is above a tachycardia threshold In examples, the recommendation engine can also combine these metrics, e.g., find a dose that minimizes RMSE for target heart rate subject to the constraint that the probability of severe bradycardia or pauses is less than some threshold. Applicants have also generalized the target to other outcomes like reduced probability of hospitalization related to heart failure.

The teachings of the present disclosure can be generally applied to external medical monitoring and/or treatment devices. Such external medical devices can include, for example, ambulatory medical devices as described herein that are capable of and designed for moving with the patient as the patient goes about his or her daily routine. An example ambulatory medical device can be a wearable medical device such as a WCD, a wearable cardiac monitoring device, an in-hospital device such as an in-hospital wearable defibrillator (HWD), a short-term wearable cardiac monitoring and/or therapeutic device, mobile cardiac event monitoring devices, and other similar wearable medical devices.

The wearable medical device can be capable of continuous use by the patient. In some implementations, the continuous use can be substantially or nearly continuous in nature. That is, the wearable medical device can be continuously used, except for sporadic periods during which the use temporarily ceases (e.g., while the patient bathes, while the patient is refit with a new and/or a different garment, while the battery is charged/changed, while the garment is laundered, etc.). Such substantially or nearly continuous use as described herein may nonetheless be considered continuous use. For example, the wearable medical device can be configured to be worn by a patient for as many as 24 hours a day. In some implementations, the patient can remove the wearable medical device for a short portion of the day (e.g., for half an hour to bathe).

In some examples, the wearable medical device can be designed for intermittent use. For example, the wearable medical device can be designed to be worn for half an hour in the morning, half an hour in the afternoon, and half an hour in the evening. During these wear periods, the device can be collecting ECG information for additional analysis as described herein.

Further, the wearable medical device can be configured as a long term or extended use medical device. Such devices can be configured to be used by the patient for an extended period of several days, weeks, months, or even years. In some examples, the wearable medical device can be used by a patient for an extended period of at least one week. In some examples, the wearable medical device can be used by a patient for an extended period of at least 30 days. In some examples, the wearable medical device can be used by a patient for an extended period of at least one month. In some examples, the wearable medical device can be used by a patient for an extended period of at least two months. In some examples, the wearable medical device can be used by a patient for an extended period of at least three months. In some examples, the wearable medical device can be used by a patient for an extended period of at least six months. In some examples, the wearable medical device can be used by a patient for an extended period of at least one year. In some implementations, the extended use can be uninterrupted until a physician or other caregiver provides specific instruction to the patient to stop use of the wearable medical device.

Regardless of the extended period of wear, the use of the wearable medical device can include continuous or nearly continuous wear by the patient as described above. For example, the continuous use can include continuous wear or attachment of the wearable medical device to the patient, e.g., through one or more of the electrodes as described herein, during both periods of monitoring and periods when the device may not be monitoring the patient but is otherwise still worn by or otherwise attached to the patient. The wearable medical device can be configured to continuously monitor the patient for cardiac-related information (e.g., electrocardiogram (ECG) information, including arrhythmia information, cardio-vibrations, etc.) and/or non-cardiac information (e.g., blood oxygen, the patient's temperature, glucose levels, tissue fluid levels, and/or lung vibrations). The wearable medical device can carry out its monitoring in periodic or aperiodic time intervals or times. For example, the monitoring during intervals or times can be triggered by a user action or another event.

As noted above, the wearable medical device can be configured to monitor other physiologic parameters of the patient in addition to cardiac related parameters. For example, the wearable medical device can be configured to monitor, for example, pulmonary-vibrations (e.g., using microphones and/or accelerometers), breath vibrations, sleep related parameters (e.g., snoring, sleep apnea), tissue fluids (e.g., using radio-frequency transmitters and sensors), among others.

Other example wearable medical devices include automated cardiac monitors and/or defibrillators for use in certain specialized conditions and/or environments such as in combat zones or within emergency vehicles. Such devices can be configured so that they can be used immediately (or substantially immediately) in a life-saving emergency. In some examples, the ambulatory medical devices described herein can be pacing-enabled, e.g., capable of providing therapeutic pacing pulses to the patient. In some examples, the ambulatory medical devices can be configured to monitor for and/or measure ECG metrics including, for example, heart rate, heart rate variability, PVC burden or counts, atrial fibrillation burden, pauses, heart rate turbulence, QRS height, QRS width, changes in a size or shape of morphology of the ECG information, cosine R-T, artificial pacing, QT interval, QT variability, T wave width, T wave alternans, T-wave variability, and ST segment changes.

Figure 16A:
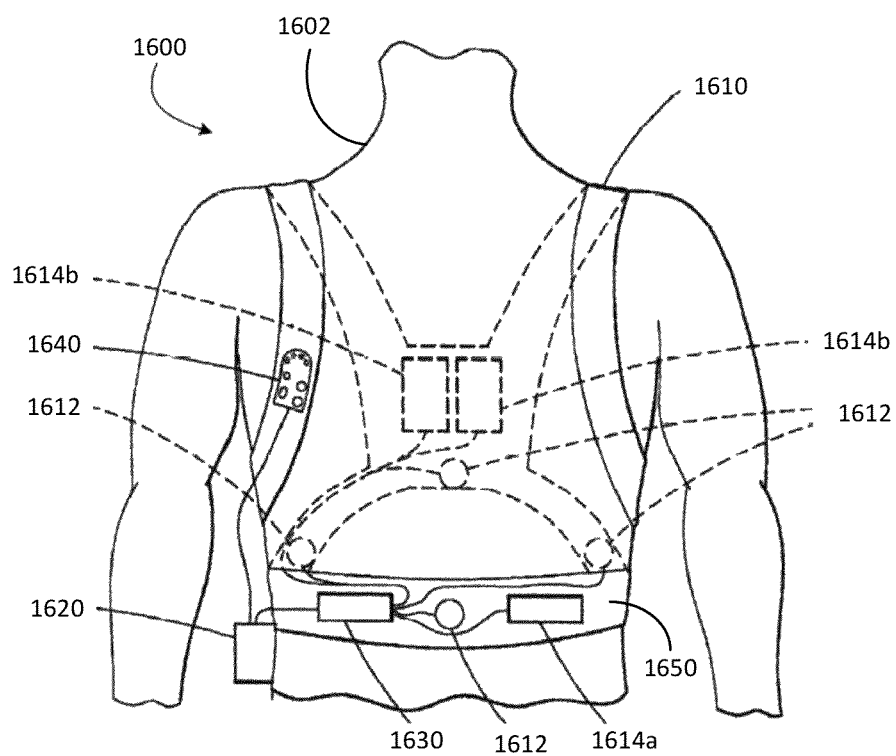
FIGS. 16A-16D depict sample ambulatory medical devices that may be prescribed to a heart failure patient, in accordance with an example of the present disclosure.

FIG. 16A illustrates an example medical device 1600 that is external, ambulatory, and wearable by a patient 1602, and configured to implement one or more configurations described herein. For example, the medical device 1600 can be a non-invasive medical device configured to be located substantially external to the patient. Such a medical device 1600 can be, for example, an ambulatory medical device that is capable of and designed for moving with the patient as the patient goes about his or her daily routine. For example, the medical device 1600 as described herein can be bodily-attached to the patient such as the LifeVest® wearable cardioverter defibrillator available from ZOLL® Medical Corporation. Such wearable defibrillators typically are worn nearly continuously or substantially continuously for two to three months at a time. During the period of time in which they are worn by the patient, the wearable defibrillator can be configured to continuously or substantially continuously monitor the vital signs of the patient and, upon determination that treatment is required, can be configured to deliver one or more therapeutic electrical pulses to the patient. For example, such therapeutic shocks can be pacing, defibrillation, or transcutaneous electrical nerve stimulation (TENS) pulses.

The medical device 1600 can include one or more of the following: a garment 1610, one or more sensing electrodes 1612, one or more therapy electrodes 1614a and 1614b (collectively referred to herein as therapy electrodes 1614), a medical device controller 1620 (e.g., controller 100 as described above in the discussion of FIG. 1), a connection pod 1630, a patient interface pod 1640, a belt 1650, or any combination of these. In some examples, at least some of the components of the medical device 1600 can be configured to be affixed to the garment 1610 (or in some examples, permanently integrated into the garment 1610), which can be worn about the patient's torso.

The medical device controller 1620 can be operatively coupled to the sensing electrodes 1612, which can be affixed to the garment 1610, e.g., assembled into the garment 1610 or removably attached to the garment, e.g., using hook and loop fasteners. In some implementations, the sensing electrodes 1612 can be permanently integrated into the garment 1610. The medical device controller 1620 can be operatively coupled to the therapy electrodes 1614. For example, the therapy electrodes 1614 can also be assembled into the garment 1610, or, in some implementations, the therapy electrodes 1614 can be permanently integrated into the garment 1610.

Component configurations other than those shown in FIG. 16A are possible. For example, the sensing electrodes 1612 can be configured to be attached at various positions about the body of the patient 1602. The sensing electrodes 1612 can be operatively coupled to the medical device controller 1620 through the connection pod 1630. In some implementations, the sensing electrodes 1612 can be adhesively attached to the patient 1602. In some implementations, the sensing electrodes 1612 and at least one of the therapy electrodes 1614 can be included on a single integrated patch and adhesively applied to the patient's body.

The sensing electrodes 1612 can be configured to detect one or more cardiac signals. Examples of such signals include ECG signals and/or other sensed cardiac physiological signals from the patient. In certain examples, as described herein, the sensing electrodes 1612 can include additional components such as accelerometers, acoustic signal detecting devices, and other measuring devices for recording additional parameters. For example, the sensing electrodes 1612 can also be configured to detect other types of patient physiological parameters and acoustic signals, such as tissue fluid levels, cardio-vibrations, lung vibrations, respiration vibrations, patient movement, etc.

In some examples, the therapy electrodes 1614 can also be configured to include sensors configured to detect ECG signals as well as other physiological signals of the patient. The connection pod 1630 can, in some examples, include a signal processor configured to amplify, filter, and digitize these cardiac signals prior to transmitting the cardiac signals to the medical device controller 1620. One or more of the therapy electrodes 1614 can be configured to deliver one or more therapeutic defibrillating shocks to the body of the patient 1602 when the medical device 1600 determines that such treatment is warranted based on the signals detected by the sensing electrodes 1612 and processed by the medical device controller 1620. Example therapy electrodes 1614 can include metal electrodes such as stainless-steel electrodes that include one or more conductive gel deployment devices configured to deliver conductive gel to the metal electrode prior to delivery of a therapeutic shock.

In some implementations, medical devices as described herein can be configured to switch between a therapeutic medical device and a monitoring medical device that is configured to only monitor a patient (e.g., not provide or perform any therapeutic functions). For example, therapeutic components such as the therapy electrodes 1614 and associated circuitry can be optionally decoupled from (or coupled to) or switched out of (or switched in to) the medical device. For example, a medical device can have optional therapeutic elements (e.g., defibrillation and/or pacing electrodes, components, and associated circuitry) that are configured to operate in a therapeutic mode. The optional therapeutic elements can be physically decoupled from the medical device to convert the therapeutic medical device into a monitoring medical device for a specific use (e.g., for operating in a monitoring-only mode) or a patient. Alternatively, the optional therapeutic elements can be deactivated (e.g., via a physical or a software switch), essentially rendering the therapeutic medical device as a monitoring medical device for a specific physiologic purpose or a particular patient. As an example of a software switch, an authorized person can access a protected user interface of the medical device and select a preconfigured option or perform some other user action via the user interface to deactivate the therapeutic elements of the medical device.

Figure 16B:
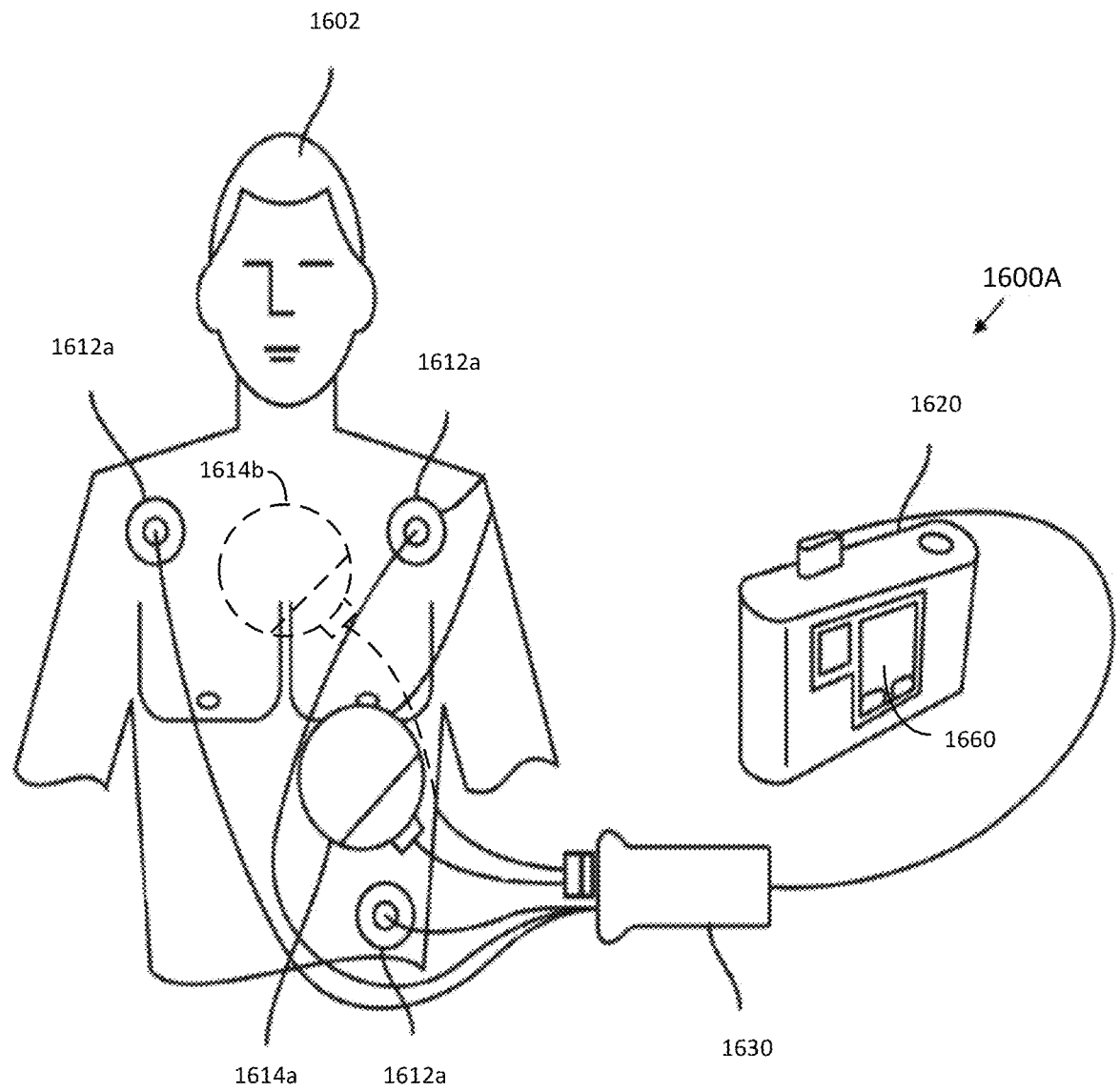

FIG. 16B illustrates a hospital wearable defibrillator 1600A that is external, ambulatory, and wearable by a patient 1602. Hospital wearable defibrillator 1600A can be configured in some implementations to provide pacing therapy, e.g., to treat bradycardia, tachycardia, and asystole conditions. The hospital wearable defibrillator 1600A can include one or more digital sensing electrodes 1612a, one or more therapy electrodes 1614a and 1614b, a medical device controller 1620 and a connection pod 1630. For example, each of these components can be structured and function as like number components of the medical device 1600. For example, the electrodes 1612a, 1614a, 1614b can include disposable adhesive electrodes. For example, the electrodes can include sensing and therapy components disposed on separate sensing and therapy electrode adhesive patches. In some implementations, both sensing and therapy components can be integrated and disposed on a same electrode adhesive patch that is then attached to the patient. For example, the front adhesively attachable therapy electrode 1614a attaches to the front of the patient's torso to deliver pacing or defibrillating therapy. Similarly, the back adhesively attachable therapy electrode 1614b attaches to the back of the patient's torso. In an example scenario, at least three ECG adhesively attachable digital sensing electrodes 1612a can be attached to at least above the patient's chest near the right arm, above the patient's chest near the left arm, and towards the bottom of the patient's chest in a manner prescribed by a trained professional.

A patient being monitored by a hospital wearable defibrillator and/or pacing device may be confined to a hospital bed or room for a significant amount of time (e.g., 75% or more of the patient's stay in the hospital). As a result, a user interface 1660 can be configured to interact with a user other than the patient, e.g., a nurse, for device-related functions such as initial device baselining, setting and adjusting patient parameters, and changing the device batteries.

In some implementations, an example of a therapeutic medical device that includes a digital front-end in accordance with the systems and methods described herein can include a short-term defibrillator and/or pacing device. For example, such a short-term device can be prescribed by a physician for patients presenting with syncope. A wearable defibrillator can be configured to monitor patients presenting with syncope by, e.g., analyzing the patient's physiological and cardiac activity for aberrant patterns that can indicate abnormal physiological function. For example, such aberrant patterns can occur prior to, during, or after the onset of syncope. In such an example implementation of the short-term wearable defibrillator, the electrode assembly can be adhesively attached to the patient's skin and have a similar configuration as the hospital wearable defibrillator described above in connection with FIG. 16A.

Figure 16C:
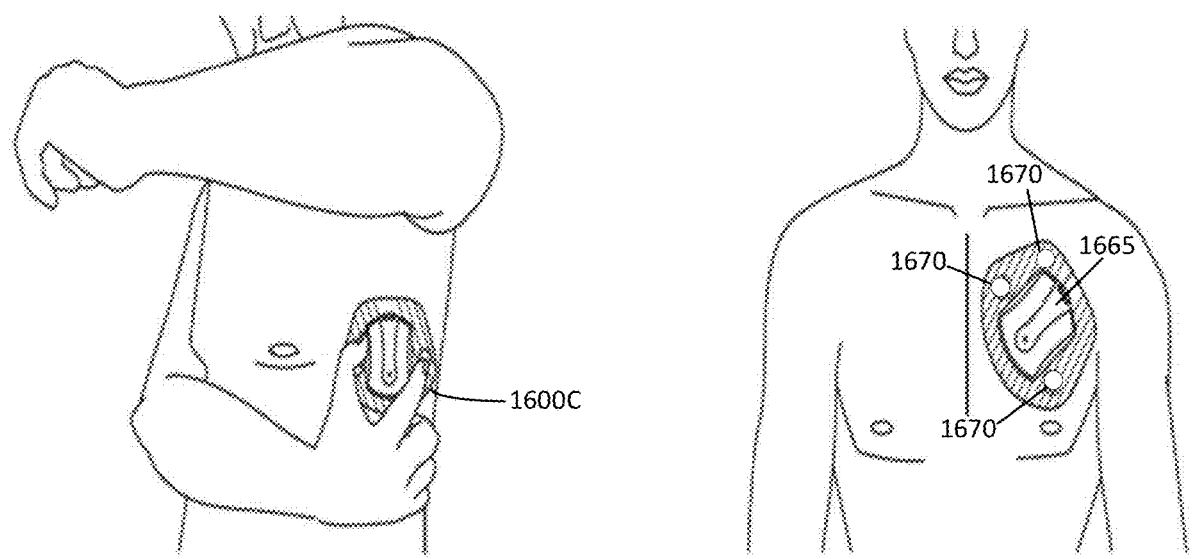
Figure 16D:
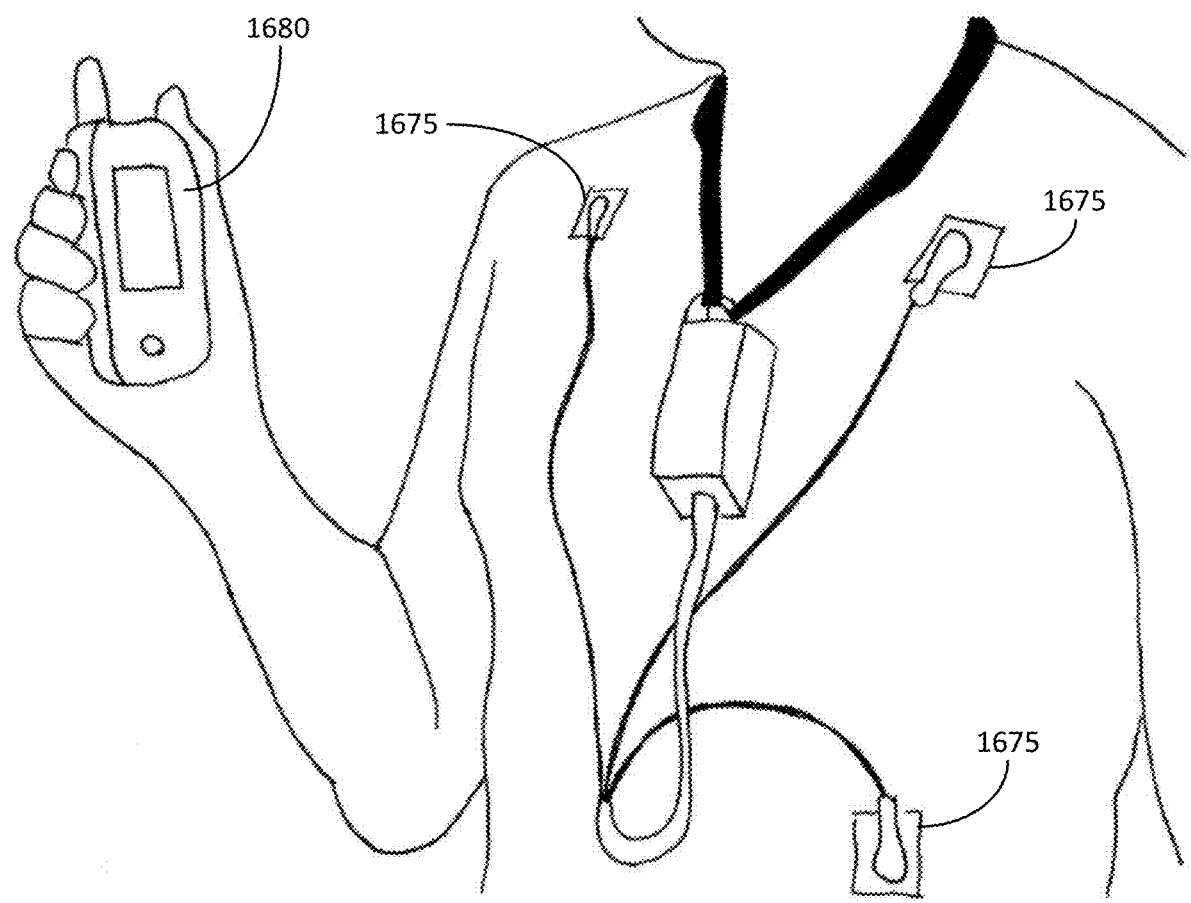

FIGS. 16C and 16D illustrate example wearable patient monitoring devices with no treatment or therapy functions. For example, such devices are configured to monitor one or more physiological parameters of a patient, e.g., for remotely monitoring and/or diagnosing a condition of the patient. For example, such physiological parameters can include a patient's ECG information, tissue (e.g., lung) fluid levels, cardio-vibrations (e.g., using accelerometers or microphones), and other related cardiac information. A cardiac monitoring device is a portable device that the patient can carry around as he or she goes about their daily routine.

Referring to FIG. 16C, an example wearable patient monitoring device 1600C can include tissue fluid monitors 1665 that use radio frequency (RF) based techniques to assess fluid levels and accumulation in a patient's body tissue. Such tissue fluid monitors 1665 can be configured to measure fluid content in the lungs, typically for diagnosis and follow-up of pulmonary edema or lung congestion in heart failure patients. The tissue fluid monitors 1665 can include one or more antennas configured to direct RF waves through a patient's tissue and measure output RF signals in response to the waves that have passed through the tissue. In certain implementations, the output RF signals include parameters indicative of a fluid level in the patient's tissue. In examples, device 1600C may be a cardiac monitoring device that also includes digital sensing electrodes 1670 for sensing ECG activity of the patient. Device 1600C can pre-process the ECG signals via one or more ECG processing and/or conditioning circuits such as an ADC, operational amplifiers, digital filters, signal amplifiers under control of a microprocessor. Device 1600C can transmit information descriptive of the ECG activity and/or tissue fluid levels via a network interface to a remote server for analysis.

Referring to FIG. 16D, another example wearable cardiac monitoring device can be attached to a patient via at least three adhesive digital cardiac sensing electrodes 1675 disposed about the patient's torso. The cardiac devices illustrated in FIGS. 16C and 16D are used in cardiac telemetry and/or continuous cardiac event monitoring applications, e.g., in patient populations reporting irregular cardiac symptoms and/or conditions. These devices can transmit information descriptive of the ECG activity and/or tissue fluid levels via a network interface to a remote server for analysis. Example cardiac conditions that can be monitored include atrial fibrillation (AF), bradycardia, tachycardia, atrio-ventricular block, Lown-Ganong-Levine syndrome, atrial flutter, sino-atrial node dysfunction, cerebral ischemia, pause(s), and/or heart palpitations. For example, such patients may be prescribed a cardiac monitoring for an extended period of time, e.g., 10 to 30 days, or more. In some mobile cardiac telemetry applications, a portable cardiac monitoring device can be configured to substantially continuously monitor the patient for a cardiac anomaly, and when such an anomaly is detected, the monitor can automatically send data relating to the anomaly to a remote server. The remote server may be located within a 24-hour manned monitoring center, where the data is interpreted by qualified, cardiac-trained reviewers and/or caregivers, and feedback provided to the patient and/or a designated caregiver via detailed periodic or event-triggered reports. In certain cardiac event monitoring applications, the cardiac monitoring device is configured to allow the patient to manually press a button on the cardiac monitoring device to report a symptom. For example, a patient can report symptoms such as a skipped beat, shortness of breath, light headedness, racing heart rate, fatigue, fainting, chest discomfort, weakness, dizziness, and/or giddiness. The cardiac monitoring device can record predetermined physiologic parameters of the patient (e.g., ECG information) for a predetermined amount of time (e.g., 1-30 minutes before and 1-30 minutes after a reported symptom). As noted above, the cardiac monitoring device can be configured to monitor physiologic parameters of the patient other than cardiac related parameters. For example, the cardiac monitoring device can be configured to monitor, for example, cardio-vibrational signals (e.g., using accelerometers or microphones), pulmonary-vibrational signals, breath vibrations, sleep related parameters (e.g., snoring, sleep apnea), tissue fluids, among others.

In some examples, the devices described herein (e.g., FIGS. 16A-D) can communicate with a remote server via an intermediary device 1680 such as that shown in FIG. 16D. For instance, devices such as shown in FIGS. 16A-D can be configured to include a network interface communications capability as described herein in reference to, for example, FIG. 1.

A physician may be monitoring a patient following their discharge from the hospital after an adverse cardiac event such as an acute myocardial infarction. At discharge, the patient has been prescribed a WCD as well as a beta-blocker to lower their heart rate. At discharge, the patient's average daily heart rate is 85 bpm. The physician would like to monitor the patient's heart rate over the next few weeks to control beta-blocker titration such that the patient's heart rate reaches a target rate, e.g., under 70 bpm as an average daily rate. After a week of the patient wearing the WCD, the physician accesses a physician's portal to access information related to the patient's ECG data and drug information. The remote server hosting the physician's portal can execute a process similar to process 500 as shown in FIG. 5A and can provide the physician with a graphical representation of the patient's ECG data and the drug prescription information. The physician can analyze the data as displayed in a single representation and determine whether to change the dosage information for the beta-blocker as prescribed to the patient. The physician can implement the dosage change and continue to monitor the patient's ECG data for any changes resulting from the change in medication.

In another example, a physician wants to determine an optimal dosage for a beta-blocker being prescribed to a patient upon discharge from the hospital. The physician can access a physician's portal that includes a predictive classifier or regression model similar to those described above. The physician can input the patient's recent medical history (e.g., ECG data for the past week and current medication and dosage information) as well as a desired outcome (e.g., reduced heart rate over the next seven days). The classifier or regression model can be trained to process the input information and generate an output that includes a recommended medication and/or dosage change, predicted changes to the patient's heart rate upon implementation of the recommended medication and/or dosage change, and/or a risk indication of future adverse event (e.g., cardiac arrest, rehospitalization, or other serious event). The physician can review the predicted outcomes and determine whether a change in medication and/or dosage is appropriate given other known information about the patient and potential side effects of the medication change.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

Other examples are within the scope of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

What is claimed is:

1. A system for providing patient alert information to a healthcare provider (HCP), the system comprising:
    a wearable medical device to be worn by a patient and comprising electrocardiogram (ECG) sensing electrodes configured to monitor electrocardiogram (ECG) information for the patient; and
    a remote server processor operably coupled to the wearable medical device and configured to:
        receive the ECG information for the patient from the wearable medical device,
        receive, via one or more HCP-controllable user interface parameters, initial drug prescription information comprising identification of a drug administered to the patient and a first dosage for the drug,
        receive, via the one or more HCP-controllable user interface parameters, heart rate control criteria including (a) a daily maximum heart rate threshold value; (b) a nighttime heart rate threshold value; (c) a duration of time spanning a plurality of days over which the daily maximum heart rate threshold value and the nighttime heart rate threshold value are to be applied; and (d) a threshold number of transgressions of either the daily maximum heart rate threshold value or the nighttime heart rate threshold value during the duration of time, wherein the heart rate control criteria indicate whether a heart rate status of the patient is under control in accordance with a predetermined guideline directed medical treatment for the patient,
        receive, via the one or more HCP-controllable user interface parameters, one or more predetermined cardiac event parameters,
        monitor the ECG information for the patient for one or more heart rate control events during the duration of time over which the daily maximum heart rate threshold value and the nighttime heart rate threshold value are to be applied, wherein each of the one or more heart rate control events is a transgression of either the daily maximum heart rate threshold value or the nighttime heart rate threshold value during the duration of time,
        make a determination, based on the heart rate control criteria, that the heart rate status of the patient is not under control in accordance with the predetermined guideline directed medical treatment for the patient,
        in response to making the determination that the heart rate status of the patient is not under control in accordance with the predetermined guideline directed medical treatment for the patient, provide an informational alert to the HCP, the informational alert comprising at least one recommended change to the initial drug prescription information that includes at least a recommended updated dosage to the drug administered to the patient, receive, via the one or more HCP-controllable user interface parameters, updated drug prescription information comprising a second dosage for the drug provide a graphical representation indicating information on at least one of the one or more heart rate control events occurring within the duration of time spanning the plurality of days over which the daily maximum heart rate threshold value and the nighttime heart rate threshold value are applied, wherein the graphical representation further indicates, in relation to a time axis that spans the plurality of days and includes (a) a first monitoring period during which the drug is administered to the patient in accordance with the initial drug prescription information and (b) a second monitoring period during which the drug is administered to the patient in accordance with the updated drug prescription information, an average daily heart rate of the patient derived from the ECG information, the initial drug prescription information, and the updated drug prescription information, receive user input that defines an updated time period, and provide an updated graphical representation indicating, in relation to an updated time axis that includes the updated time period, the average daily heart rate of the patient.

2. The system of claim 1, wherein the remote server processor is further configured to determine whether one or more cardiac events occurred based on the one or more predetermined cardiac event parameters; and the one or more cardiac events comprises a bradycardia event.

3. The system of claim 2, wherein the one or more predetermined cardiac event parameters comprises at least one of a bradycardia onset threshold or a bradycardia offset threshold.

4. The system of claim 1, wherein the remote server processor is further configured to determine whether one or more cardiac events occurred based on the one or more predetermined cardiac event parameters; and the one or more cardiac events comprises a tachycardia event.

5. The system of claim 4, wherein the one or more predetermined cardiac event parameters comprise at least one of a tachycardia onset threshold or a tachycardia offset threshold.

6. The system of claim 1, wherein the one or more predetermined cardiac event parameters comprises at least one of identification of abnormal heart rates, identification of abnormal morphologies, identification of ventricular ectopic beats (VEBs), identification of supraventricular ectopic beats (SVEBs), an atrial fibrillation duration threshold, a heart pause duration threshold, identification of ventricular runs, identification of ventricular bigeminy, identification of ventricular trigeminy, supraventricular tachycardia onset and offset thresholds, identification of 2nd Atrioventricular (AV) block, and identification of 3rd AV block.

7. The system of claim 1, wherein the heart rate control criteria further include at least one of an average daytime heart rate threshold value, an average nighttime heart rate threshold value, a maximum daytime heart rate threshold value, a maximum nighttime heart rate threshold value, a minimum daytime heart rate threshold value, or a minimum nighttime heart rate threshold value.

8. The system of claim 1, wherein the duration of time over which the daily maximum heart rate threshold value and the nighttime heart rate threshold value are to be applied comprises at least one of two days, three days, five days, one week, and two weeks.

9. The system of claim 1, wherein the remote server processor is further configured to determine whether one or more cardiac events occurred based on the one or more predetermined cardiac event parameters; and determining whether the one or more cardiac events occurred based on the one or more predetermined cardiac event parameters comprises monitoring the ECG information for the patient during the duration of time over which the daily maximum heart rate threshold value and the nighttime heart rate threshold value are to be applied.

10. The system of claim 1, wherein the remote server processor is further configured to determine whether one or more cardiac events occurred based on the one or more predetermined cardiac event parameters; and the informational alert to the HCP comprises (a) information on the one or more cardiac events if the one or more cardiac events are determined to have occurred during the duration of time over which the daily maximum heart rate threshold value and the nighttime heart rate threshold value are to be applied, (b) information on the one or more cardiac events if the one or more cardiac events are determined to have occurred during a first period of time before the duration of time begins, and (c) information on the one or more cardiac events if the one or more cardiac events are determined to have occurred during a second period of time after the duration of time ends.

11. The system of claim 10, wherein the first period of time comprises at least one of one day, three days, five days, one week, and two weeks and the second period of time comprises at least one of one day, three days, five days, one week, and two weeks.

12. The system of claim 1, further comprising output circuitry operably coupled to the remote server processor and configured to output the informational alert to the HCP.

13. A method for providing patient alert information to a healthcare provider (HCP), the method comprising:

receiving, by a remote server processor operably coupled to a wearable medical device to be worn by a patient, electrocardiogram (ECG) information for the patient;

receiving, by the remote server processor, initial drug prescription information comprising identification of a drug administered to the patient and a first dosage for the drug via one or more HCP-controllable user interface parameters;

receiving, by the remote server processor, one or more monitoring parameters received via the one or more HCP-controllable user interface parameters;

receiving, by the remote server processor, via the one or more HCP-controllable user interface parameters, heart rate control criteria including (a) a daily maximum heart rate threshold value; (b) a nighttime heart rate threshold value; (c) a duration of time over which the daily maximum heart rate threshold value and the nighttime heart rate threshold value are to be applied; and (d) a threshold number of transgressions of either the daily maximum heart rate threshold value or the nighttime heart rate threshold value during the duration of time, wherein the heart rate control criteria indicate whether a heart rate status of the patient is under control in accordance with a predetermined guideline directed medical treatment for the patient, and wherein the duration of time spans a plurality of days from when the initial drug prescription information is received;

determining, by the remote server processor, one or more predetermined cardiac event parameters from the one or more monitoring parameters;

monitoring, by the remote server processor, the ECG information for the patient for one or more heart rate control events during the duration of time, wherein each of the one or more heart rate control events is a transgression of either the daily maximum heart rate threshold value or the nighttime heart rate threshold value during the duration of time;

making a determination, based on the heart rate control criteria, that the heart rate status of the patient is not under control in accordance with the predetermined guideline directed medical treatment for the patient;

in response to making the determination that the heart rate status of the patient is not under control in accordance with the predetermined guideline directed medical treatment for the patient, providing, by the remote server processor, an informational alert to the HCP, the informational alert comprising at least one recommended change to the initial drug prescription information that includes at least a recommended updated dosage to the drug administered to the patient;

receiving, via the one or more HCP-controllable user interface parameters, updated drug prescription information comprising a second dosage for the drug; and providing a graphical representation indicating information on at least one of the one or more heart rate control events occurring within the duration of time, wherein the graphical representation further indicates, in relation to a time axis that spans the plurality of days and includes (a) a first monitoring period during which the drug is administered to the patient in accordance with the initial drug prescription information and (b) a second monitoring period during which the drug is administered to the patient in accordance with the updated drug prescription information, an average daily heart rate of the patient derived from the ECG information, the initial drug prescription information, and the updated drug prescription information, receiving user input that defines an updated time period, and providing an updated graphical representation indicating, in relation to an updated time axis that includes the updated time period, the average daily heart rate of the patient.

14. The method of claim 13, further comprising determining whether one or more cardiac events occurred based on the one or more predetermined cardiac event parameters, wherein the one or more cardiac events comprises a bradycardia event.

15. The method of claim 14, wherein the one or more predetermined cardiac event parameters comprises at least one of a bradycardia onset threshold or a bradycardia offset threshold.

16. The method of claim 13, further comprising determining whether one or more cardiac events occurred based on the one or more predetermined cardiac event parameters, wherein the one or more cardiac events comprises a tachycardia event.

17. The method of claim 16, wherein the one or more predetermined cardiac event parameters comprise at least one of a tachycardia onset threshold or a tachycardia offset threshold.

18. The method of claim 13, wherein the heart rate control criteria further include at least one of an average daytime heart rate threshold value, an average nighttime heart rate threshold value, a maximum daytime heart rate threshold value, a maximum nighttime heart rate threshold value, a minimum daytime heart rate threshold value, or a minimum nighttime heart rate threshold value.

19. The system of claim 1, wherein the updated graphical representation further indicates at least one trend in occurrences of the one or more heart rate control events relative to changes in at least one of the drug administered to the patient, the first dosage, or the second dosage.

20. The system of claim 1, wherein the drug administered to the patient comprises at least one of acebutolol, atenolol, carvedilol, metoprolol, nadolol, and propranolol, and wherein the initial drug prescription information comprises at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

21. The method of claim 13, wherein the updated graphical representation further indicates at least one trend in occurrences of the one or more heart rate control events relative to changes in at least one of the drug administered to the patient, the first dosage, or the second dosage.

22. The method of claim 13, wherein the drug administered to the patient comprises at least one of acebutolol, atenolol, carvedilol, metoprolol, nadolol, and propranolol, and wherein the initial drug prescription information comprises at least one of 3.125 mg taken twice a day, 12.5 mg taken twice a day, 25 mg taken twice a day, 50 mg taken twice a day, 100 mg taken twice a day, 150 mg taken twice a day, and 200 mg taken twice a day.

23. The system of claim 1, wherein the informational alert further comprises at least one recommended change to at least one prescribed period of physical activity for the patient.

24. The method of claim 13, wherein providing the informational alert comprises providing at least one recommended change to at least one prescribed period of physical activity for the patient.

25. The system of claim 1, wherein the at least one recommended change identifies the updated drug prescription information.

26. The system of claim 1, wherein:
the initial drug prescription information further comprises a first administration frequency for the drug; and
the updated drug prescription information further comprises a second administration frequency for the drug.

27. The method of claim 13, wherein:
the initial drug prescription information further comprises a first administration frequency for the drug; and
the updated drug prescription information further comprises a second administration frequency for the drug.

28. The method of claim 13, wherein the determination is a determination that at least one of the daily maximum heart rate threshold value or the nighttime heart rate threshold value has been transgressed a number of times that equals or exceeds the threshold number of transgressions during the duration of time.

* * * * *